US012140817B2

United States Patent
Lee et al.

(10) Patent No.: US 12,140,817 B2
(45) Date of Patent: Nov. 12, 2024

(54) LENS DRIVING APPARATUS, AND CAMERA MODULE AND OPTICAL DEVICE COMPRISING SAME

(71) Applicant: LG INNOTEK CO., LTD., Seoul (KR)

(72) Inventors: Seung Hak Lee, Seoul (KR); Tae Bong Park, Seoul (KR); Kyung Hwan Kim, Seoul (KR); Kap Jin Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 652 days.

(21) Appl. No.: 17/287,414

(22) PCT Filed: Oct. 30, 2019

(86) PCT No.: PCT/KR2019/014444
§ 371 (c)(1),
(2) Date: Apr. 21, 2021

(87) PCT Pub. No.: WO2020/096260
PCT Pub. Date: May 14, 2020

(65) Prior Publication Data
US 2021/0364733 A1    Nov. 25, 2021

(30) Foreign Application Priority Data

Nov. 6, 2018 (KR) .......... 10-2018-0135008
Feb. 13, 2019 (KR) .......... 10-2019-0016806
Mar. 20, 2019 (KR) .......... 10-2019-0031895

(51) Int. Cl.
*G02B 7/09* (2021.01)
*G02B 7/02* (2021.01)
(Continued)

(52) U.S. Cl.
CPC .............. *G02B 7/09* (2013.01); *G02B 7/025* (2013.01); *G03B 5/04* (2013.01); *G03B 13/36* (2013.01);
(Continued)

(58) Field of Classification Search
CPC . G02B 7/09; G02B 7/025; G02B 7/08; G03B 5/04; G03B 13/36; G03B 17/12;
(Continued)

(56) References Cited

U.S. PATENT DOCUMENTS 5,471,100 A     11/1995 Sakamoto et al.
2014/0009631 A1* 1/2014 Topliss .............. H04N 23/687
                                              348/208.11
(Continued)

FOREIGN PATENT DOCUMENTS

CN       101135827 A      3/2008
CN       107299948 A  *  10/2017
(Continued)

*Primary Examiner* — Mahidere S Sahle
*Assistant Examiner* — K Muhammad
(74) *Attorney, Agent, or Firm* — Birch, Stewart, Kolasch & Birch, LLP

(57) ABSTRACT

An embodiment comprises: a housing comprising a first corner part and a second corner part opposite to the first corner part; a bobbin disposed in the housing; a magnet comprising a first magnet disposed in the first corner part of the housing and a second magnet disposed in the second corner part of the housing; a coil disposed on the bobbin and opposite to the magnet; a circuit board disposed on one surface of the housing and including a position sensor; and a sensing magnet disposed in the bobbin and opposite to the position sensor, wherein a protrusion part is formed to protrude from one surface of the bobbin, opposite to one surface of the housing, toward the one surface of the housing, and the sensing magnet is at least partially placed within the protrusion part of the bobbin.

20 Claims, 48 Drawing Sheets

(51) Int. Cl.
  *G03B 5/04* (2021.01)
  *G03B 13/36* (2021.01)
  *G03B 17/12* (2021.01)
  *H02K 41/035* (2006.01)
  *H04N 23/54* (2023.01)

(52) U.S. Cl.
  CPC ......... *G03B 17/12* (2013.01); *H02K 41/0356* (2013.01); *H04N 23/54* (2023.01); *G03B 2205/0007* (2013.01); *G03B 2205/0069* (2013.01)

(58) Field of Classification Search
  CPC .... G03B 2205/0007; G03B 2205/0069; G03B 3/10; G03B 5/00; G03B 30/00; H02K 41/0356; H04N 23/54; H04N 23/55
  See application file for complete search history.

(56) References Cited

U.S. PATENT DOCUMENTS

| | | | |
|---|---|---|---|
| 2015/0015729 A1 | 1/2015 | Kasamatsu | |
| 2015/0365568 A1 | 12/2015 | Topliss et al. | |
| 2016/0291285 A1* | 10/2016 | Park | H04N 23/55 |
| 2017/0082823 A1 | 3/2017 | Hwang et al. | |
| 2017/0146772 A1 | 5/2017 | Min et al. | |
| 2017/0160558 A1* | 6/2017 | Kim | H02K 33/00 |
| 2018/0234529 A1* | 8/2018 | Yu | G02B 27/646 |
| 2018/0348469 A1* | 12/2018 | Son | G02B 7/025 |

FOREIGN PATENT DOCUMENTS

| | | |
|---|---|---|
| CN | 107544123 A | 1/2018 |
| CN | 111788507 A | 10/2020 |
| EP | 3 739 370 A1 | 11/2020 |
| JP | 7-146430 A | 6/1995 |
| JP | 2011-237507 A | 11/2011 |
| JP | 2015-107054 A | 6/2015 |
| JP | 2016-38444 A | 3/2016 |
| JP | 2016-509684 A | 3/2016 |
| JP | 2016-53627 A | 4/2016 |
| JP | 2017-510841 A | 4/2017 |
| JP | 2018-45211 A | 3/2018 |
| KR | 10-2014-0098211 A | 8/2014 |
| KR | 10-1511748 B1 | 4/2015 |
| KR | 10-2015-0128262 A | 11/2015 |
| KR | 10-2016-0009389 A | 1/2016 |
| KR | 10-2016-0015885 A | 2/2016 |
| KR | 10-2016-0082035 A1 | 7/2016 |
| KR | 10-2017-0033663 A | 3/2017 |
| KR | 20170024671 A * | 3/2017 |
| KR | 10-2017-0060757 A | 6/2017 |

* cited by examiner

LENS DRIVING APPARATUS, AND CAMERA MODULE AND OPTICAL DEVICE COMPRISING SAME

CROSS REFERENCE TO RELATED APPLICATIONS

This application is the National Phase of PCT International Application No. PCT/KR2019/014444, filed on Oct. 30, 2019, which claims priority under 35 U.S.C. 119(a) to Patent Application Nos. 10-2018-0135008, filed in the Republic of Korea on Nov. 6, 2018, 10-2019-0016806, filed in the Republic of Korea on Feb. 13, 2019, and 10-2019-0031895, filed in the Republic of Korea on Mar. 20, 2019, all of which are hereby expressly incorporated by reference into the present application.

TECHNICAL FIELD

Embodiments relate to a lens moving apparatus and a camera module and an optical device each including the same.

BACKGROUND ART

It is difficult to apply technology of a voice coil motor (VCM) used in existing general camera modules to a subminiature, low-power camera module, and therefore research related thereto has been actively conducted.

Demand for and production of electronic products, such as smartphones and mobile phones equipped with cameras have increased. Cameras for mobile phones are trending toward increased resolution and miniaturization. As a result, an actuator has also been miniaturized, increased in diameter, and been made multifunctional. In order to realize a high-resolution camera for mobile phones, improvement in performance of the camera for mobile phones and additional functions thereof, such as autofocusing, handshake correction, and zooming, are required.

A camera may include a sensor configured to detect movement of a lens, and a board on which the sensor is mounted. Here, the sensor or the board may fail due to being pressed by a blanking jig during an operation of blanking the board, or the board may be prevented from being disposed at the normal position due to burrs caused after the blanking operation. Furthermore, the sensor may be tilted while the sensor is mounted on a BGA (ball grid array) of the board.

When the boards in the array state are cut, the bridges of the boards are cut in a horizontal or vertical direction. Here, there may be a problem of difficult assembly of the board when the board is inserted into a pocket in a housing and is then assembled therewith.

DISCLOSURE

Technical Problem

The embodiments provide a lens moving apparatus and a camera module and an optical device each including the same, capable of increasing the coupling force between a bobbin and a sensing magnet and of reducing the magnetic field interference between the sensing magnet and a drive magnet.

Furthermore, embodiments provide a lens moving apparatus, which is capable of minimizing the occurrence of breakage of a board or a sensor caused by a blanking jig during an operation of mounting sensors and the like on a plurality of boards, which are supplied in an arrayed state, and blanking the boards, of positioning the board in place even when burrs are present, and of minimizing a phenomenon in which the sensor is tilted during an operation of mounting a sensor on the BGA of the board.

In addition, embodiments provide a lens moving apparatus capable of making it easy to fit a board into a pocket in a housing.

Technical Solution

A lens moving apparatus according to an embodiment includes a housing including a first corner portion and a second corner portion that faces the first corner portion, a bobbin disposed in the housing, a magnet including a first magnet disposed at the first corner portion of the housing and a second magnet disposed at the second corner portion of the housing, a coil disposed at the bobbin so as to face the magnet, a circuit board, which is disposed on one surface of the housing and includes a position sensor, and a sensing magnet disposed at the bobbin so as to face the position sensor, wherein the bobbin is provided with a projection, which is formed at one surface of the bobbin that faces the one surface of the housing and which projects toward the one surface of the housing, and at least a portion of the sensing magnet is disposed in the projection of the bobbin.

The housing may be provided in one surface thereof with a groove in which the projection of the bobbin is disposed.

The sensing magnet may project from the one surface of the bobbin toward the one surface of the housing.

At least a portion of the sensing magnet may have a width that decreases toward the one surface of the housing from the one surface of the bobbin.

The projection of the bobbin may have a seating groove configured to receive the sensing magnet, the seating groove being depressed from an upper surface of the projection.

The seating groove in the projection may have a first opening formed in the upper surface of the projection and a second opening formed in an outer surface of the projection.

The second opening in the bobbin may expose one surface of the sensing magnet, which faces the position sensor.

The coil may include a first coil unit that faces the first magnet and a second coil unit that faces the second magnet, and the circuit board is disposed between the first corner portion and the third corner portion of the housing.

The length of a portion of the sensing magnet that projects from the one surface of the bobbin may be greater than the shortest distance between the position sensor and the sensing magnet.

The sensing magnet may include a first magnet part, a second magnet part and a partition wall disposed between the first magnet part and the second magnet part.

Advantageous Effects

Embodiments are able to increase the coupling force between a bobbin and a sensing magnet and to reduce magnetic field interference between the sensing magnet and a drive magnet.

Furthermore, embodiments are able to minimize breakage of a board or a sensor caused by a blanking jig during an operation of mounting sensors and the like on a plurality of boards, which are supplied in an arrayed state, and blanking the boards, to position the board in place even when burrs are present, and to minimize a phenomenon in which the sensor is tilted during an operation of mounting a sensor on the BGA of the board.

In addition, embodiments are able to improve ease of assembly and productivity by changing the shape of a fitting portion of a board and to minimize potential processing defects due to the improved structure of the board.

BEST MODE

Figure 1:
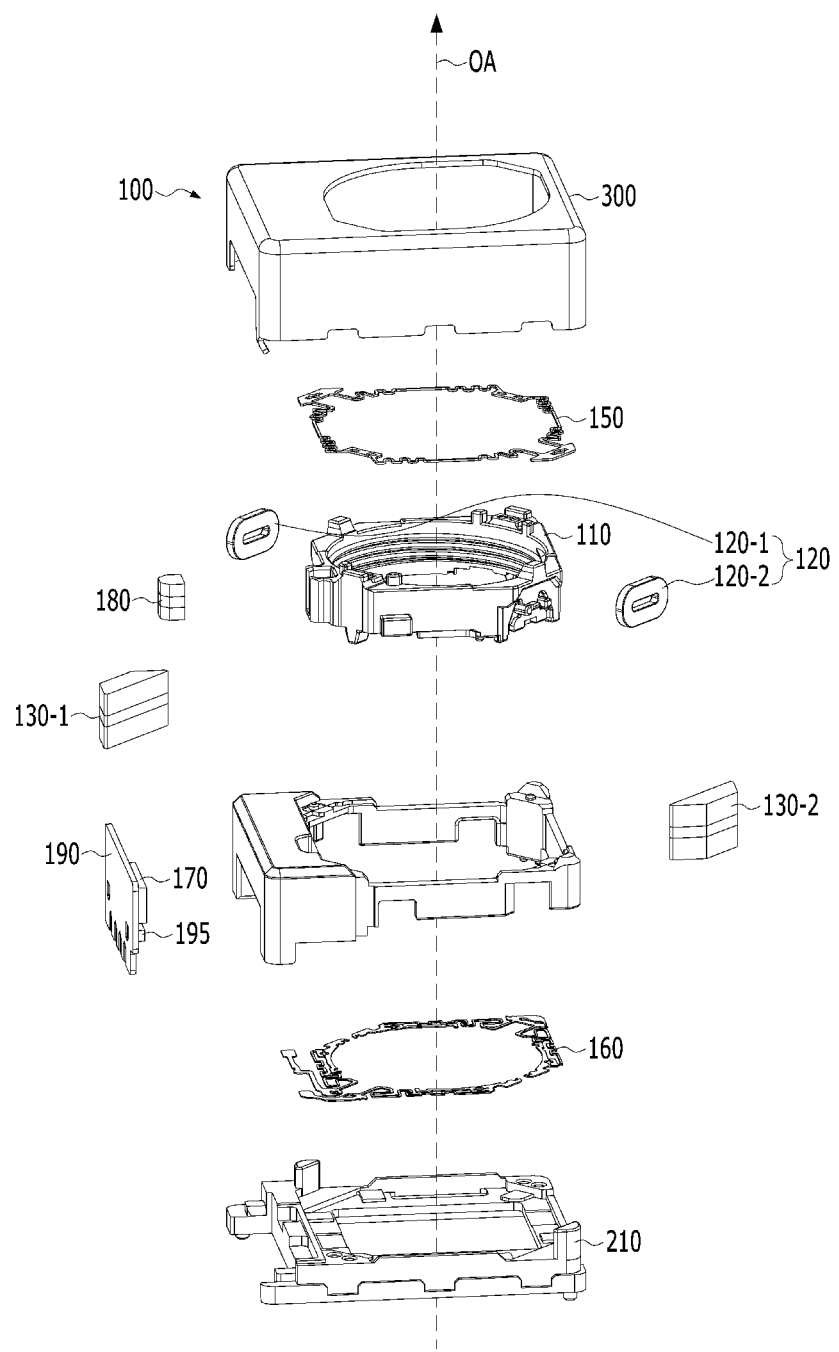
FIG. 1 is an exploded perspective view of a lens moving apparatus according to an embodiment.

Hereinafter, embodiments of the present invention will be described in detail with reference to the accompanying drawings.

The technical idea of the present invention may be embodied in many different forms, and should not be construed as being limited to the following embodiments set forth herein. One or more of components of the embodiments may be selectively combined with each other or replaced without departing from the technical spirit and scope of the present invention.

Unless otherwise particularly defined, terms (including technical and scientific terms) used in the embodiments of the present invention have the same meanings as those commonly understood by one of ordinary skill in the art to which this invention belongs. It will be further understood that commonly used terms, such as those defined in dictionaries, should be interpreted as having meanings consistent with their meanings in the context of the relevant art.

The terminology used in the embodiments of the present invention is for the purpose of describing particular embodiments only, and is not intended to limit the present invention. As used in the disclosure and the appended claims, the singular forms are intended to include the plural forms as well, unless the context clearly indicates otherwise. The phrase "at least one (or one or more) of A, B and C" may be interpreted as including one or more of all combinations of A, B and C.

Furthermore, when describing the components of the present invention, terms such as "first", "second", "A", "B", "(a)" or "(b)" may be used. Since these terms are provided merely for the purpose of distinguishing the components from each other, they do not limit the nature, sequence or order of the components.

It should be understood that, when an element is referred to as being "linked", "coupled" or "connected" to another element, the element may be directly "linked", "coupled" or "connected" to the another element, or may be "linked", "coupled" or "connected" to the another element via a further element interposed therebetween. Furthermore, it will be understood that, when an element is referred to as being formed "on" or "under" another element, it can be directly "on" or "under" the other element, or can be indirectly disposed with regard thereto, with one or more intervening elements therebetween. In addition, it will also be understood that "on" or "under" the element may mean an upward direction or a downward direction based on the element.

Hereinafter, lens moving apparatuses and a camera modules and camera modules and optical devices including the same according to the embodiments will be described with reference to the accompanying drawings. For the convenience of description, although the lens moving apparatus is described using a rectangular coordinate system (x, y, z), the lens moving apparatus may be described using some other coordinate systems, and the embodiments are not limited thereto. In the respective drawings, the X-axis direction and the Y-axis direction mean directions perpendicular to an optical axis, i.e. the Z-axis. The Z-axis direction, which is the optical-axis direction, may be referred to as a "first direction", the X-axis direction may be referred to as a "second direction", and the Y-axis direction may be referred to as a "third direction".

The lens moving apparatus according to an embodiment of the present invention is capable of performing an "auto-focusing function". Here, the "auto-focusing function" serves to automatically focus an image of a subject on an image sensor surface.

Figure 2:
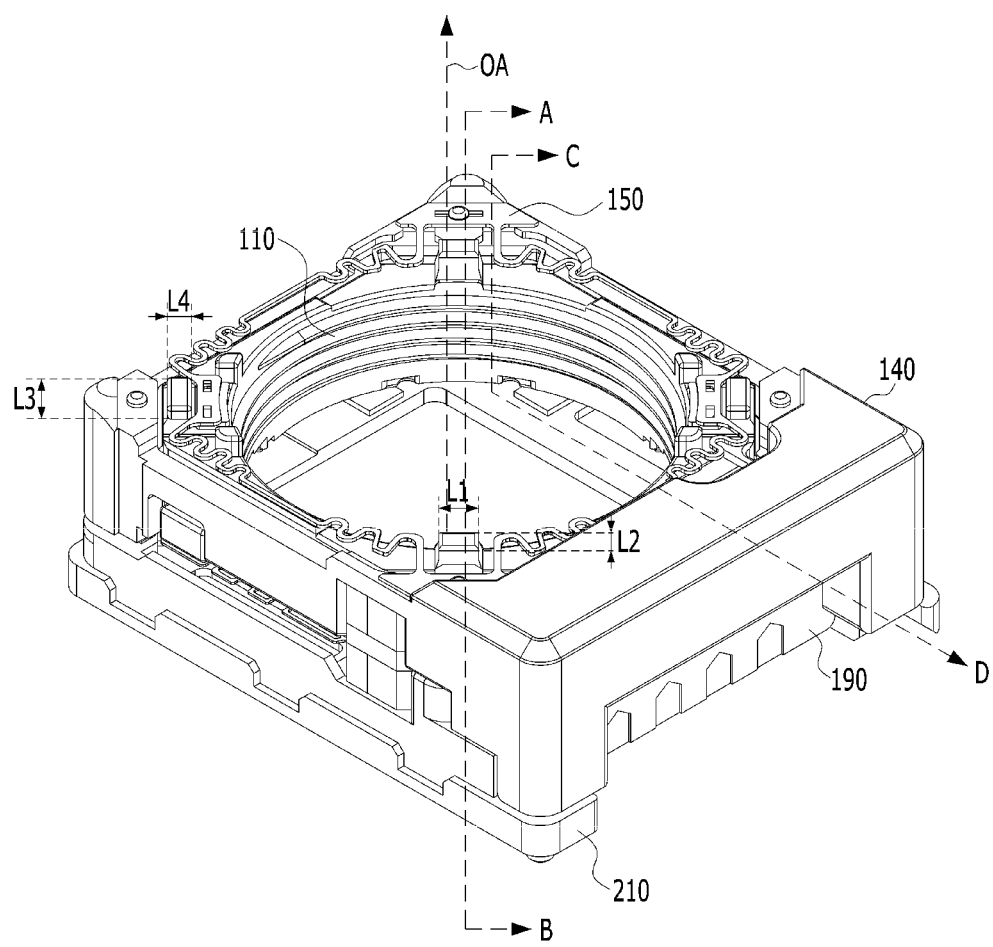
FIG. 2 is an assembled perspective view of the lens moving apparatus shown in FIG. 1, from which a cover member is removed.

FIG. 1 is an exploded perspective of the lens moving apparatus 100 according to an embodiment of the present invention. FIG. 2 is an assembled perspective view of the lens moving apparatus 100, from which a cover member 300 in FIG. 1 is removed.

Referring to FIGS. 1 and 2, the lens moving apparatus 100 includes a bobbin 110, a coil 120, a first magnet 130-1, a second magnet 130-2, a housing 140, an upper elastic member 150, a lower elastic member 160, a position sensor 170, a circuit board 190 and a sensing magnet 180.

The lens moving apparatus 100 may further include a balance magnet (not shown) and a cover member 300.

The lens moving apparatus 100 may further include a capacitor 195 mounted on the circuit boar 190.

The term "coil" may be interchangeably used with "coil unit", and the term "elastic member" may be interchangeably used with "elastic unit" or "spring".

First, the bobbin 110 will be described.

The bobbin 110 may be disposed in the housing 140 so as to be movable in the optical-axis direction OA or the first direction (for example, the Z-axis direction) by the electromagnetic interaction between the coil 120 and the first and second magnets 130-1 and 130-2.

Figure 3A:
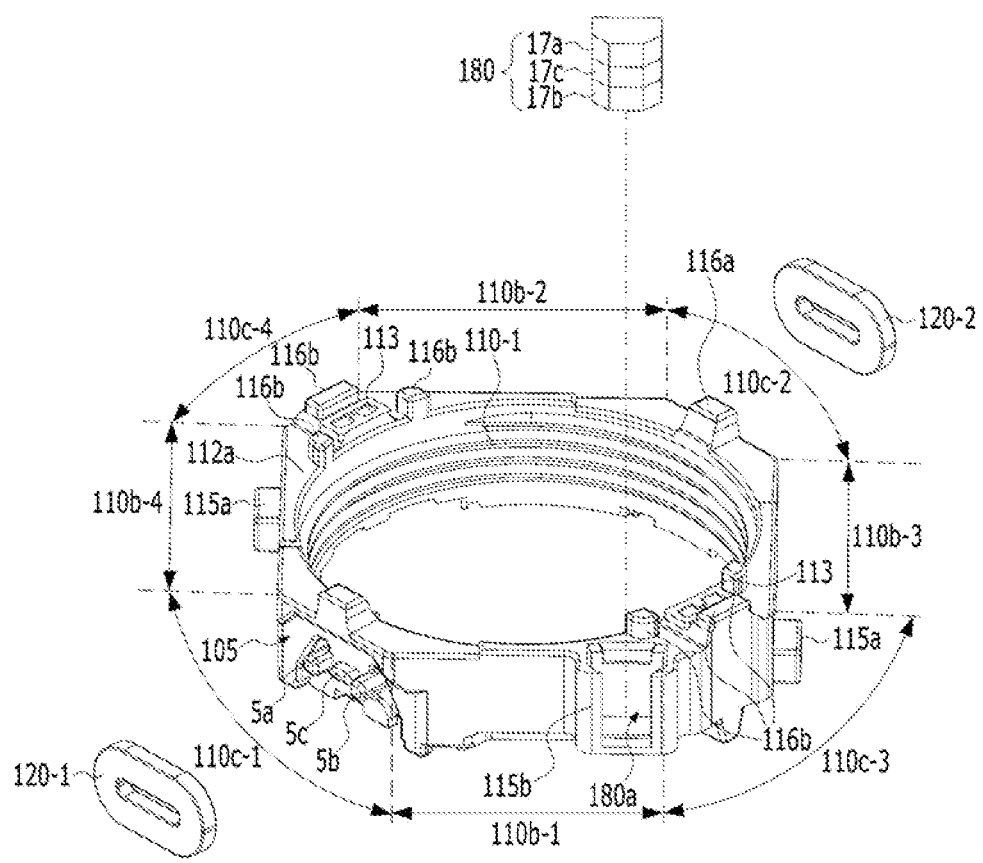
FIG. 3A is a perspective view of the bobbin, the first coil and the sensing magnet shown in FIG. 1.
Figure 3B:
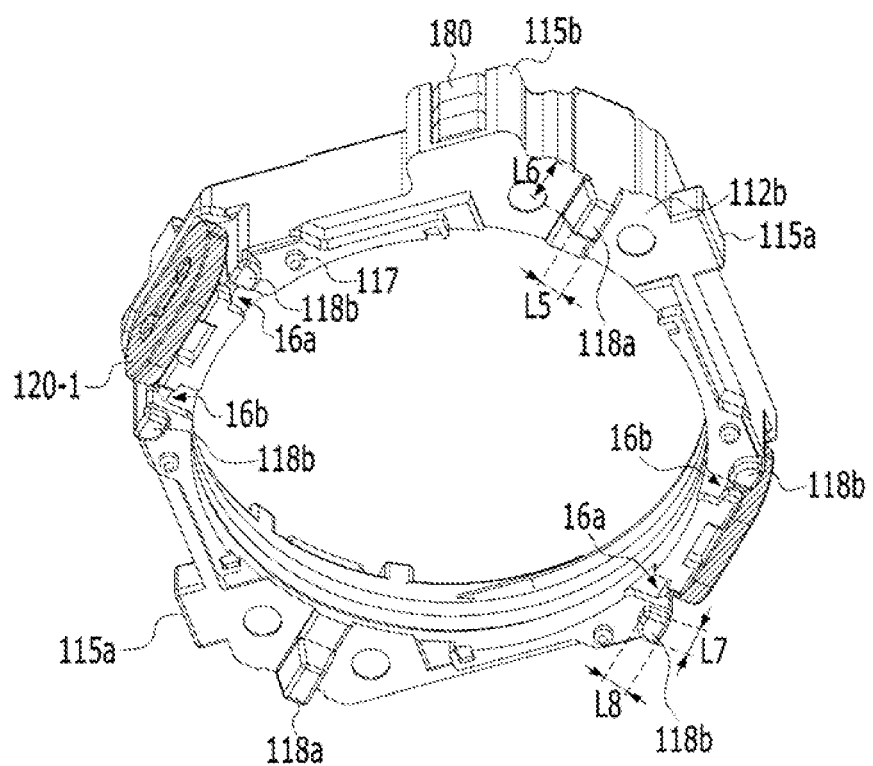
FIG. 3B is an assembled perspective view of the bobbin, the first coil and the sensing magnet.
Figure 3C:
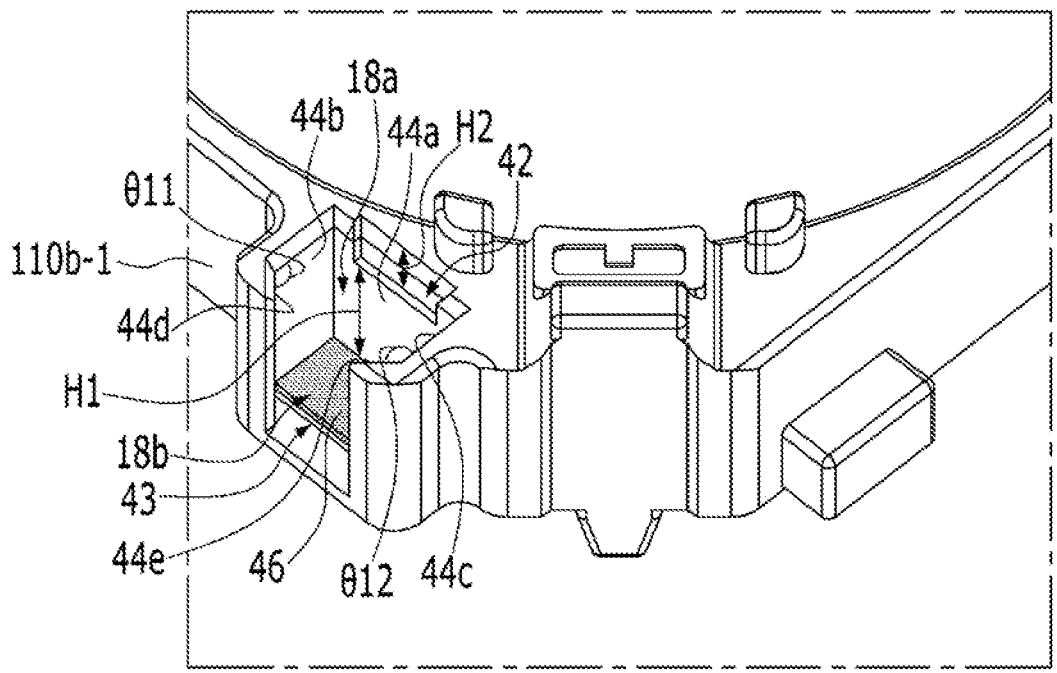
FIG. 3C illustrates a seating groove in a projection of the bobbin.

FIG. 3A is a perspective view of the bobbin 110, the first coil 120 and the sensing magnet 180, which are shown in FIG. 1. FIG. 3B is an assembled perspective view if the bobbin 110, the first coil 120 and the sensing magnet 180. FIG. 3C illustrates the seating groove 180a in the projection 115b of the bobbin 110.

Referring to FIGS. 3A to 3C, the bobbin 110 may have a bore in which a lens or a lens barrel is mounted. For example, the bore in the bobbin 110 may be a through hole formed through the bobbin 110 in the optical-axis direction, and may have a circular shape, an elliptical shape or a polygonal shape without being limited thereto.

Although the bore in the bobbin 110 may be directly provided therein with a lens, the disclosure is not limited thereto. In another embodiment, a lens barrel, to which at least one lens is mounted or coupled, may be coupled or mounted in the bore in the bobbin 110. The lens or the lens barrel may be coupled to the inner circumferential surface (or the inner surface) of the bobbin 110 in various manners.

For example, the bobbin 110 may be provided in the inner circumferential surface thereof with a thread 110-1, with which a lens or a lens barrel is engaged.

The bobbin 110 may include a plurality of side portions or a plurality of side surfaces.

For example, the bobbin 110 may include first side portions 110b-1 to 110b-4, which are spaced apart from each other, and second side portions 110c-1 to 110c-4. Each of the second side portions 110c-1 to 110c-4 may connect two adjacent first side portions to each other.

For example, the first side portions 110b-1 to 110b-4 may be referred to as a first side portion 110b-1, a second side portion 110b-2, a third side portion 110b-3 and a fourth side portion 110b-3, and the second side portions 110c-1 to 110c-4 may be referred to as a first corner portion 110c-1, a second corner portion 110c-2, a third corner portion 110c-3 and a fourth corner portion 110c-4.

Alternatively, the first side portions 110b-1 to 110b-4 may be referred to as a first of first side portion 110b-1, a second of first side portion 110b-1, a third of first side portion 110b-4 and a fourth of first side portion 110b-4, and the second side portions 110c-1 to 110c-4 may be referred to as a first of second side portion 110c-1, a second of second side portion 110c-2, a third of second side portion 110c-3 and a fourth of second side portion 110c-4.

Although the horizontal or crosswise length of each of the first side portions 110b-1 to 110b-4 of the bobbin 110 may be different from the horizontal or crosswise length of each of the second side portions 110c-1 to 110c-4 of the bobbin 110, the disclosure is not limited thereto. In another embodiment, the two lengths may be equal to each other.

The bobbin 110 may include a projection 115a provided on the outer surface thereof. For example, the projection 115a may be disposed on the outer surface of at least one of the first side portions 110b-1 to 110b-4 of the bobbin 110. The projection 115a may project in a direction that extends through the center of the bore in the bobbin and is parallel to a line perpendicular to the optical axis, but the disclosure is not limited thereto.

The projection 115a of the bobbin 110 may correspond to a groove 25a in the housing 140, and may be disposed in the groove 25a in the housing 140 so as to minimize or prevent rotation of the bobbin 110 about the optical axis beyond a predetermined range.

Furthermore, the projection 115a may serve as a stopper for minimizing or preventing direct collision of the upper surface of the bobbin 110 with the cover member 300 even when the bobbin 110 is moved beyond a predetermined range in the optical-axis direction (for example, in a direction toward the upper elastic member 150 from the lower elastic member 160) due to external impact or the like.

The bobbin 110 may have formed in the upper portion, the upper end or the upper surface thereof a first escape groove 112a for avoiding spatial interference with a first frame connector 153 of the upper elastic member 150. Although the first escape groove 112a may be formed in at least one of the first side portions 110b-1 to 110b-4 of the bobbin 110, the disclosure is not limited thereto. In another embodiment, the first escape groove 112a may be formed in at least one of the first and second side portions of the bobbin 110.

Furthermore, the bobbin 110 may have formed in the lower portion, the lower end or the lower surface thereof a second escape groove 112b for avoiding spatial interference with a second frame connector 163 of the lower elastic member 160.

The bobbin 110 may include at least one stopper 116a and at least one stopper 116b projecting from the upper portion, the upper end or the upper surface of the bobbin 110.

The at least one stopper 116a and the at least one stopper 116b of the bobbin 110 may serve to prevent the upper surface of the bobbin 110 from directly colliding with the inner side of the upper plate of the cover member 300 even when the bobbin 110 is moved beyond a specified range due to an external impact or the like while the bobbin 110 is being moved in the first direction to perform an auto-focusing function.

The small size of the bobbin 110 may impose restrictions on the disposition of the first and second coil units 120-1 and 120-2, the coupling relationships between the upper elastic member 150 and the bobbin 110, and the design and positioning of the stoppers of the bobbin 110.

In consideration thereof, the first stopper 116a and the second stopper 116a, which have different heights, may be formed on the upper portion, the upper end or the upper surface of the bobbin 110.

The first stopper 116a of the bobbin 110 may be disposed on at least one of the second side portions 110c-1 to 110c-4 of the bobbin 110, and the second stopper 116b of the bobbin 110 may be disposed on at least another one of second side portions 110c-1 to 110c-4 of the bobbin 110.

For example, the first stopper 116a of the bobbin 110 may be disposed on one of the second side portions 110c-1 and 110c-2 to which the upper elastic member 150 is not coupled.

Furthermore, the second stopper 116b of the bobbin 110 may be disposed on one of the second side portions 110c-3 and 110c-4 to which the upper elastic member 150 is coupled.

The upper surface of the first stopper 116 of the bobbin 110 may be higher than the upper surface of the second stopper 116b. Since the upper surface of the first stopper 116 of the bobbin 110 is higher than the upper surface of the second stopper 116b, the first stopper 116a receives a first impact, and the second stopper 116b serves to stop movement of the cover member.

For example, the height difference between the upper surface of the first stopper 116a and the upper surface of the second stopper 116b of the bobbin 110 may be 10 μm-30 μm.

If the height difference between the upper surface of the first stopper 116a and the upper surface of the second stopper 116b of the bobbin 110 is less than 10 μm, there may be no height difference between the first stopper 116a and the second stopper 116b due to injection tolerance (about 5 μm) in formation of the stoppers of the bobbin 110.

Meanwhile, if the height difference exceeds 30 μm, only the first stopper 116a of the bobbin 110 may serve both as a shock absorber and as a stopper, but the second stopper 116b may not serve to stop the movement of the cover member.

For example, the crosswise length (L3) of the upper surface of the second stopper 116b may be greater than the crosswise length (L1) of the upper surface of the first stopper 116a (L3>L1). For example, the longitudinal length (L4) of the upper surface of the second stopper 116b may be equal to or less than the crosswise length (L2) of the upper surface of the first stopper 116a (L4≤L2). In another embodiment, the length (L3) may be equal to or less than the length (L1) (L3≤L1), or the length (L4) may be greater than the length (L2) (L4>L2).

Although FIG. 3A illustrates the embodiment in which one first stopper 116a is disposed at one second side portion 110c-1 or 110c-2 of the bobbin 110, the disclosure is not limited thereto. In another embodiment, two or more first stoppers may be formed at one second side portion 110c-1 or 110c-2 of the bobbin 110.

Furthermore, although FIG. 3A illustrates the embodiment in which three second stoppers 116b are disposed at another second side portion 110c-3 or 110c-4 of the bobbin 110, the disclosure is not limited thereto. In another embodiment, two or four or more second stoppers may be formed at the another one second side portion of the bobbin 110.

The bobbin 110 may include first couplers 113, which are intended to be coupled and secured to a first inner frame 151 of the upper elastic member 150. Although each of the first couplers 113 of the bobbin 110 shown in FIG. 3A is configured to have a protrusion shape, the disclosure is not limited thereto. In another embodiment, each of the first couplers 113 of the bobbin 110 may be configured to have a groove or flat surface shape.

For example, the first couplers 113 may be formed at the second side portions 110-3 of the bobbin 110, at which the second stoppers 116b of the bobbin 110 are disposed.

Referring to FIG. 3B, the bobbin 110 may include second couplers 117, which are intended to be coupled and secured to the lower elastic member 160. Although each of the second couplers 117 of the bobbin 110 shown in FIG. 3B is configured to have a protrusion shape, the disclosure is not limited thereto. In another embodiment, each of the second couplers of the bobbin 110 may be configured to have a groove or flat surface shape.

For example, the second couplers 117 may be formed at the lower surfaces, the lower portions or the lower ends of the first side portions 110b-1 to 110b-4 of the bobbin 110 adjacent to the second side portions 110c-1 and 110c-2 of the bobbin 110.

The bobbin 110 may include at least one stopper 118a and at least one stopper 118b projecting from the lower portion, the lower end or the lower surface of the bobbin 110.

The at least one stopper 118a and the at least one stopper 118b of the bobbin 110 may serve to prevent the lower surface of the bobbin 110 from directly colliding with the upper surface of the base 210 even when the bobbin 110 is moved beyond a specified range due to an external impact or the like while the bobbin 110 is moved in the first direction for auto-focusing function.

For example, the bobbin 110 may be provided at the lower portion, the lower end or the lower surface thereof with a third stopper 118a and a fourth stopper 119b, which have different heights.

The third stopper 118a of the bobbin 110 may be disposed at at least one of the second side portions 110c-1 to 110c-4 of the bobbin 110, and the fourth stopper 118b of the bobbin 110 may be disposed at another one of the first side portions 110c-1 to 110c-4 of the bobbin 110.

For example, the third stopper 118a of the bobbin 110 may be disposed at one of the second side portions 110c-3 and 110c-4 of the bobbin 110.

For example, the fourth stopper 118b of the bobbin 110 may be disposed at the one among the first side portions 110b-1 to 110b-4 of the bobbin 110 to which the lower elastic member 160 is coupled.

The lower surface of the third stopper 118a of the bobbin 110 may be lower than the lower surface of the fourth stopper 118b of the bobbin 110. Since the lower surface of the third stopper 118a of the bobbin 110 is lower than the lower surface of the fourth stopper 118b of the bobbin 110, the third stopper 118a receives a first impact, and the second stopper 118b serves to stop the movement of the bobbin.

For example, the height difference between the lower surface of the third stopper 118a and the lower surface of the fourth stopper 118b of the bobbin 110 may be 10 μm-30 μm.

If the height difference between the lower surface of the third stopper 118a and the lower surface of the fourth stopper 118b of the bobbin 110 is less than 10 μm, there may be no height difference between the third stopper 118a and the fourth stopper 118b due to injection tolerance (about 5 μm) in the formation of the stoppers of the bobbin 110.

Meanwhile, if the height difference between the lower surface of the third stopper 118a and the lower surface of the fourth stopper 118b of the bobbin 110 exceeds 30 μm, the third stopper 118a of the bobbin 110 may serve both as a shock absorber and as a stopper but the fourth stopper 118b may not serve to stop the movement of the bobbin.

For example, the crosswise length (L7) of the lower surface of the fourth stopper 118b may be less than the crosswise length (L5) of the lower surface of the third stopper 118a (L7>L5). For example, the longitudinal length (L6) of the lower surface of the third stopper 118a may be greater than the crosswise length (L8) of the lower surface of the fourth stopper 118b (L6>L8). In another embodiment, the length (L7) may be equal to or less than the length (L5) (L7≤L5), or the length (L6) may be equal to or less than the length (L8) (L6≤L8).

Although FIG. 3B illustrates the embodiment in which three third stoppers 118a are disposed at one second side portion 110c-3 or 110c-4 of the bobbin 110, the disclosure is not limited thereto. In another embodiment, two or more third stoppers may be formed at one second side portion 110c-3 or 110c-4 of the bobbin 110.

Furthermore, although FIG. 3B illustrates an embodiment in which one fourth stopper 118b is disposed at each of the first side portion 110b-1 to 110b-4 of the bobbin 110, the disclosure is not limited thereto. In another embodiment, two or more fourth stoppers may be formed at each of the first side portions 110b-1 to 110b 4 of the bobbin 110.

The second side portions 110c-1 and 110c-2 of the bobbin 110, which face each other, may have formed in the outer surfaces thereof respective seating groove 105, in which the first and second coil units 120-1 and 120-2 are seated, inserted or disposed. The seating grooves 105 of the bobbin 110 may be depressed from the outer surface of the second side portions 110c-1 and 110c-2, and may have shapes corresponding to those of the first and second coil units 120-1 and 120-2.

In order to hold the first and second coil units 120-1 and 120-2, each of the second side portions 110c-1 and 110c-2 may be provided on the outer surface thereof with at least one protrusion.

For example, the bobbin 110 may include protrusions 5a, 5b and 5c. For example, the protrusions 5a, 5b and 5c may project in directions perpendicular to the optical-axis direction OA and perpendicular to the outer surfaces of the second side portions 110c-1 and 110c-2.

For example, the protrusions 5a, 5b and 5c of the bobbin 110 may be formed in the seating grooves 105 or on the bottoms of the seating grooves 105.

For example, the outer surface of each of the second side portions 110c-1 and 110c-2 of the bobbin 110 may be provided with a first protrusion 5a, a second protrusion 5b and a third protrusion 5c, disposed between the first protrusion 5a and the second protrusion 5b. For example, although the projecting length of each of the first and second protrusions 5a and 5b may be greater than the projecting length of the third protrusion 5c, the disclosure is not limited thereto. In another embodiment, the projecting length of each of the first and second protrusions 5a and 5b may be equal to or less than the projecting length of the third protrusion 5c.

The first coil unit 120-1 may be configured to have a closed curve shape or a ring shape, which surrounds the protrusions 5a, 5b and 5c provided at the second side portion 110c-1 of the bobbin 110, and the second coil unit 120-2 may be configured to have a closed curve shape or a ring shape, which surrounds the protrusions 5a, 5b and 5c provided at the second side portion 110c-2 of the bobbin 110.

Although the protrusions 5a, 5b and 5c may be bobbin protrusions, which are intended to allow the first and second coil units 120-1 and 120-2 to be directly wound therearound, the disclosure is not limited thereto. The protrusions 5a, 5b and 5c may be mounting protrusions (or coupling protrusions), which are intended to allow the first and second coil units to be mounted or coupled thereto.

In another embodiment, the bobbin 110 may not include the protrusions 5a, 5b and 5c provided in the seating groove 105.

In order to suppress separation of the first and second coil units 120-1 and 120-2 and to guide the two ends of each of the first and second coil units 120-1 and 120-2 when the first and second coil units 120-1 and 120-2 are connected to the lower elastic units 160a and 106b, the lower surface, the lower portion or the lower end of each of the second side portions 110c-1 and 110c-2 of the bobbin 110 may have formed therein at least one of guide grooves 16a and 16b.

The bobbin 110 may include a projection 115b projecting from the outer surface of the first side portion 110b-1 thereof. The projection 115b may be positioned adjacent to the second side portion 110c-3 of the bobbin 110.

The projection 115b may be positioned closer to the second side portion 110c-3 of the bobbin 110 at which the first and second coil units 120-1 and 120-2 are not disposed than to the second side portion 110c-1 of the bobbin 110, at which the first coil unit 120-1 is disposed.

The projection 115b of the bobbin 110 may include a seating groove 180a in which the sensing magnet 180 is seated, inserted, secured or disposed.

The seating groove 180a in the bobbin 110 may be depressed from the upper surface of the projection 115b of the bobbin 110, and an opening may be formed in the upper surface, the lower surface or the outer surface of the projection 115b.

For example, the seating groove 180a in the bobbin 110 may be formed in the upper surface of the projection 115b of the bobbin 110 so as to have a concave shape.

Referring to FIG. 3C, for example, the seating groove 180a in the bobbin 110 may have a first opening 18a formed in the upper surface of the projection 115b and a second opening 18b formed in the outer surface of the projection 115b. For example, the outer surface of the projection 115b may be the surface of the projection 115b that faces the position sensor 170.

Figure 4A:
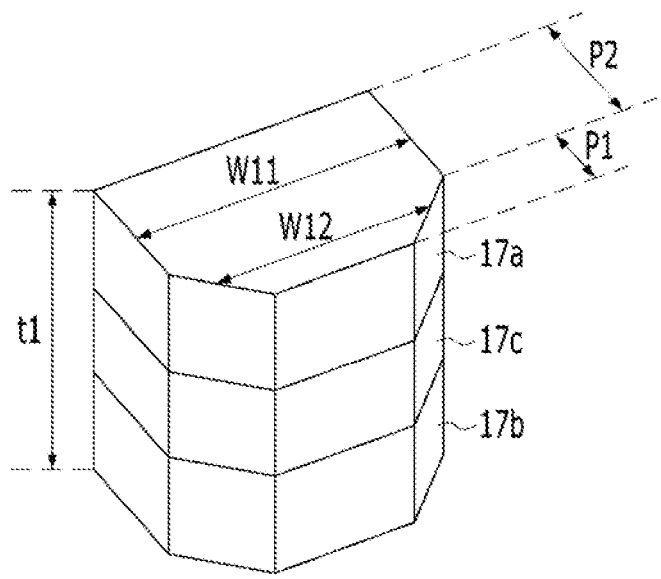
FIG. 4A is an enlarged view of the sensing magnet shown in FIG. 1.
Figure 4B:
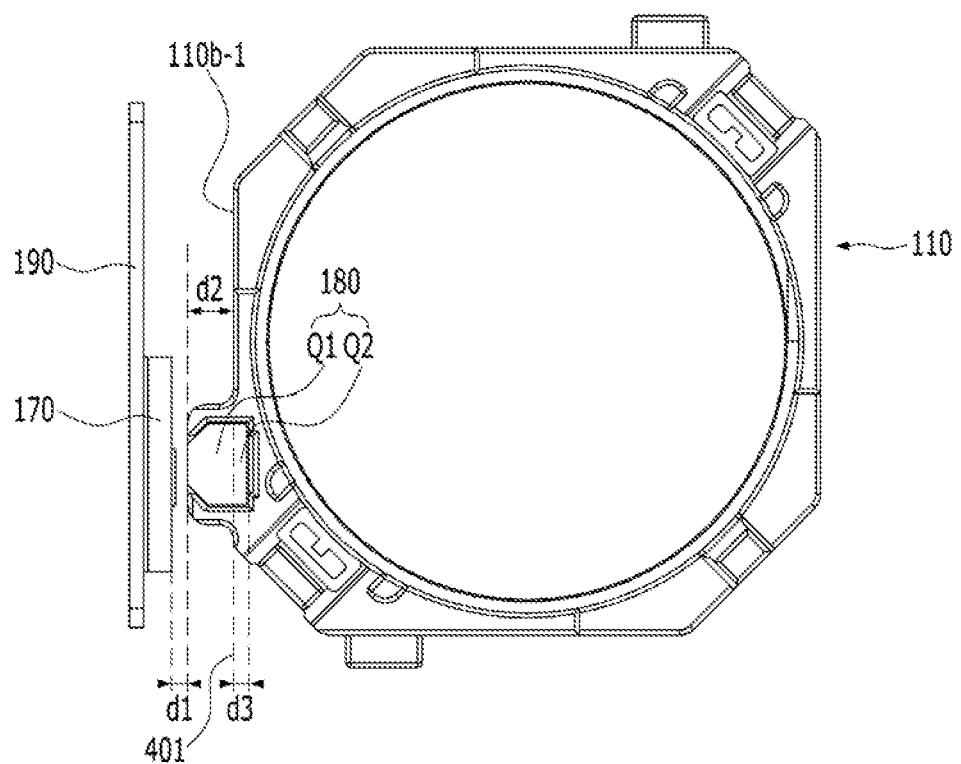
FIG. 4B illustrates the distance between the sensing magnet and a position sensor.

When viewed in the plan view of FIG. 4B, for example, the vertical length of the right portion of the first opening 18a may be greater than the vertical length of the second opening 18b.

For example, the seating groove 180a in the bobbin 110 may include a bottom surface 43 and first to fifth side surfaces 44a to 44e.

The bottom surface 43 of the seating groove 180a may be a surface that faces the lower surface of the sensing magnet 180. The first side surface 44a of the seating groove 180a may be a surface that faces a second surface (or a first side surface) of a second portion P2 of the sensing magnet 180.

A second side surface 44b of the seating groove 180a may be positioned along one edge of the first side surface 44a, and may face a second side surface of the second portion P2 of the sensing magnet 180.

A third side surface 44c of the seating groove 180a may be positioned at the other side of the first side surface 44a, and may face a third side surface of the second portion P2 of the sensing magnet 180. The second side surface 44b and the third side surface 44c of the seating groove 180a may face each other.

A fourth side surface 44d of the seating groove 180a may adjoin one edge of the second side surface 44b, and a fifth side surface 44e of the seating groove 180a may adjoin one edge of the third side surface 44c.

The included angle θ11 between the fourth side surface and the second side surface 44b of the seating groove 180a may be an obtuse angle, and the included angle θ12 between the fourth side surface 44e and the third side surface 44c of the seating groove 180a may be an obtuse angle. For example, although the included angle θ11 may be the same as the included angle θ12, the disclosure is not limited thereto. In another embodiment, the included angle θ11 may be different from the included angle θ12.

Since the first to fifth side surfaces 44a to 44e of the seating groove 180a are configured so as to surround the sensing magnet 180, it is possible to prevent the sensing magnet 180 from being easily separated from the bobbin 110 in the event of an external impact.

The second opening 18b may be disposed between the fourth side surface 44d and the fifth side surface 44e of the seating groove 180a. For example, the second opening 18b may correspond to or face a first surface (or a first side surface) of the first portion P1 of the sensing magnet 180, and may expose the first surface (or the first side surface) of the first portion P1 of the sensing magnet 180.

The fourth side surface 44d of the seating groove 180a may face a second side surface of the first portion P1, and the fifth side surface 44e of the seating groove 180a may face the third side surface of the first portion P2 of the sensing magnet 180.

Although an adhesive 46 may be disposed on the bottom surface 43 of the seating groove 180a, the disclosure is not limited thereto. The adhesive may further be disposed on at least one of the first to fifth side surfaces 44a to 44e of the seating groove 180a.

The seating groove 180a in the bobbin 110 may be provided with an adhesive injection groove 42 through which an adhesive is injected. For example, the adhesive injection groove 42 may have a shape depressed from the upper surface of the bobbin 110, and may be formed in the upper end of the first sides surface 44a of the seating groove 180a.

By virtue of the adhesive 46, the sensing magnet 180 may be fixed or coupled to the seating groove 180a of the projection 115b of the bobbin 110.

A first distance H1 may be the distance from the bottom surface 43 of the seating groove 180a to the bottom of the adhesive injection groove 42, and a second distance H2 may be the distance from the bottom of the adhesive injection groove 42 to the upper surface of the bobbin 110.

For example, the sum of the first distance H1 and the second distance H2 may be the same as the distance from the bottom surface of the seating groove 180a to the upper surface of the bobbin 110.

Assuming that the distance from the bottom surface 43 of the seating groove 180a to the upper surface of the bobbin 110 is 100%, the first distance H1 may be 50%-95%, and the second distance H2 may be 5%-50%.

When the first distance H1 is less than 50%, the adhesive force between the seating groove 180a and the sensing magnet 180 may become weak. Meanwhile, when the first distance H1 is greater than 95%, adhesive may not be easily injected into the seating groove 180a.

The seating groove 180a of the bobbin 110 may have a shape that corresponds to or coincides with that of the sensing magnet 180.

In another embodiment, the first side portion 110b-3 of the bobbin 110 may have a seating groove in which a balancing magnet is seated.

In another embodiment, the seating groove 180a in the bobbin 110 may further have an opening formed in the lower surface thereof. For example, the bottom surface of the seating groove 180a may be open or may have an opening therein.

As described above, since the sensing magnet 180 is disposed in the seating groove 180a in the projection 115b of the bobbin 110 and is coupled to the bobbin 110 by means of the adhesive 46, it is possible to increase the coupling force between the bobbin 110 and the sensing magnet 180, and it is possible to prevent the sensing magnet 180 from being separated or detached from the bobbin 110 in the event of an external impact.

Furthermore, since the sensing magnet 180 is disposed so as to project from the outer surface of the bobbin 110, it is possible to dispose the sensing magnet 180 close to the position sensor 170 and thus to increase the output VH of the position sensor 170 (for example, a hall sensor 61). The increase in the output of the position sensor 170 may improve the sensitivity of the position sensor 170, and may increase the range of output of the position sensor 170.

The linear range of output of the position sensor 170 may be increased with displacement of the bobbin 110. Consequently, it is possible to easily and accurately perform calibration for displacement of the bobbin 110.

In other words, according to the embodiment, it is possible to reduce the distance between the sensing magnet 180 and the position sensor 170, and thus it is possible to increase the output and the sensitivity of the position sensor 170.

Next, the coil 120 will be described.

The coil 120 may include the first coil unit 120-1 disposed at the second side portion 110c-1 of the bobbin 110 and the second coil unit 120-2 disposed at the second side portion 110c-2 of the bobbin 110.

The first coil unit 120-1 may be disposed at the second side portion 110c-1 of the bobbin 110 so as to correspond to or face the first magnet 130-1, and the second coil unit 120-2 may be disposed at the second side portion 110c-2 of the bobbin 110 so as to correspond to or face the second magnet 130-2.

The first coil unit 120-1 and the second coil unit 120-2 may be AF operation coils configured to move the bobbin 110 in the optical-axis direction by electromagnetic interaction between the first and second magnets 130-1 and 130-2.

The first coil unit 120-1 may be disposed at the second side portion 110c-1 of the bobbin 110 so as to have a closed loop shape, and the second coil unit 120-2 may be disposed at the second side portion 110c-2 of the bobbin 110 so as to have a closed loop shape.

Although each of the first and second coil units 120-1 and 120-2 may be directly wound around the protrusions 5a, 5b and 5c of the second side portions 110c-1 and 110c-2 of the bobbin 110, the disclosure is not limited thereto. In another embodiment, each of the first and second coil units 120-1 and 120-2 may be coupled to the protrusions 5a, 5b and 5c of the bobbin 110 via a coil block having a coil ring or angled ring shape.

For example, each of the first and second coil units 120-1 may be configured to have a ring shape, which is wound clockwise or counterclockwise about an axis perpendicular to the outer surface of each of the second side portions 110c-1 and 110c-2 of the bobbin 110.

The first coil unit 120-1 and the second coil unit 120-2 may be conductively connected to each other in series. For example, the first coil unit 120-1 and the second coil unit 120-2 may be conductively connected to each other in series via a third lower elastic unit 160c.

In order to create an electromagnetic force as a result of the interaction between the first and second magnets 130-1 and 130-2, electric power or a drive signal may be supplied to the coil 120. The power or the drive signal supplied to the coil 120 may be a DC signal, an AC signal or a signal containing both DC and AC components, and may be of a voltage type or a current type.

When a drive signal (for example, a drive current) is supplied to the first and second coil units 120-1 and 120-2, an electromagnetic force may be created by the electromagnetic interaction between the first and second coil units 120-1 and 120-2 and the first and second magnets 130-1 and 130-2, and the bobbin 110 may be moved in the optical-axis direction OA by the created electromagnetic force.

In this embodiment, the bobbin 110 may be moved upwards or downwards from the initial position of the AF operation unit, which is referred to as bidirectional driving of the AF operation unit.

For example, the upward stroke of the lens moving apparatus according to the embodiment from the initial position of the AF operation unit may be higher than the downward stroke of the lens moving apparatus from the initial position of the AF operation unit. For example, based on the initial position of the AF operation unit, the upward stroke of the lens moving apparatus according to the embodiment may be 160 μm~260 μm, and the downward stroke of the lens moving apparatus may be 75 μm~175 μm.

In another embodiment, the bobbin 110 may be moved upwards from the initial position of the AF operation unit, which is referred to as unidirectional driving of the AF operation unit.

At the initial position of the AF operation unit, the first coil unit 120-1 and the first magnet 130-1 may correspond to, face or overlap each other and the second coil unit 120-2 and the second magnet 130-2 may correspond to, face or overlap each other in a direction parallel to a line that is perpendicular to the optical axis OA and extends along the optical axis.

For example, the AF operation unit may include the bobbin 110 and the components (for example, the coil 120 and the sensing magnet 180) coupled to the bobbin 110.

The initial position of the AF operation unit (for example, the bobbin 110) may be the original position of the AF operation unit in the state in which no electric power is applied to the coil 120 or the position at which the AF operation unit is located as the result of the upper and lower elastic members 150 and 160 being elastically deformed due only to the weight of the AF operation unit.

In addition, the initial position of the AF operation unit may be the position at which the AF operation unit is located when gravity acts in the direction from the bobbin 110 to the base 210 or when gravity acts in the direction from the base 210 to the bobbin 110.

By controlling the intensity and/or polarity (for example, the direction in which current flows) of a drive signal applied to the first and second coil units 120-1 and 120-2 and thus controlling the intensity and/or direction of the electromagnetic force resulting from the interaction between the first and second coil units 120-1 and 120-2 and the first and second magnets 130-1 and 130-2, it is possible to control the movement of the AF operation unit and it is thus possible to perform an auto-focusing function.

Next, the sensing magnet 180 will be described.

The sensing magnet 180 may be disposed at the bobbin 110 so as to face the position sensor 170, and may provide a magnetic field for detecting the position sensor 170.

For example, the sensing magnet 180 may be disposed at the first side portion 110b-1 of the bobbin 110 adjacent to the second side portion 110b-4 of the bobbin 110.

For example, in order to reduce magnetic field interference with the first magnet 130-1, the sensing magnet 180 may be disposed closer to the second side portion 110c-4 of the bobbin 110 than to the second side portion 110c-1 of the bobbin 110.

The sensing magnet 180 may be disposed in the seating groove 180a in the bobbin 110 so as to face the position sensor 170.

Although the sensing magnet 180, which faces the position sensor 170, may be exposed at a portion of one surface thereof from the seating groove 180a, the disclosure is not limited thereto. In another embodiment, the sensing magnet 180, which faces the position sensor 170, may not be exposed at a portion of one surface thereof from the seating groove 180a.

FIG. 4A is an enlarged view of the sensing magnet 180 shown in FIG. 1. FIG. 4B illustrates the distance between the sensing magnet 180 and the position sensor 170.

Referring to FIG. 4A, the sensing magnet 180 disposed at the bobbin 110 may be configured such that the interface between the N pole and the S pole is parallel to a direction perpendicular to the optical axis OA. For example, although the surfaces of the sensing magnet 180 that face the position sensor 170 may be divided into the N pole and the S pole, the disclosure is not limited thereto. In another embodiment, the interface between the N pole and the S pole of the sensing magnet 180 disposed at the bobbin 110 may be parallel to the optical axis OA.

The sensing magnet 180 may be a bipolar magnetized magnet, which has two N poles and two S poles, or a tetrapolar magnetized magnet.

For example, the sensing magnet 180 may include a first magnet part 17a, a second magnet part 17b and a partition wall 17c disposed between the first magnet part 17a and the second magnet part 17b. The partition wall 17c may also be alternatively referred to as "nonmagnetic partition wall".

The first magnet part 17a may include an N pole, an S pole and a first interface portion between the N pole and the S pole. The first interface portion may be a portion that has substantially no magnetism and has a zone having almost no polarity, and may be a portion which is naturally formed in order to form a magnet composed of one N pole and one S pole.

The second magnet part 17b may include an N pole, an S pole and a second interface portion between the N pole and the S pole. The second interface portion may be a portion that has substantially no magnetism and has a zone having almost no polarity, and may be a portion that is naturally formed in order to form a magnet composed of one N pole and one S pole.

The partition wall 17c may separate or isolate the first magnet part 17a and the second magnet part 17b from each other, and may be a portion having substantially no magnetism or polarity. For example, the partition wall may be a nonmagnetic material, air or the like. The nonmagnetic partition wall may be considered a "neutral zone" or a "neutral portion".

The partition wall 17c may be a portion that is artificially formed when the first magnet part 17a and the second magnet part 17b are magnetized, and the width of the partition wall 17c may be larger than the width of the first interface portion (or the width of the second interface portion). Here, the width of the partition wall 17c may be the length of the partition wall 17c in a direction toward the second magnet part 17b from the first magnet part 17a. The width of the first interface portion (or the second interface portion) may be the length of each of the first and second magnet parts 17a and 17b toward the S pole from the N pole.

The length t1 of the sensing magnet 180 disposed at the bobbin 110 in the optical-axis direction may be greater than the length of the sensing magnet 180 in a direction perpendicular to the optical axis. The reason for this is to prevent an increase in the size of the bobbin in a direction perpendicular to the optical axis due to mounting of the sensing magnet and to prevent a decrease in the intensity of the magnetic field of the sensing magnet.

At least a portion of the sensing magnet 180 may decrease in width in a direction toward a first side portion 141-1 of the housing 140 from the first side portion 110b-1 of the bobbin 110.

For example, the width of the outer side of the sensing magnet 180 may be less than the width of the inner side of the sensing magnet 180.

For example, the sensing magnet 180 may include a first portion P1, including a first surface that faces the position sensor 170, and a second portion P2, including a second surface opposite the first surface.

For example, the first portion P1 of the sensing magnet 180 may be positioned between the position sensor 170 and the second portion P2 of the sensing magnet 180.

For example, the width W12 of the first portion P1 of the sensing magnet 180 may decrease in a direction toward the first side portion 141-1 of the housing 140 from the first side portion 110b-1 of the bobbin 110. For example, although the width W11 of the second portion P2 of the sensing magnet 180 may be uniform, the disclosure is not limited thereto. In another embodiment, the width W11 of the second portion P2 of the sensing magnet 180 may decrease in a direction toward the first side portion 141-1 of the housing 140 from the first side portion 110b-1 of the bobbin 110.

In a further embodiment, the width W11 of the second portion P2 of the sensing magnet 180 may decrease while the width of the first portion P1 of the sensing magnet 180 may be uniform in a direction toward the first side portion 141-1 of the housing 140 from the first side portion 110b-1 of the bobbin 110.

Here, the width of the sensing magnet 180 may be the length of the sensing magnet 180 in a direction perpendicular to the direction toward the second surface from the first surface of the sensing magnet 180. Alternatively, the width of the sensing magnet 180 may be the crosswise length of the sensing magnet 180 disposed at the bobbin 110.

The length of the first portion P1 of the sensing magnet 180 may be greater than the length of the second portion P2 of the sensing magnet 180. Here, the length of the first portion P1 and the length of the second portion P2 may be the length in a direction toward the second surface from the first surface of the sensing magnet 180 or in a direction perpendicular to the transverse direction or the width direction of the sensing magnet 180.

For example, the ratio of the length of the first portion P1 of the sensing magnet 180 to the length of the second portion P2 of the sensing magnet 180 may be 1:1-1:5. Alternatively, the ratio of the length of the first portion P1 of the sensing magnet 180 to the length of the second portion P2 of the sensing magnet 180 may be 1:1.5-1:2.

If the value resulting from division of the length of the second portion P2 of the sensing magnet 180 by the length of the first portion P1 of the sensing magnet 180 is less than 1, the intensity of the magnetic field of the sensing magnet 180 may be lowered, and thus the output of the position sensor 170 may be reduced, thereby causing malfunction of AF feedback operation.

Meanwhile, if the value resulting from division of the length of the second portion P2 of the sensing magnet 180 by the length of the first portion P1 of the sensing magnet 180 is greater than 5, the coupling force between the sensing magnet 180 and the seating groove may be reduced, and the magnetic field interference between the magnet 130 and the sensing magnet 180 may be increased.

The seating groove 180a formed in the bobbin 110 may have a shape corresponding to the shape of the sensing magnet 180, which is shown in FIG. 4. Since the sensing magnet 180 has a structure, a portion of which decreases in width, it is possible to prevent separation or withdrawal of the sensing magnet 180 from the seating groove 105.

Furthermore, since the sensing magnet 180 has the shape shown in FIG. 4, it is possible to reduce the effect caused by the magnetic field interference with the first and second magnets 130-1 and 130-2 and it is thus possible to improve the accuracy of AF operation.

When magnetic field interference occurs between the sensing magnet and the drive magnet, the bobbin may be tilted. This may introduce an error into the voltage output from the AF position sensor, thus causing malfunction of AF feedback operation.

Figure 12A:
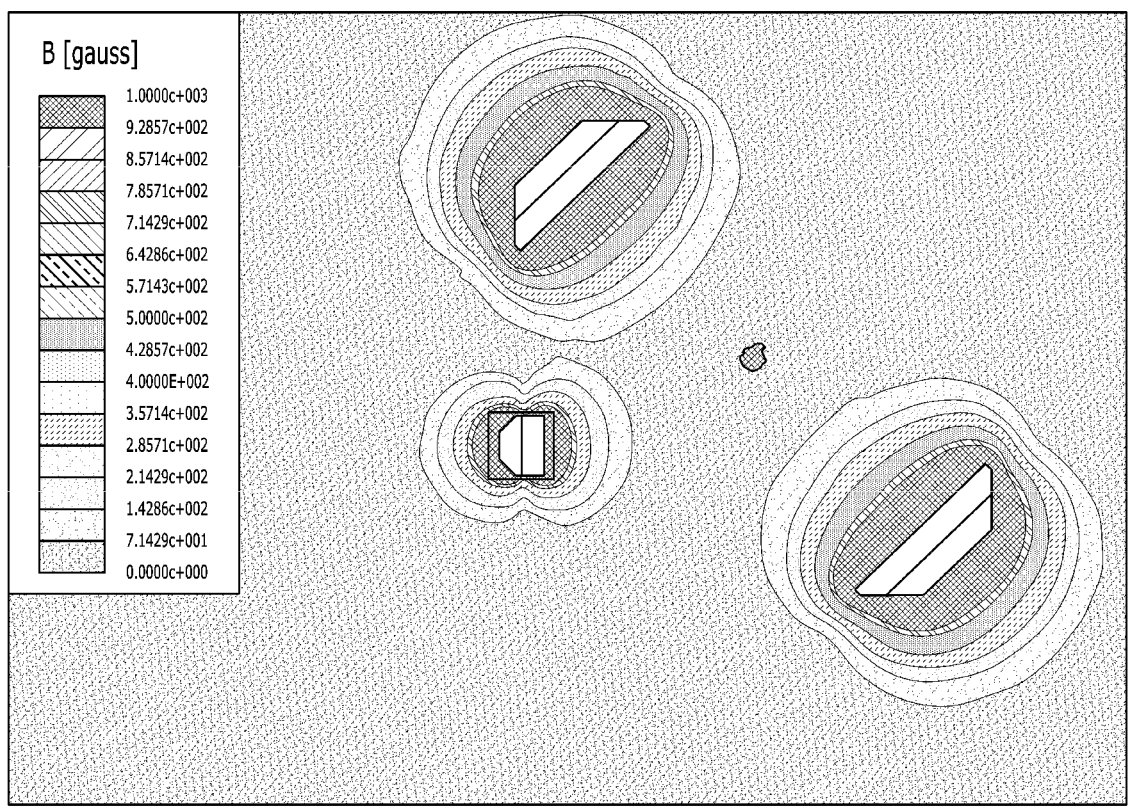
FIG. 12A illustrates a simulation result showing the intensity of the magnetic field interference between the sensing magnet and the magnet according to the embodiment.

FIG. 12A illustrates a simulation result showing the intensity of the magnetic field interference between the sensing magnet 180 and the magnet 130 according to the embodiment.

In FIG. 12A, the intensity of the magnetic flux of each of the sensing magnet 180 and the magnet 130 is indicated by a color. In FIG. 12A, the region indicated in red has the maximum magnetic flux, and the region indicated in blue has the minimum magnetic flux.

In FIG. 12A, the length t1 of the sensing magnet 180 in the optical-axis direction may be 1 mm, and the variation in the displacement of the bobbin 110 may be 0.0003 mm according to the simulation result.

Figure 12B:
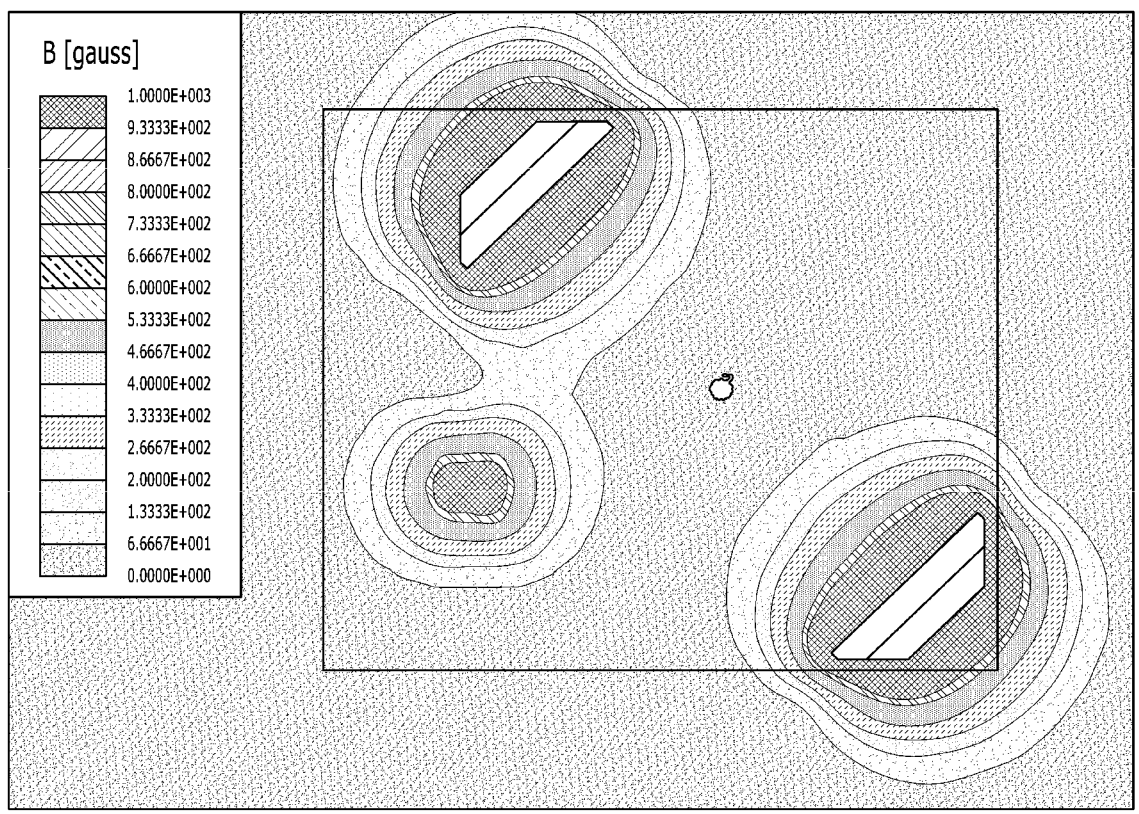
FIG. 12B illustrates a simulation result showing the intensity of the magnetic field interference between the first sensing magnet, which is a monopolar magnetized magnet, and the magnet.
Figure 12C:
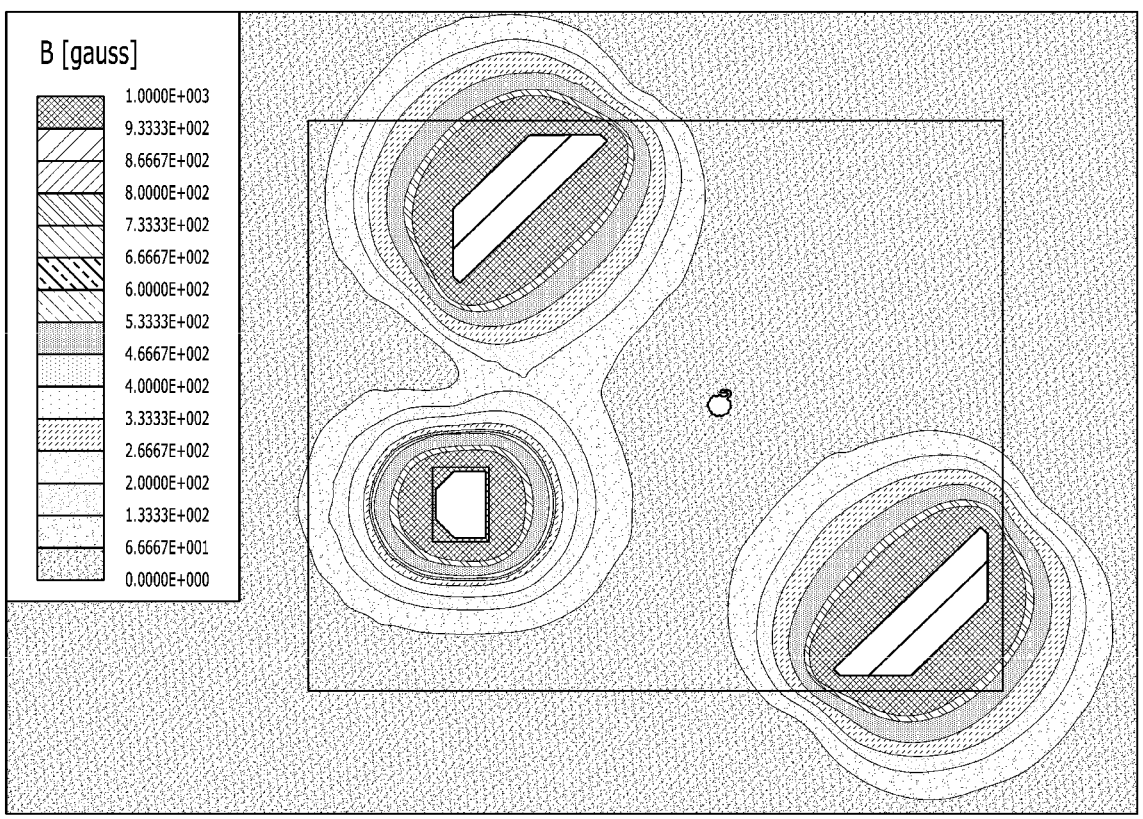
FIG. 12C illustrates a simulation result showing the intensity of the magnetic field interference between the second sensing magnet, which is a monopolar magnetized magnet, and the magnet.

FIG. 12B illustrates a simulation result showing the intensity of the magnetic field interference between the first sensing magnet, which is a monopolar magnetized magnet, and the magnet 130. FIG. 12C illustrates a simulation result showing the intensity of the magnetic field interference between the second sensing magnet, which is a monopolar magnetized magnet, and the magnet 130.

The first sensing magnet shown in FIG. 12B is a monopolar magnet, which has a length of 0.35 mm in the optical-axis direction, and the second sensing magnet shown in FIG. 12C is a monopolar magnet, which has a length of 0.7 mm in the optical-axis direction.

The simulation condition in FIGS. 12B and 12C is the same as the simulation condition in FIG. 12A except that the sensing magnet is replaced with the first sensing magnet, which is a monopolar magnetized magnet, or the second sensing magnet, which is a monopolar magnetized magnet.

It will be appreciated that the intensity of the magnetic field interference in FIGS. 12B and 12C is higher than the intensity of the magnetic field interference in FIG. 12A.

The variation in the displacement of the bobbin is 0.0015 mm according to the simulation result in FIG. 12B, and the variation in the displacement of the bobbin is 0.0026 mm according to the simulation result in FIG. 12C.

Because the sensing magnet 180 is a bipolar magnetized magnet, it is possible to reduce the magnetic field interference with the magnet 130, compared to the case in which the sensing magnet is a monopolar magnetized magnet. Consequently, it is possible to prevent the bobbin 110 from being tilted due to the magnetic field interference, and to perform an accurate AF feedback operation.

The sensing magnet 180 may be moved together with the bobbin 110 in the optical-axis direction, and the position sensor 170 may detect the intensity or magnetic force of the magnetic field of the sensing magnet 180, which is moved in the optical-axis direction, and may output an output signal corresponding to the result of the detection.

For example, in accordance with displacement of the bobbin 110 in the optical-axis direction, the intensity or magnetic force of the magnetic field detected by the position sensor 170 may vary. Consequently, the position sensor 170 may output an output signal proportional to the detected intensity of the magnetic field, and the displacement of the bobbin 110 in the optical-axis direction may be detected using the output signal from the position sensor 170.

Because the sensing magnet 180 is a bipolar magnetized magnet, it is possible to increase the range of output of the position sensor 170. Consequently, it is possible to easily and accurately calibrate the output of the position sensor 170 for displacement of the bobbin 110.

Figure 13:
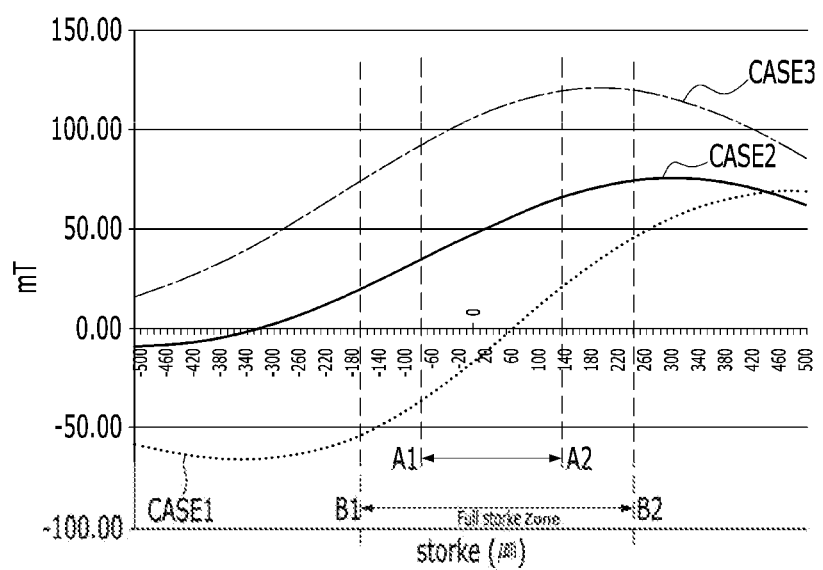
FIG. 13 illustrates the result of simulation of the output of the AF position sensor with the displacement of the bobbin.

FIG. 13 illustrates the result of simulation of the output of the AF position sensor with the displacement of the bobbin. In FIG. 13, the X axis indicates the stroke, which is the displacement of the bobbin, and the Y axis indicate the intensity of the magnetic field received by the AF position sensor. The output of the AF position sensor may be proportional to the intensity of the magnetic field received by the AF position sensor. Accordingly, FIG. 13 represents a result similar or identical to the relationship between the stroke of the bobbin and the output of the position sensor.

Here, CASE1 indicates the simulation result according to the embodiment shown in FIG. 12A, CASE2 indicates the simulation result according to the embodiment shown in FIG. 12B, and CASE3 indicates the simulation result according to the embodiment shown in FIG. 12C.

Referring to FIG. 13, the slope of the output of the position sensor 170 in the range of the stroke of the bobbin corresponding to the range of AF operation of the bobbin is higher in CASE1 than in CASE 2 and CASE3.

For example, the range of the stroke (or displacement) of the bobbin corresponding to the range of AF operation of the bobbin may be from the infinite position A1 to the macro position A2.

Here, the infinite position may be the position or stroke of the bobbin corresponding to focusing on infinity, and the macro position may be the position or stroke of the bobbin corresponding to a close focus, that is, the macro mode.

In another embodiment, the range of AF operation of the bobbin may be the range from the minimum value B1 to the maximum value B2 within which the bobbin is physically movable.

For example, B1 may be the maximum displacement in which the bobbin is physically movable downwards. For example, B1 may be the displacement to the point at which the bobbin, which is moved downwards, is stopped by the lower stopper of the bobbin.

For example, B2 may be the maximum displacement that the bobbin is physically movable upwards. For example, B2 may be displacement to the point at which the bobbin, which is moved upwards, is stopped by the upper stopper of the bobbin.

In a further embodiment, the range of AF operation of the bobbin may be a range from a first reference value, which is greater than the minimum value by a predetermined value, to a second reference value, which is less than the maximum value by a predetermined value. For example, the first reference value may be a value between B1 and A1, and the second reference value may be a value between A2 and B2.

Because the plot of CASE1 has the greatest range of AF operation, the embodiment is able to improve the sensitivity of the position sensor, compared to CASE2 and CASE3.

Furthermore, because the plot of CASE1 has the greatest range of AF operation, it is possible to prevent the occurrence of calibration error during calibration of creating a displacement code value indicating the displacement of the bobbin using the output of the position sensor, compared to CASE2 and CASE3.

Because the range of operation of the bobbin includes both a positive value and a negative value with respect to the origin O, it is possible to increase the range of output of the position sensor 170.

In order to counteract the effect caused by the magnetic field interference of the sensing magnet 180 with the first and second magnets 130-1 and 130-2 and to establish the weight equilibrium with the sensing magnet 180, the lens moving apparatus 100 according to the embodiment may further include a balancing magnet disposed at the first side portion of the bobbin 110.

The description of the structure, the shape and the like of the above-described sensing magnet 180 may also be applied to the balancing magnet.

Referring to FIG. 4B, the sensing magnet 180 may project from the side surface (or the outer surface) of the first side portion 110b-1 of the bobbin 110.

For example, the sensing magnet 180 may project from the side surface (or the outer surface) of the first side portion 110b-1 of the bobbin 110 in a direction toward the first side portion 141-1 of the housing 140.

In other words, the sensing magnet 180 may be disposed so as to project from one side surface of the first side portion 110b-1 of the bobbin 110 in a direction toward the first side portion 141-1 of the housing 140 corresponding to the one surface of the first side portion 110b-1.

Here, the distance d2 that the sensing magnet 180 projects may be greater than the shortest distance d1 between the position sensor 170 and the sensing magnet 180. For example, d2 may be twice d1 or more.

For example, d1:d2 may be 1:2~1:5. Alternatively, d1:d2 may be 1:2.5~1:4. Alternatively, d1:d2 may be 1:2.5~1:2.7.

Because the expression d2>d1 is true, it is possible to position the sensing magnet 180 close the position sensor 170. Consequently, it is possible to increase the output of the position sensor 170, and thus to improve the sensitivity of the position sensor 170.

For example, d1 may be the distance between one surface of the positon sensor 170 and the surface of the sensing magnet 180 that is exposed through the second opening 18b in the projection 115b.

For example, the sensing magnet 180 may include a projecting portion Q1, which is positioned outside the reference line (or the reference plane) 401 that coincides with the side surface (or the outer surface) of the first side portion 110b-1 of the bobbin 110, and a non-projecting portion Q2, which is positioned inside the reference line 401.

Here, the outside of the reference line (or the reference plane) 401 may be the side at which the position sensor 170 is positioned, and the inside of the reference line 401 may be the side opposite the outside.

In other words, the projecting portion Q1 of the sensing magnet 180 may be a portion projecting from the side surface (or the outer surface) of the first side portion 110b-1 of the bobbin 110 in a direction toward the first side portion 141-1 of the housing 140.

For example, the length d2 of the projecting portion Q1 of the sensing magnet 180 may be greater than the length of the non-projecting portion d3 of the sensing magnet 180 (d2>d3). For example, d3 may be equal to or smaller than d1.

For example, d3:d2 may be 1:2~1:5. Alternatively, d3:d2 may be 1:2.5~1:4. Alternatively, d3:d2 may be 1:3~1:3.4.

The first portion P1 and a portion of the second portion P2 of the sensing magnet 180 shown in FIG. 4A may be the projecting portion Q1 of the sensing magnet 180 shown in FIG. 4B, and the remaining portion of the second portion P2 of the sensing magnet 180 shown in FIG. 4A may be the non-projecting portion of the sensing magnet 180 shown in FIG. 4B.

Referring to FIG. 4B, for example, the crosswise length of the projection 115b of the bobbin 110 may be less than the crosswise length of the position sensor 170.

Next, the housing 140 will be described.

The housing 140 accommodates therein the bobbin 110, and supports the first magnet 130-1, the second magnet 130-2, the position sensor 170, and the circuit board 190.

Figure 5A:
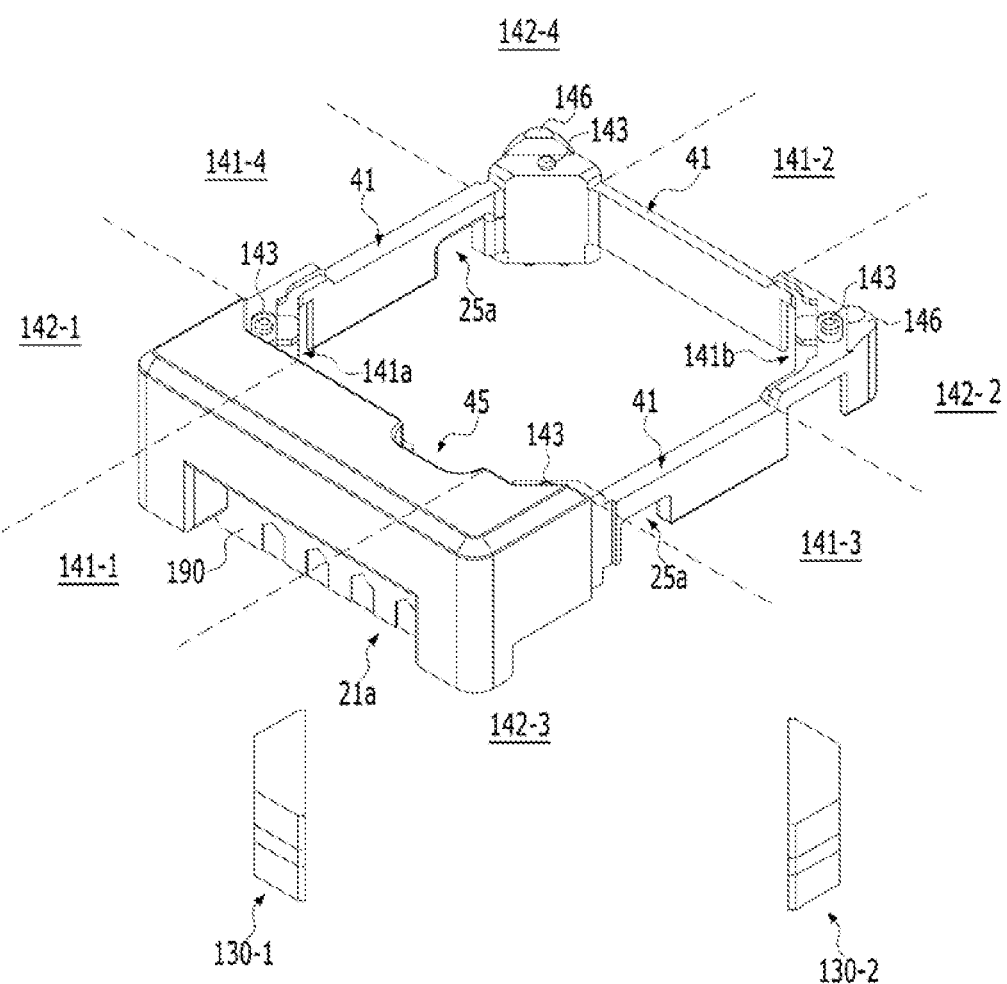
FIG. 5A is a perspective view of a housing.
Figure 5B:
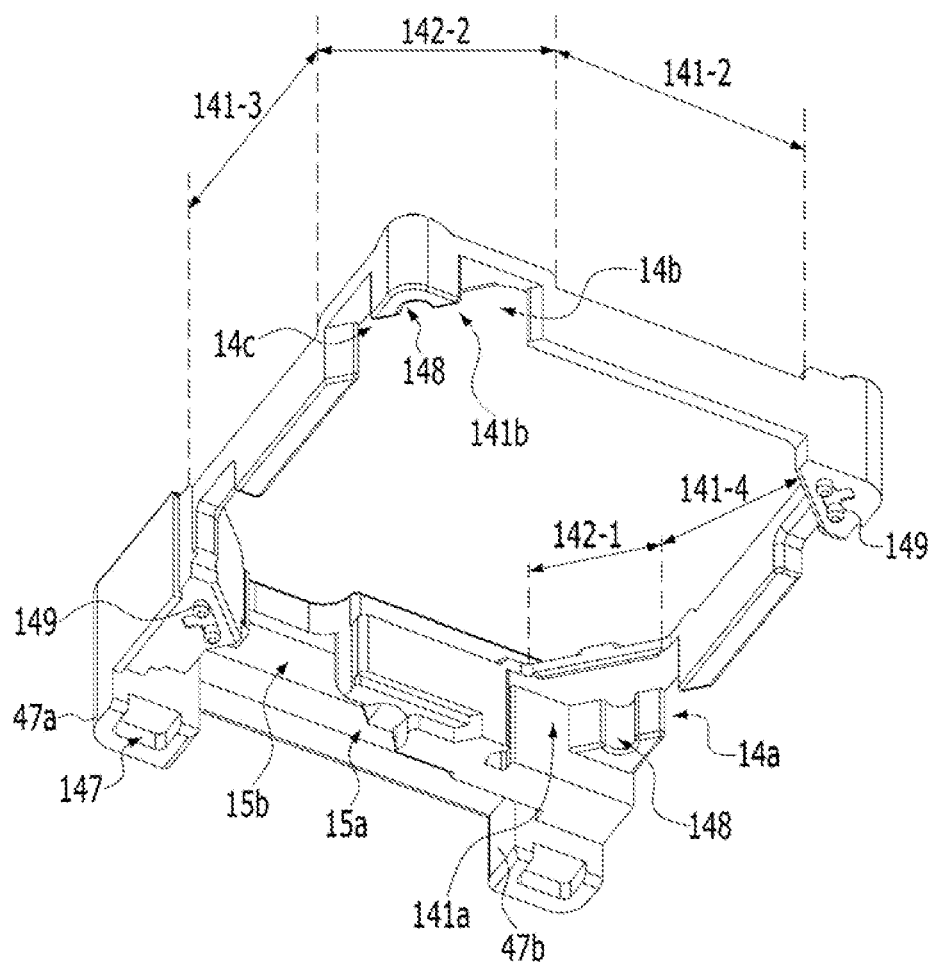
FIG. 5B is a perspective view of the housing and first and second magnets.
Figure 5C:
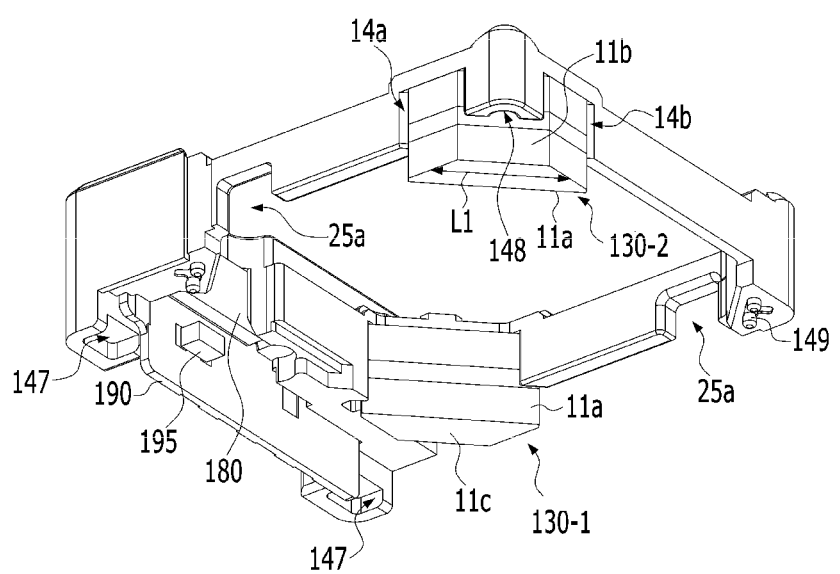
FIG. 5C is a perspective view of the housing, the first and second magnets, the position sensor, the circuit board, and the capacitor.
Figure 5D:
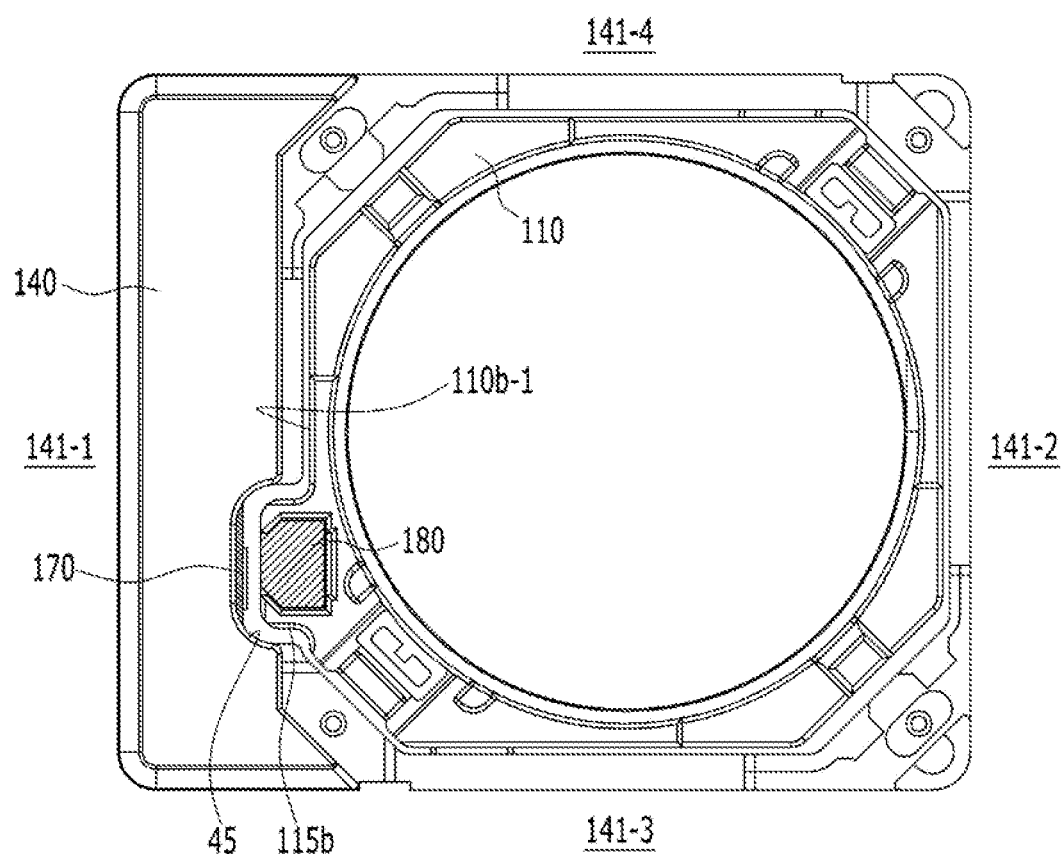
FIG. 5D is a plan view of the bobbin, the sensing magnet, the housing and the position sensor.

FIG. 5A is a perspective view of the housing 140. FIG. 5B is a perspective view illustrating the housing 140 and the first and second magnets 130-1 and 130-2. FIG. 5C is a perspective view of the housing 140, the first and second magnets 130-1 and 130-2, the position sensor 170, the circuit board 190, and the capacitor 195. FIG. 5D is a plan view of the bobbin 110, the sensing magnet 180 and the position sensor 170.

Referring to FIGS. 5A and 5B, the housing 140 may be configured to have a hollow column overall. For example, the housing 140 may have a polygonal (for example, a rectangular or octagonal) or circular bore, and the bore in the housing 140 may be a through hole, which is formed through the housing 140 in the optical-axis direction.

The housing 140 may include a plurality of side portions (or side walls) 141-1 to 141-4 and a plurality of corner portions 142-1 to 142-4.

For example, the housing may include first to fourth side portions 141-1 to 141-4, which are spaced apart from each other, and first to fourth corner portions 142-1 to 142-4, which are spaced apart from each other.

Each of the corner portions 142-1 to 142-4 of the housing 140 may be disposed or positioned between two adjacent side portions among the side portions 141-1 to 141-4 so as to connect the side portions to each other.

For example, the first and second corner portions 142-1 and 142-2 of the housing 140 may face each other, and the third corner portion 142-3 of the housing 140 may be adjacent to the first corner portion 142-1 of the housing 140, and may face the fourth corner portion 142-4.

For example, the corner portions 142-1 to 142-4 may be positioned at the corners of the housing 140, or may include the corner of the housing 140.

For example, although the number of side portions of the housing 140 is four and the number of corner portions is four, the disclosure is not limited thereto. The number of side portions or corner portions may be five or more.

Each of the side portions 141-1 to 141-4 of the housing 140 may be disposed parallel to a corresponding one of side plates of the cover member 300.

For example, the side portions 141-1 to 141-4 of the housing 140 may respectively correspond to the first side portions 110b-1 to 110b-4 of the bobbin 110, and the corner portions 142-1 to 142-4 of the housing 140 may respectively correspond to or face the second side portions 110c-1 to 110c-4 of the bobbin 110.

Among the corner portions 142-1 to 142-4 of the housing 140, two corner portions 141-1 and 141-2, which face each other, may have seating portions or reception portions 141a and 141b, respectively, for receiving the first and second magnets 130-1 and 130-2.

The seating portions 141a and 141b in the housing 140 may be respectively provided in the lower portions or lower ends of the two corner portions 142-1 and 141-2 of the housing 140, which face each other.

For example, the seating portion 141a in the housing 140 may be provided in the lower portion or the lower end of the first corner portion 142-1, and the seating portion 141b in the housing 140 may be provided in the lower portion or the lower end of the second corner portion 142-2 of the housing 140.

Although each of the seating portions 141a and 141b in the housing 140 may have a groove, for example, a recessed groove having a shape corresponding to a corresponding one of the first and second magnets 130-1 and 130-2, the disclosure is not limited thereto.

The seating portions 141a and 141b in the housing 140 may have openings (for example, 14a, 14b, 14c) formed in side portions (for example, 141-2, 141-3 and/or 141-4) of the housing 140 adjacent to the first and second corner portions 141-1 and 141-2 of the housing 140.

For example, the seating portion 141a in the housing 140 may have the opening 14a formed in the fourth side portion 141-4 of the housing 140 adjacent to the first corner portion 141-1 of the housing 140.

Although the seating portion 141a in the housing 140 has one opening formed in one side portion of the housing 140 in FIG. 5B, the disclosure is not limited thereto. In another embodiment, the seating portion 141a in the housing 140 may have two openings formed in two side portions of the housing adjacent to the first corner portion 141-1.

For example, the seating portion 141b in the housing 140 may have the opening 14b formed in the side portion 141-2 of the housing 140 adjacent to the second corner portion 141-2 of the housing 140 and the opening 14c formed in the side portion 141-3 of the housing 140 adjacent to the second corner portion 141-2 of the housing 140.

For example, one side surface of the first magnet 130-1 may be exposed through the opening 14a in the seating portion 141a at the outer surface of the fourth side portion 141-4 of the housing 140, and the other side surface of the first magnet 130-1 may be supported by a support surface of a support wall of the seating portion 141a.

For example, one side surface of the second magnet 130-2 may be exposed through the opening 14b in the seating portion 141b at the outer surface of the second side portion 141-2 of the housing 140, and the other side surface of the second magnet 130-2 may be exposed through the opening 14c in the seating portion 141b at the outer surface of the third side portion 141-3 of the housing 140.

Specifically, for the first magnet 130-1, the seating portion 141a in the first corner portion of the housing 140 may be provided only at one side thereof with the support wall or the support surface, and may be provided at the other side thereof with the support wall of the housing 140 or the side plate (or the wall) of the cover member 300.

Meanwhile, for the second magnet 130-2, the seating portion 141b in the second corner portion of the housing 140 may be provided at both sides thereof with the side plates (or walls) of the cover member 300 but no support wall or support surface of the housing 140.

Since the openings 14a, 14b and 14c of the seating portions 141a and 141b in the housing 140 enable the corner portions of the first and second magnets 130-1 and 130-2 to be supported by the side portions 141-1 to 141-3 of the housing in which the openings 14a, 14b and 14c are formed, it is possible to stably support the first and second magnets 130-1 and 130-2 using the seating portions 141 and 141b.

For example, each of the side surfaces of the seating portions 141a and 141b in the housing 140, which respectively face the first and second coil units 120-1 and 120-2, may have an opening therein, and a first surface 11a of each of the first and second magnets 130-1 and 130-2, which are respectively disposed in the seating portions 141a and 141b, may be exposed through the opening formed in each of the side surfaces of the seating portions 141a and 141b. In another embodiment, the side surface of each of the seating portions 141a and 141b may not have the opening therein.

For example, each of the lower surfaces of the seating portions 141a and 141b in the housing 140, which face the upper surface of the base 210, may have an opening therein, and each of the lower surfaces 11c of the first and second magnets 130-1 and 130-2, which are respectively disposed in the seating portions 141a and 141b, may be exposed through the opening formed in each of the lower surfaces of the seating portions 141a and 141b. Consequently, it is possible to easily mount the first and second magnets 130-1 and 130-2 in the seating portions 141a and 141b through the openings formed in the lower surfaces of the seating portions 141a and 141b in the housing 140.

In order to avoid spatial interference between the housing 140 and the first frame connector 153 of the upper elastic member 150, one or more (for example, 141-2 and 141-3 among the side portions 141-1 to 141-4 of the housing 140 may have escape grooves 41 therein. The escape grooves 41 in the housing 140 may be depressed from the upper surface of the housing 140.

The side portions of the housing 140 may have a grooved portion or a groove 25a corresponding to the projections 115a of the bobbin 110.

For example, the grooves 25a in the housing 140 may be formed in the lower portions, the lower ends or the lower surfaces of the side portions 141-3 and 141-4 of the housing 140.

For example, each of the grooves 25a in the housing 140 may have openings formed in both inner and outer surfaces of each of the side portions 141-3 and 141-4.

The groove 25a formed in the side portion 141-3 of the housing 140 may be adjacent to the corner portion 142-3 of the housing 140, and the groove 25a formed in the side portion 141-4 of the housing 140 may be adjacent to the corner portion 142-4 of the housing 140.

Since the projections 115a are disposed in the grooves in the housing 140, it is possible to prevent movement or rotation of the bobbin 110 when a thread is formed in the inner circumferential surface of the bobbin 110.

The first magnet 130-1 may be secured in the seating portion 141a using an adhesive such as epoxy, and the second magnet 130-2 may be secured in the seating portion 141b using an adhesive.

Each of the first and second corner portions 142-1 and 142-2 in the housing 140 may have a hole 148 through which an adhesive is injected and which prevents from the injected adhesive from overflowing.

The holes 148 in the housing 140 may be depressed from the lower surface of the first and second corner portions 142-1 and 142-2. For example, each of the holes 148 in the housing may be formed in one side surface of a corresponding one of the seating portions 141a and 141b in the housing 140.

For example, each of the holes 148 in the housing 140 may be formed in one side surface of a corresponding one of the seating portions 141a and 141b in the housing 140, which respectively face second surfaces 11b of the first and second magnets 130-1 and 130-2.

For example, each of the holes 148 may have an opening formed in a corresponding one of the seating portions 141a and 141b such that the hole 148 is connected to or communicates with the corresponding one of the seating portions 141a and 141b.

Although each of the holes 148 may be configured to have a semicircular section or a semi-elliptical section, the disclosure is not limited thereto. The hole 148 may be configured to have various shapes.

In order to prevent the upper surface of the housing 140 from directly colliding with the inner surface of the upper plate of the cover member 300, the upper portion, the upper end or the upper surface of the housing 140 may be provided with stoppers 146.

The stoppers 146 of the housing 140 may be disposed at at least one of the side portions 141-1 to 141-4 of the housing 140 and/or at at least one of corner portions 142-1 to 142-4 of the housing 140.

For example, the stoppers 146 may be disposed at the upper portion, the upper end or the upper surface of the corner portions 142-1 to 142-4 of the housing 140 and the first side portion 141-1 of the housing 140.

Furthermore, in order to prevent the lower surface of the housing 140 from colliding with the base 210, the housing 140 may include a stopper (not shown) projecting from the lower surface thereof.

The housing 140 have a first mounting groove 15a (or a groove or a seating groove) configured to receive the circuit board 190, and a second mounting groove 15b (or a groove or a seating groove) configured to receive the position sensor 170.

The first mounting groove 15a in the housing 140 may be formed in one (for example, 141-1) of the side portions of the housing 140. For example, the first mounting groove 15a in the housing 140 may be formed in the first side portion 141-1 of the housing 140, in the first corner portion 142-1, and in the third corner portion 142-3, which are adjacent to the first side portion 141-1.

In order to facilitate mounting of the circuit board 190, the first mounting groove 15a in the housing 140 may be a groove, which is depressed from the lower surface of the first side portion 141-1 of the housing 140, and may have a shape corresponding to or coinciding with the shape of the circuit board 190.

The second mounting groove 15b in the housing 140 may be formed in the inner surface of the first side portion 141-1 of the housing 140, and may have an opening communicating with the inside of the housing 140. The second mounting groove 15b in the housing 140 may be connected to or communicate with the first mounting groove 15a.

In order to facilitate mounting of the position sensor 170, the second mounting groove 15b in the housing 140 may have a shape depressed from the lower surface of the first side portion of the housing 140, and may be open at the lower portion thereof. Furthermore, in order to improve the sensitivity of the position sensor 170, the second mounting groove 15b in the housing 140 may have an opening, which is formed in the inner surface of the first side portion 141-1 of the housing 140. The second mounting groove 15b in the housing 140 may have a shape corresponding to or coinciding with the shape of the position sensor 170.

For example, the circuit board 190 may be secured in the first mounting groove 15a in the housing 140 using an adhesive member. Although the adhesive member may be epoxy or double-sided adhesive tape, the disclosure is not limited thereto.

The first side portion 141-1 of the housing 140 may have formed therein an escape groove 45 in order to avoid spatial interference with the projection 115b of the bobbin 110.

The escape groove 45 in the housing 140 may be connected to or communicate with the second mounting groove 15b in the housing 140. For example, at least a portion of the sensing magnet 180 is disposed in the escape groove 45 in the housing 140, and at least a portion of the position sensor 170 may be exposed through the escape groove 45 in the housing 140.

The upper portion, the upper end or the upper surface of the housing 140 may be provided with at least one coupler 143, which is coupled to the first outer frame 152 of the upper elastic member 150. The first coupler 143 of the housing 140 may be disposed at at least one of the side portions 141-1 to 141-4 and the corner portions 142-1 to 142-4 of the housing 140.

For example, the first coupler 140 may be disposed at the upper portion, the upper end or the upper surface of the first to fourth corner portions 142-1 to 142-4 of the housing 140.

The lower portion, the lower end or the lower surface of the housing 140 may be provided with a second coupler 149, which is coupled or secured to the second outer frame 162 of the lower elastic member 160.

For example, the second coupler 149 may be disposed at the lower portion, the lower end or the lower surface of each of the third corner portion 142-3 and the fourth corner portion 142-4 of the housing 140.

Although each of the first and second couplers 143 and 149 of the housing 140 may have a protrusion shape, the disclosure is not limited thereto. In another embodiment, the coupler may have a groove or flat surface shape.

For example, the first coupler 143 of the housing 140 may be coupled to the hole 152a in the first outer frame 152 of the upper elastic member 150 using an adhesive member (for example, solder) or heat fusion, and the second coupler 149 of the housing 140 may be coupled to the hole 162a in the second outer frame 162 of the lower elastic member 160 using an adhesive member (for example, solder) or heat fusion.

The lower portion, the lower end or the lower surface of each of the first corner portion 142-1 and the third corner portion 142-3 of the housing 140 may have therein a groove or a coupling groove 147, which is intended to be coupled to a projection 51 of the base 210.

Each of the first corner portion 142-1 and the third corner portion 142-3 of the housing 140 may include projections 47a and 47b, which project lower than the lower surfaces of the side portions 141-1 to 141-4 of the housing 140.

For example, the lower surfaces of the projections 47a and 47b may be lower than the lower surfaces 11c of the first and second magnets 130-1 and 130-2.

Furthermore, the lower surface of the projection 47a of the housing 140 may be lower than the lower surface of each of the second corner portion 142-2 and the fourth corner portion 142-4 of the housing 140.

For example, the grooves 147 in the housing 147 may be formed in the lower surfaces of the projection 47a and 47b of the housing 140.

Next, the first and second magnets 130-1 and 130-2 will be described.

The first magnet 130-1 may be disposed at the first corner portion or the first corner 142-1 of the housing 140, and the second magnet 130-2 may be disposed at the second corner portion or the second corner 142-2 of the housing 140.

At the initial position of the AF operation unit (for example, the bobbin 110), the first magnet 130-1 may be disposed such that at least a portion thereof overlaps the first coil unit 120-1 in a direction that is perpendicular to the optical axis OA and parallel to a line that extends toward the first corner portion 142-1 of the housing 140 from the optical axis OA.

At the initial position of the AF operation unit (for example, the bobbin 110), the second magnet 130-2 may be disposed such that at least a portion thereof overlaps the second coil unit 120-2 in a direction that is perpendicular to the optical axis OA and parallel to a line that extends toward the second corner portion 142-2 of the housing 140 from the optical axis OA.

For example, the first and second magnets 130-1 and 130-2 may be respectively inserted or disposed in the seating portions 141a and 141b in the housing 140.

Each of the first and second magnets 130-1 and 130-2 may have a polygonal shape, which is easy to seat in the first and second corner portions 142-1 and 142-2.

For example, the first surface 11a of each of the first and second magnets 130-1 and 130-2 may have an area larger than the area of the second surface 11b of each of the first and second magnets 130-1 and 130-2.

In order to improve linearity in displacement of the bobbin 110 due to electromagnetic force, the crosswise length L1 of the first surface 11a of each of the magnets 130-1 and 130-2 may be greater than the crosswise length of each of the coil units 120-1 and 120-2, without being limited thereto. In another embodiment, the crosswise length L1 of the first surface 11a of each of the magnets 130-1 and 130-2 may be equal to or less than the crosswise length of each of the coil units 120-1 and 120-2.

The first surface 11a of each of the first and second magnets 130-1 and 130-2 may be the surface that faces each of the first and second coil units 120-1 and 120-2 (or the outer surface of the bobbin 110), and the second surface 11b may be the surface opposite the first surface 11a.

For example, the crosswise length of the second surface 11b of each of the first and second magnets 130-1 and 130-2 may be less than the crosswise length of the first surface 11a of each of the first and second magnets 130-1 and 130-2.

For example, the crosswise direction of the first surface 11a of each of the first and second magnets 130-1 and 130-2 may be a direction perpendicular to a direction toward the upper surface from the lower surface of each of the first and second magnets 130-2 along the first surface 11a or a direction perpendicular to the optical axis along the first surface 11a of each of the first and second magnets 130-1 and 130-2.

For example, the crosswise direction of the second surface 11b of each of the first and second magnets 130-1 and 130-2 may be direction perpendicular to a direction toward the upper surface from the lower surface of each of the first and second magnets 130-1 and 130-2 along the second surface 11b or a direction perpendicular to the optical axis along the second surface 11b of each of the first and second magnets 130-1 and 130-2.

Each of the first and second magnets 130-1 and 130-2 may include a portion, the crosswise length L1 of which gradually decreases moving toward each of the corner portions 142-1 and 142-2 of the housing 140 from the center of the bore in the housing 140.

For example, each of the first and second magnets 130-1 and 130-2 may include a portion, in which the crosswise length L1 of each of the first and second magnets 130-1 and 130-2 decreases in a direction toward the second surface 11b from the first surface 11a of each of the first and second magnets 130-1 and 130-2. For example, the crosswise direction of each of the first and second magnets 130-1 and 130-2 may be a direction parallel to the first surface 11a of each of the first and second magnets 130-1 and 130-2.

Each of the first and second magnets 130-1 and 130-2 may be a bipolar magnetized magnet including two N poles and two S poles, or may be a tetrapolar magnetized magnet. Each of the first and second magnets 130-1 and 130-2 may include a first magnet part, a second magnet part and a partition wall disposed between the first magnet part and the second magnet part. Here, the partition wall may also be alternatively referred to as "nonmagnetic partition wall".

Although the lens moving apparatus according to the embodiment includes two magnets 130-1 and 130-2 in order to reduce the size thereof, by embodying the first and second magnets 130-1 and 130-2 by bipolar magnetized magnets, it is possible to increase the electromagnetic force between the magnets and the first and second coil units 120-1 and 120-2 to thus ensure sufficient electromagnetic force for AF operation.

In another embodiment, each of the first and second magnets 130-1 and 130-2 may be a monopolar magnetized magnet including one N pole and one S pole. Although the magnet may be disposed such that the first surface 11a thereof that faces the first coil unit 120-1 is the S pole and the second surface 11b thereof is the N pole, the disclosure is not limited thereto. In another embodiment, each of the first and second magnets 130-1 and 130-2 may be disposed such that the first surface 11a thereof is the N pole and the second surface 11b thereof is the S pole.

Although the horizontal surface of each of the first and second magnets 130-1 and 130-2 may have a polygonal shape, such as a triangular, pentagonal, hexagonal or rhombus shape, the disclosure is not limited thereto.

Referring to FIG. 5C, the lower surface of each of the first and second magnets 130-1 and 130-2 disposed in the seating portions 141a and 141b in the housing 140 may be positioned lower than the lower surface, the lower portion or the lower end (or the end) of the housing 140.

For example, the lower surface of each of the first and second magnets 130-1 and 130-2 disposed in the seating portions 141a and 141b in the housing 140 may be positioned lower than the lower surface, the lower portion or the lower end (or the end) of each of the first and second corner portions of the housing 140.

In other words, the first and second magnets 130-1 and 130-2 disposed in the seating portions 141a and 141b in the housing 140 may project or extend downwards further than the lower surface, the lower portion or the lower end (or the end) of the housing 140.

Next, the circuit board 190 and the position sensor 170 will be described.

The circuit board 190 may be disposed on one surface of the housing 140, and may include the position sensor 170. The surface of the bobbin 110 corresponding to the one surface of the housing 140 may be provided with the projection 115b, which projects toward the one surface of the housing 140, and at least a portion of the sensing magnet 180 may be disposed in the projection 115b of the bobbin.

The circuit board 190 may be disposed at one side portion (for example, the first side portion 141-1) of the housing 140, and the position sensor 170 may be disposed or mounted on the circuit board 190.

For example, the circuit board 190 may be disposed at the first side portion 141-1, and the first corner portion 142-1 and the third corner portions 142-3, which are adjacent to the first side portion 141-1. For example, the circuit board 190 may be disposed in the first mounting groove 15a in the housing 140.

For example, the circuit board 190 may be disposed between the first corner portion 142-1 and the third corner portion 142-3 of the housing 140, and first to sixth terminals 90-1 to 90-6 may be conductively connected to the position sensor 170.

Figure 6A:
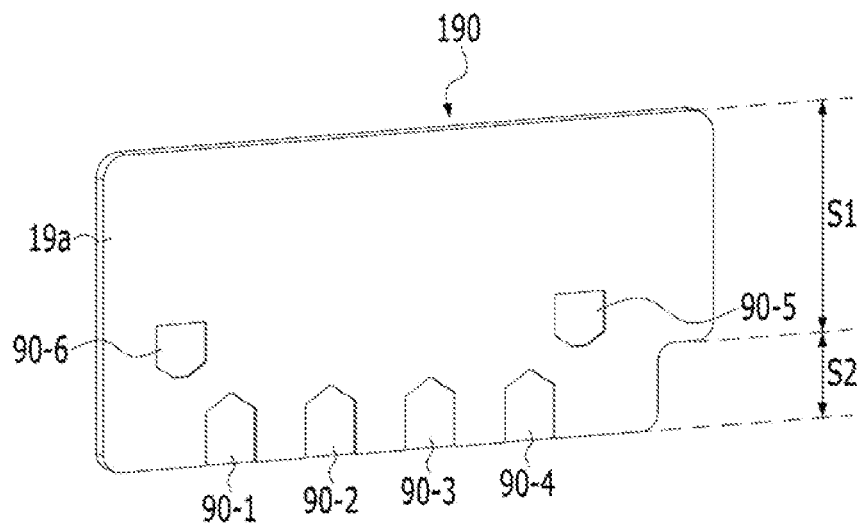
FIG. 6A is a perspective view of the circuit board.
Figure 6B:
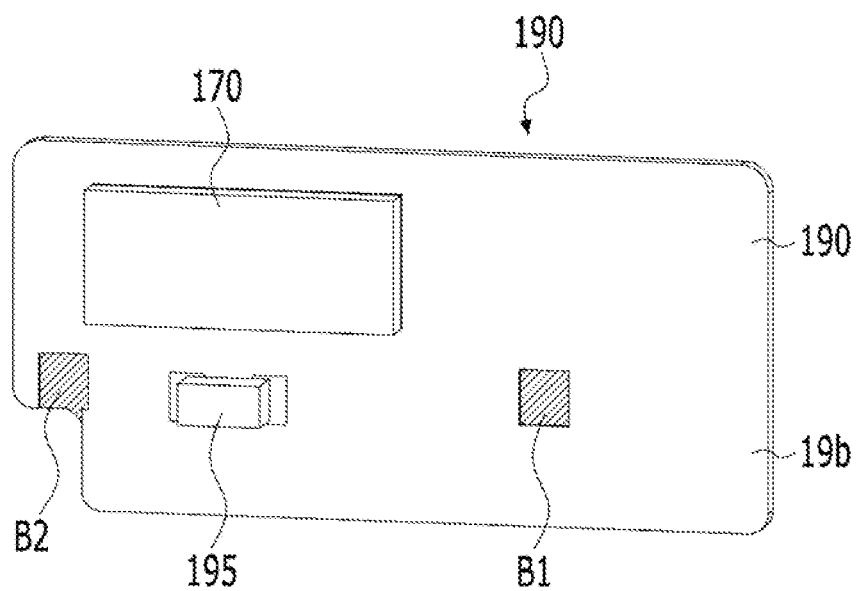
FIG. 6B is a view illustrating the position sensor and the capacitor disposed at the circuit board.
Figure 6C:
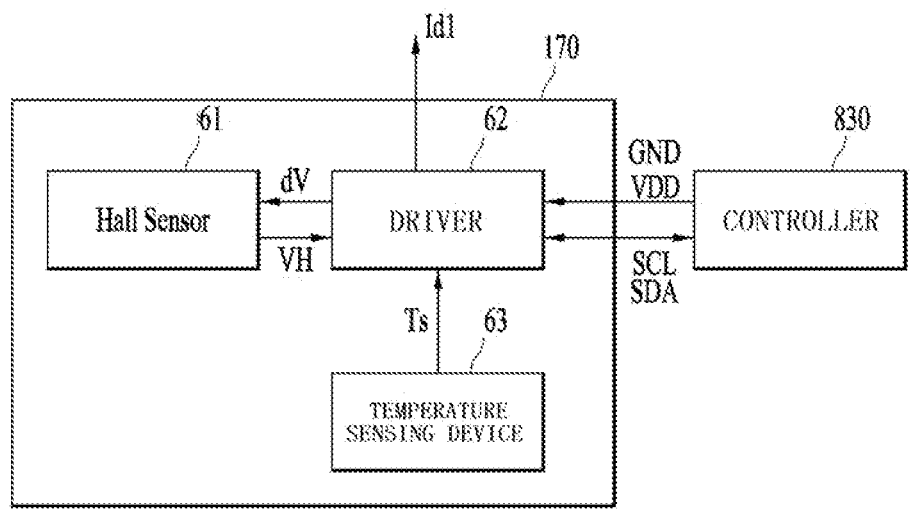
FIG. 6C is a view of an embodiment of the position sensor shown in FIG. 6B.

FIG. 6A is a perspective view of the circuit board 190. FIG. 6B is a view illustrating the position sensor 170 and the capacitor 195, which are disposed at the circuit board 190. FIG. 6C is a view of an embodiment of the position sensor 170 shown in FIG. 6B.

Referring to FIGS. 6A to 6C, the circuit board 190 may include terminals (or pads) B1 and B2 for supplying a drive signal to the first and second coil units 120-1 and 120-2 and the terminals 91-1 to 91-6 to be conductively connected to external terminals (or an external device).

The position sensor 170 may be disposed on a first surface 19b of the circuit board 190.

In order to facilitate the conductive connection with the lower elastic member 160, the terminals B1 and B2 of the circuit board 190 may be disposed on the first surface 19b of the circuit board 190.

For example, in order to shorten the path of the conductive connection with the lower elastic member 160, the terminals B1 and B2 of the circuit board 190 may be disposed lower than the position sensor 170, without being limited thereto.

Furthermore, in order to facilitate the conductive connection with external terminals (or an external device), the terminals 90-1 to 90-6 of the circuit board 190 may be disposed on the second surface 19a of the circuit board 190.

Here, the second surface 19a of the circuit board 190 may be a surface opposite the first surface 19b of the circuit board 190. For example, the second surface 19a of the circuit board 190 may be the surface of the circuit board 190 that faces the bobbin 110.

The circuit board 190 may include a circuit pattern or wires (not shown) for conductively connecting the position sensor 190 to the terminals B1, B2, and 90-1 to 90-6 of the circuit board 190.

The circuit board 190 may include a body part S1 and an extension part S2, positioned under the body part S1. The body part S1 may be alternatively referred to as an "upper part", and the extension part S2 may be alternatively referred to as a "lower part".

The extension part S2 may extend downwards from the body part S1. For example, the body part S1 may include a portion projecting from the side surface of the extension part S2. For example, although the terminals 90-1 to 90-4 of the circuit board 190 may be arranged in a row at the extension part S2 of the circuit board 190 and the terminals 90-5 and 90-6 may be disposed at the body part S1 of the circuit board 190, the disclosure is not limited thereto.

For example, the circuit board 190 may be a printed circuit board or a flexible printed circuit board (FPCB).

The position sensor 170 may detect the magnetic field or the intensity of the magnetic field of the sensing magnet 180 mounted on the bobbin 110 during movement of the bobbin 110, and may output an output signal corresponding to the result of the detection.

The position sensor 170 may be mounted on the circuit board 190 disposed at the housing 140, and may be secured to the housing 140. For example, the position sensor 170 may be disposed in the second mounting groove 15b in the housing 190.

For example, the position sensor 170 may be disposed closer to the third corner portion 142-3 than to the first corner portion 142-1 of the housing 140, and the third corner portion of the housing 140 may not be provided with the magnets 130-1 and 130-2.

The position sensor 170 may be embodied as a driver including a hall sensor.

For example, the position sensor 170 may include a hall sensor 61 and a driver 62.

For example, the hall sensor 61 may be made of silicone, and the output VH of the hall sensor 61 may increase as the ambient temperature increases. For example, the ambient temperature may be the temperature of the lens moving apparatus, for example, a temperature of the circuit board 190, the temperature of the hall sensor 61 or the temperature of the driver 62.

In another embodiment, the hall sensor 61 may be made of GaAs, and the output VH of the hall sensor 61 may decrease as the ambient temperature increases. In another embodiment, the output of the hall sensor 61 may have a slope of about $-0.06\%/°$ C. with respect to an ambient temperature.

The position sensor 170 may further include a temperature-sensing element 63 capable of detecting an ambient temperature. The temperature-sensing element 63 may output a temperature detection signal Ts, corresponding to the result of detection of the ambient temperature of the position sensor 170, to the driver 62.

For example, the hall sensor 61 of the position sensor 190 may generate the output VH corresponding to the result of detection of the intensity of the magnetic force of the sensing magnet 180. For example, the intensity of the output of the position sensor 190 may be proportional to the intensity of the magnetic force of the sensing magnet 180.

The driver 62 may output a drive signal dV for driving the hall sensor 61 and a drive signal Id1 for driving the first and second coil units 120-1 and 120-2.

For example, the driver 62 may receive a clock signal SCL, a data signal SDA and power signals VDD and GND through data communication using a protocol such as I2C communication.

Here, although the first power signal GND may be a ground voltage or 0V and the second power signal VDD may be a predetermined voltage for driving the driver 62, and may be DC voltage and/or AC voltage, the disclosure is not limited thereto.

The driver 62 may create the drive signal dV, for driving the hall sensor 61 using the clock signal SCL, the data signal SDA and the power signals VDD and GND, and the drive signal Id1, for driving the first and second coil units 120-1 and 120-2.

The position sensor 170 may include the first to fourth terminals for sending and receiving the clock signal SCL, the data signal SDA, the power signals VDD and GND, and the fifth and sixth terminals for providing a drive signal to the first and second coil units 120-1 and 120-2.

Furthermore, the driver 62 may receive the output VH of the hall sensor 61, and may send the clock signal SCL and the data signal SDA pertaining to the output VH of the hall sensor 61 through data communication using a protocol such as I2C communication.

Furthermore, the driver 62 may receive the temperature detection signal Ts as a result of detection by the temperature-sensing element 63, and may send the temperature detection signal Ts to controllers 830 and 780 through the data communication using a protocol such as the I2C communication.

The controllers 830 and 780 may perform temperature compensation for the output VH from the hall sensor 61 based on variation in the ambient temperature detected by the temperature-sensing element 63 of the position sensor 170.

For example, when the drive signal dV or a bias signal of the hall sensor 61 is 1 mA, the output VH of the hall sensor 61 of the position sensor 170 may be $-20$ mV~$+20$ mV.

In the case of temperature compensation for the output VH of the hall sensor 61, having a negative slope with respect to variation in ambient temperature, the output VH of the hall sensor 61 of the position sensor 170 may be 0 mV~$+30$ mV.

When the output of the hall sensor 61 of the position sensor 170 is plotted on the x-y coordinate system, the reason why the output range of the hall sensor 61 of the position sensor 170 is represented in the first quadrant (for example, 0 mV~$+30$ mV) is as follows.

Because the output of the hall sensor 61 in the first quadrant of the x-y coordinate system and the output of the hall sensor 61 in the third quadrant of the x-y coordinate system move in opposite directions depending on variation in ambient temperature, the accuracy and reliability of the hall sensor may decrease when both the first and third quadrant are used as AF operation control zones. Accordingly, in order to accurately compensate for variation in ambient temperature, a specific range in the first quadrant may be considered to be the output range of the hall sensor 61 of the position sensor 170.

Each of the first to fourth terminals of the position sensor 170 may be conductively connected to a corresponding one of the terminals 90-1 to 90-4 of the circuit board 190.

The fifth and sixth terminals of the position sensor 170 may be conductively connected to the terminals B1 and B2 of the circuit board 190, respectively. The terminals 90-5 and 90-6 of the circuit board 190 may be test terminals.

The terminals B1 and B2 of the circuit board 190 may be respectively coupled to the lower elastic units 160a and 160b, and the position sensor 170 may be conductively connected to the first and second coil units 120-1 and 120-2 via the lower elastic units 160a and 160b and may provide a drive signal thereto.

For example, the fifth terminal B5 of the circuit board 190 may be coupled to the first lower elastic unit 160a, and the sixth terminal B6 of the circuit board 190 may be coupled to the second lower elastic unit 160b.

Figure 7A:
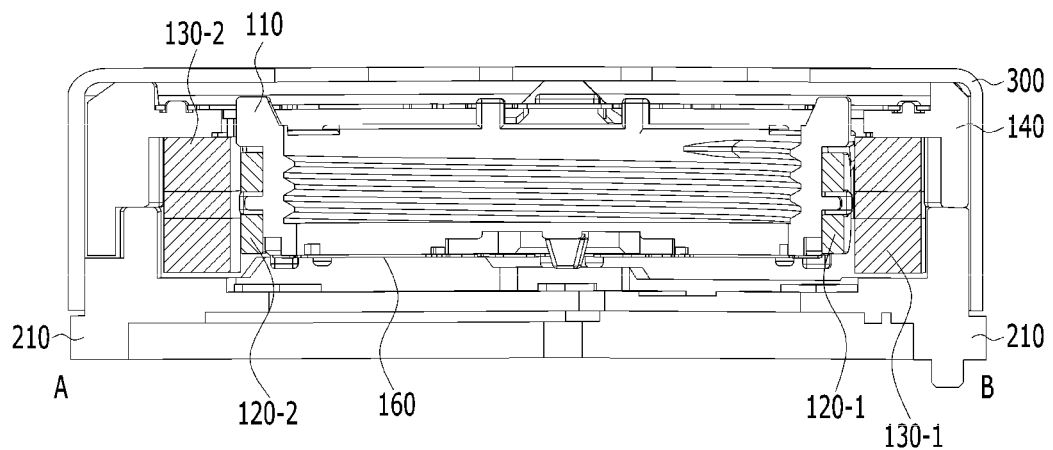
FIG. 7A is a cross-sectional view of the lens moving apparatus, taken along line A-B in FIG. 2.
Figure 7B:
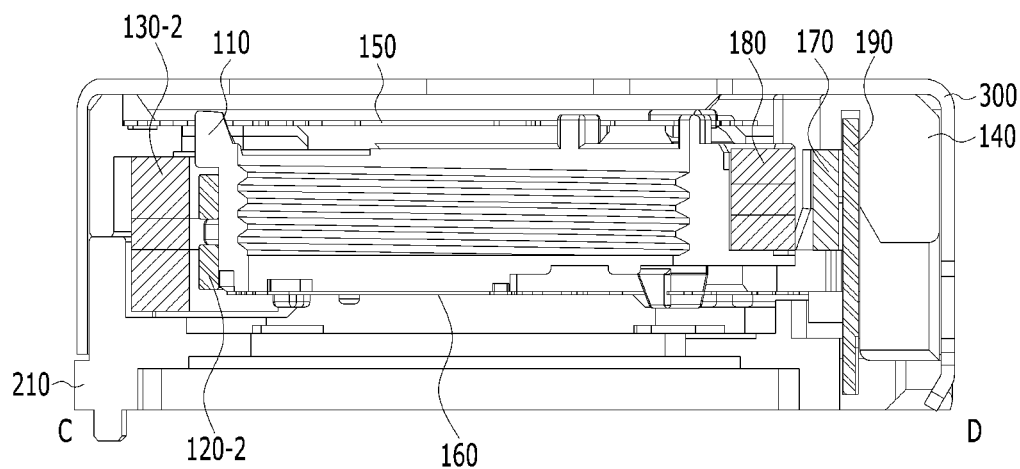
FIG. 7B is a cross-sectional view of the lens moving apparatus, taken along line C-D in FIG. 2.

FIG. 7A is a cross-sectional view of the lens moving apparatus 100 shown in FIG. 2, taken along line A-B in FIG. 2. FIG. 7B is a cross-sectional view of the lens moving apparatus 100 shown in FIG. 2, taken along line C-D in FIG. 2.

Referring to FIGS. 7A and 7B, although the second magnet 180 may not overlap the coil units 120-1 and 120-2 in a direction perpendicular to the optical axis OA or in a direction parallel to a line that is perpendicular to the optical axis OA and extends through the optical axis, the disclosure is not limited thereto. In another embodiment, the second magnet 180 may overlap the coil units 120-1 and 120-2.

At the initial position of the AF operation unit (for example, the bobbin 110), the position sensor 170 may overlap the second magnet 180 in a direction perpendicular to the optical axis OA or in a direction parallel to a line that is perpendicular to the optical axis OA and extends through the optical axis.

Furthermore, the position sensor 170 may not overlap the first and second magnets 130-1 and 130-2 in a direction perpendicular to the optical axis OA or in a direction parallel to a line that is perpendicular to the optical axis OA and extends through the optical axis.

For example, the position sensor 170 may not overlap the first magnet 130 in a direction toward the coil 120 from the position sensor 170 or in a direction perpendicular to the outer surface of the side portion 141-1 of the housing 140.

Next, the upper elastic member 150, the lower elastic member 160 and the base 210 will be described.

Figure 8A:
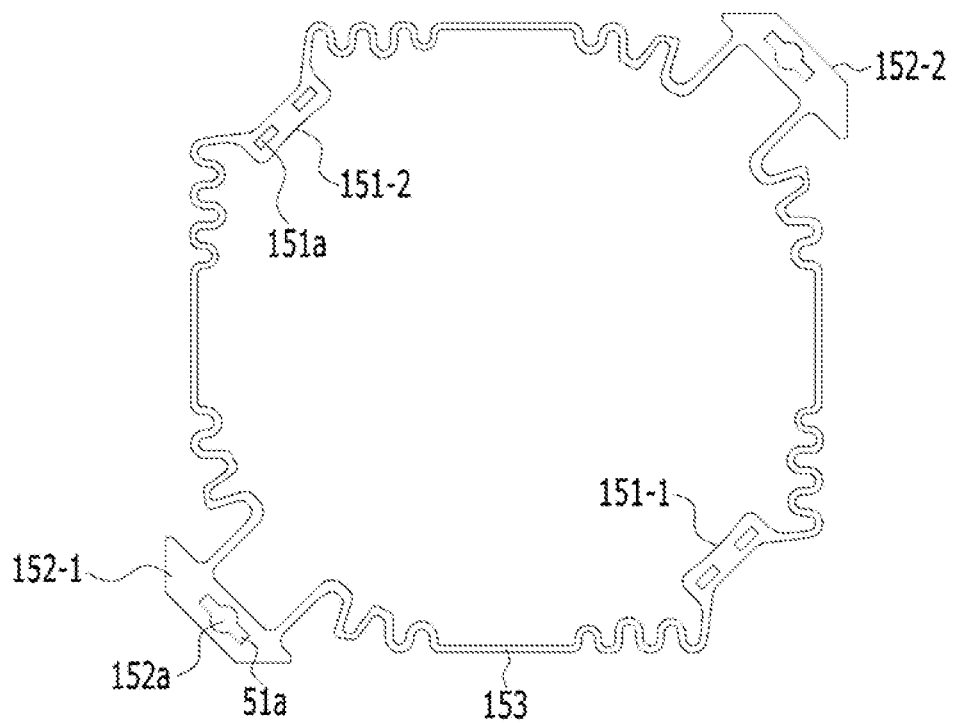
FIG. 8A is a view illustrating the upper elastic member shown in FIG. 1.
Figure 8B:
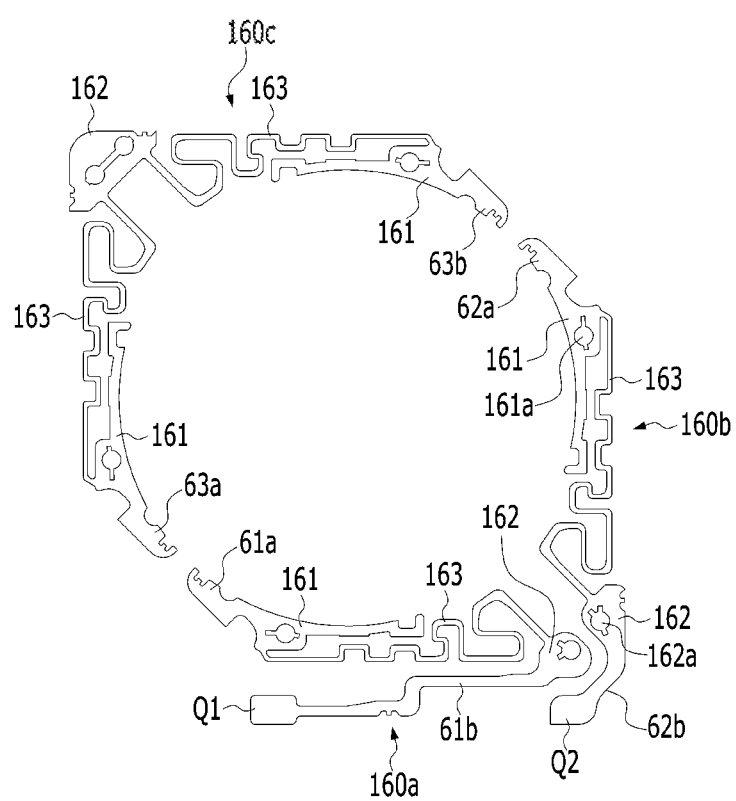
FIG. 8B is a view illustrating the lower elastic member shown in FIG. 1.
Figure 9:
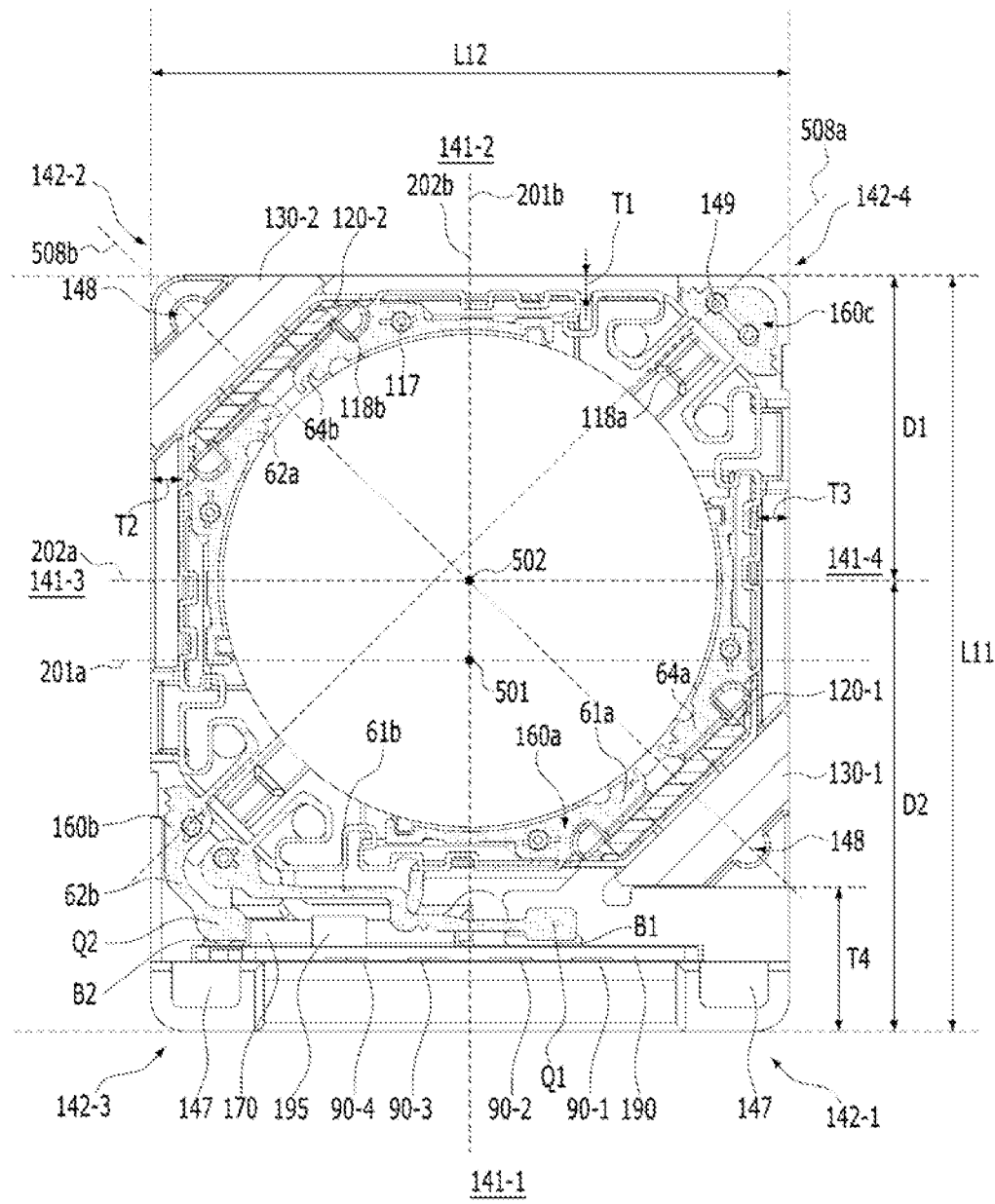
FIG. 9 is a bottom view of the lens moving apparatus shown in FIG. 2, from which the base is removed.
Figure 10:
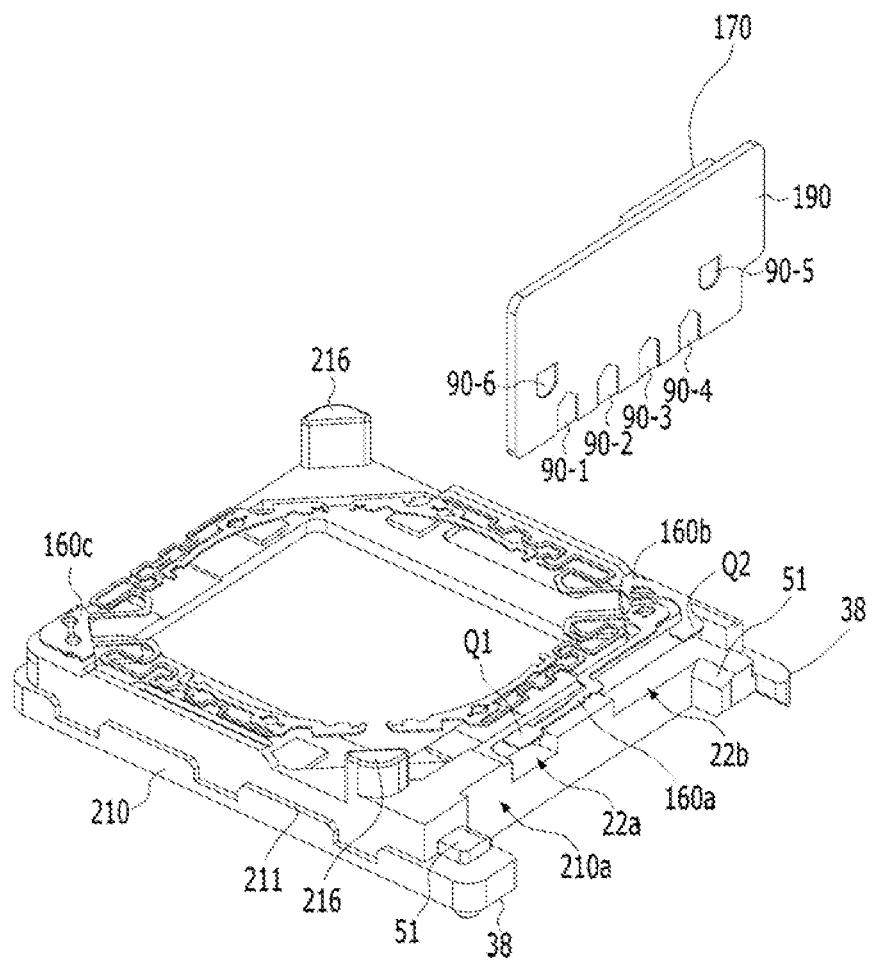
FIG. 10 is a view illustrating the lower elastic member, the base, and the circuit board.

FIG. 8A is a view illustrating the upper elastic member 150 shown in FIG. 1. FIG. 8B is a view illustrating the lower elastic member 160 shown in FIG. 1. FIG. 9 is a bottom view of the lens moving apparatus 100 shown in FIG. 2, from which the base 210 is removed. FIG. 10 is a view illustrating the lower elastic member 160, the base 210, and the circuit board 190.

Referring to FIGS. 8A, 8B, 9 and 10, the upper elastic member 150 and the lower elastic member 160 may be coupled both to the bobbin 110 and to the housing 140 so as to support the bobbin 110.

The upper elastic member 150 may be coupled to the upper portion, the upper end or the upper surface of the bobbin 110, and the lower elastic member 160 may be coupled to the lower portion, the lower end or the lower surface of the bobbin 110.

For example, the upper elastic member 150 may be coupled both to the upper portion, the upper end or the upper surface of the bobbin 110 and to the upper portion, the upper end or the upper surface of the housing 140. For example, the lower elastic member 160 may be coupled both to the lower portion, the lower end or the lower surface of the bobbin 110 and to the lower portion, the lower end or the lower surface of the housing 140.

The upper elastic member 150 and the lower elastic member 160 may elastically support the bobbin 110 with respect to the housing 140.

Although the upper elastic member 150 includes one upper elastic unit (or one upper spring) in FIG. 8A, the upper elastic member may include a plurality of upper elastic units, which are spaced apart from each other, in another embodiment.

The upper elastic member 150 may include a first inner frame coupled to the upper portion, the upper surface or the upper end of the bobbin 110, a first outer frame coupled to the upper portion, the upper surface or the upper end of the housing 140, and a first frame connector connecting the first inner frame 151 to the first outer frame 152. The inner frame may be interchanged with "inner part", and the outer frame may be interchanged with "outer part".

For example, the first outer frame of the upper elastic member 150 may include a first of first outer frame 152-1, coupled to the upper portion, the upper surface or the upper end of the first corner portion 142-1 of the housing 140, and a second of first outer frame 152-2, coupled to the upper portion, the upper surface or the upper end of the second corner portion 142-2 of the housing 140.

For example, the first outer frame of the upper elastic member 150 may be spaced apart from the third corner portion 142-3 and the fourth corner portion 142-4 of the housing 140, and may not be coupled thereto.

For example, the first inner frame of the upper elastic member 150 may include a first of first inner frame 151-1 coupled to the upper portion, the upper surface or the upper end of the second side portion 110c-3 of the bobbin 110, which corresponds to or faces the third corner portion 142-3 of the housing 140, and a second of first inner frame 151-2 coupled to the upper portion, the upper surface or the upper end of the second side portion 110c-4 of the bobbin 110, which corresponds to or faces the fourth corner portion 142-4 of the housing 140.

For example, the first inner frame of the upper elastic member 150 may be spaced apart from the second side portions 110c-1 and 110c-2 of the bobbin 110, which correspond to or face the first and second corner portions 142-1 and 142-2 of the housing 140, and may not be coupled thereto.

In another embodiment, the first outer frame of the upper elastic member 150 may be coupled to at least one of the third corner portion 142-3 and the fourth corner portion 142-4 of the housing 140. In a further embodiment, the first inner frame of the upper elastic member 150 may be coupled to at least one of the second side portions 110c-1 and 110c-2 of the bobbin 110.

Each of the first inner frames 151-1 and 151-2 of the upper elastic member 150 may have formed therein a hole 151a to be coupled to the first coupler 113 of the bobbin 110. Each of the first outer frames 152-1 and 152-2 of the upper elastic member 150 may have formed therein a hole 152a to be coupled to the first coupler 143 of the housing 140. The hole 152a may have at least one slit 51a, which allows an adhesive to be introduced between the first coupler 143 and the hole 151a therethrough.

For example, although the upper elastic member 150 may include four first frame connectors 153, the number thereof is not limited thereto. The first frame connectors may be positioned so as to correspond to the side portions 142-1 to 142-4 of the housing 140.

Referring to FIG. 8B, the lower elastic member 160 may include a first lower elastic unit 160a, a second lower elastic unit 160b and a third lower elastic unit 160c. The lower elastic unit may be interchanged with "lower spring".

Although each of the upper elastic member 150 and the lower elastic member 160 may be embodied as a leaf spring, the disclosure is not limited thereto. Each of the upper and lower elastic members 150 and 160 may be embodied as a coil spring, a suspension wire or the like.

The first to third lower elastic units 160a to 160c may be coupled to the bobbin 110. At least one of the first to third lower elastic units 160a to 160a may be coupled both to the bobbin 110 and to the housing 140.

The first to third lower elastic units 160a to 160c may be disposed between the bobbin 110 and the base 210. For example, the lower elastic member 160 may not overlap at least one of the first magnet and the second magnet in the optical-axis direction. For example, the first to third lower elastic units 160a to 160c may not overlap the first magnet 130-1 and/or the second magnet 130-2 in the optical-axis direction.

At least one of the first to third lower elastic units 160a to 160c may include the second inner frame 161 coupled to the lower portion, the lower surface or the lower end of the bobbin 110, the second outer frame 162 coupled to the lower portion, the lower surface or the lower end of the housing 140, and the second frame connector 163 connecting the second inner frame 161 to the second outer frame 162.

For example, the inner frame of the first lower elastic unit 160a may be disposed under one side portion of the bobbin 110, the inner frame of the second lower elastic unit 160b may be disposed under another side portion of the bobbin 110, and the inner frame of the third lower elastic unit 160c may be disposed under the other two side portions of the bobbin 110.

The second inner frame 161 of at least one of the first to third lower elastic units 160a to 160c may have formed therein a hole 161a for coupling the second coupling portion 117 of the bobbin 110 using solder or a conductive adhesive member.

The second outer frame 162 of at least one of the first to third lower elastic units 160a to 160c may have formed therein a hole 162 for coupling the second coupler 149 of the housing 140. Each of the holes 161a and 162a in the first to third lower elastic units 160a to 160c may have formed therein a slit through which an adhesive enters.

For example, the first lower elastic unit 160a may be coupled to the third corner portion 142-2 of the housing 140, and may be conductively connected to the terminal B1 of the circuit board 190.

For example, the second lower elastic unit 160b may be coupled to the third corner portion 142-2 of the housing 140, and may be conductively connected to the terminal B2 of the circuit board 190.

For example, the third lower elastic unit 160c may be coupled to the fourth corner portion 142-4 of the housing 140, which faces the third corner portion 142-3 of the housing 140.

Referring to FIG. 9, for example, the second outer frame 162 of the first elastic unit 160a may be coupled to the lower portion, the lower end or the lower surface of the housing 140.

For example, the second inner frame 161 of the first lower elastic unit 160a may be coupled to the lower portion, the lower end or the lower surface of the first side portion 110b-1 of the bobbin 110 that faces the first side portion 141-1 of the housing 140.

The second inner frame 161 of the first lower elastic unit 160a may include a first bonding portion (or a first coupler) 61a, to which one end of the first coil unit 120-1 is coupled using a conductive adhesive member or solder. For example, the first bonding portion 61a may be disposed on the second side portion 110c-1 of the bobbin 110 at which the first coil unit 120-1 is disposed.

The second outer frame 162 of the first lower elastic unit 160a may include a first extension portion 61b, which extends toward the terminal B1 of the circuit board 190 from the third corner portion 142-3 of the housing 140.

The first extension portion 61b may extend toward the terminal B1 of the circuit board 190 from the region of the second outer frame 162 of the first lower elastic unit 160a coupled to the third corner portion 142-3 of the housing 140.

The first extension portion 61b may be provided at one end thereof with a pad portion (or a bonding portion) Q1, which is to be conductively connected to the terminal B1 of the circuit board 190 using a conductive adhesive or solder. For easy soldering, the width of the pad portion Q1 may be larger than the width of the first extension portion 61b. Here, the width of the first extension portion 61b may be the length of the first extension portion 61b in a direction perpendicular to the longitudinal direction of the first extension portion 61b.

Although the first extension portion 61b may be bent or curved at least once, the disclosure is not limited thereto. In another embodiment, the first extension portion 61b may have a linear shape.

The second outer frame 162 of the second lower elastic unit 160b may be coupled to the lower portion, the lower end or the lower surface of the third corner portion 142-2 of the housing 140.

For example, the second inner frame 161 of the second lower elastic unit 160b may be coupled to the lower portion, the lower end or the lower surface of the first side portion 110b-3 of the bobbin 110, which faces the third side portion 141-3 of the housing 140.

The second inner frame 161 of the second lower elastic unit 160b may include a second bonding portion (or a second coupler) 62a, to which one end of the second coil unit 120-2 is coupled using a conductive adhesive member or solder. For example, the second bonding portion 62a may be disposed on the second side portion 110c-2 of the bobbin 110, at which the second coil unit 120-2 is disposed.

The second outer frame 162 of the second lower elastic unit 160b may include a second extension portion 62b, which extends toward the terminal B2 of the circuit board 190 from the third corner portion 142-3 of the housing 140.

The second extension portion 62b may extend toward the terminal B2 of the circuit board 190 from the region of the second outer frame 162 of the second lower elastic unit 160b that is coupled to the third corner portion 142-3 of the housing 140.

The second extension portion 62b may be provided at one end thereof with a pad portion (or a bonding portion) Q2, which is conductively connected to the terminal B2 of the circuit board 190 using a conductive adhesive or solder. For easy soldering, the width of the pad portion Q2 may be larger than the width of the second extension portion 62b. Here, the width of the second extension portion 62b may be the length of the second extension portion 62b in a direction perpendicular to the longitudinal direction of the second extension portion 62b.

Although the second extension portion 62b may be bent or curved at least once, the disclosure is not limited thereto. In another embodiment, the second extension portion 62b may have a linear shape.

The second outer frame 162 of the third lower elastic unit 160c may be coupled to the lower portion, the lower end or the lower surface of the fourth corner portion 142-4 of the housing 140.

For example, the second inner frame 161 of the third lower elastic unit 160b may be coupled to the lower portion, the lower end or the lower surface of the first side portions 110b-2 and 110b-4 of the bobbin 110, which face the second side portion 141-2 and the fourth side portion 141-4 of the housing 140.

The second inner frame 161 of the third lower elastic unit 160b may include a third bonding portion (or a second coupler) 64a, to which the other end of the first coil unit 120-1 is coupled using a conductive adhesive member or solder, and a fourth bonding portion 64b, to which the other end of the second coil unit 120-2 is coupled using a conductive adhesive member or solder.

For example, the third bonding portion 64a may be disposed at the second side portion 110c-1 of the bobbin 110, at which the first coil unit 120-1 is disposed, and the fourth bonding portion 64b may be disposed at the second side portion 110c-2 of the bobbin 110, at which the second coil unit 120-2 is disposed.

Each of the first to fourth bonding portions 61a, 62a, 64a and 64b may have therein at least one guide groove for guiding the two ends of each of the first and second coil units.

Although the third lower elastic unit 160c includes one second outer frame 162, two second inner frames 161 and two second frame connectors 163, the disclosure is not limited thereto.

The first coil unit 120-1 may be connected to the second coil unit 120-2 in series via the third lower elastic unit 160c, thereby allowing a drive signal to be supplied to the first coil unit 120-1 and the second coil unit 120-2 via the terminals B1 and B2 of the circuit board 190.

The first to third lower elastic units 160a to 160c may be spaced apart from the first corner portion 142-1 and the second corner portion 142-2 of the housing 140.

Although the first to third lower elastic units 160a to 160c may not overlap the first and second magnets 130-1 and 130-2 in the optical-axis direction, the disclosure is not limited thereto.

In another embodiment, the first to third lower elastic units may overlap the first and second magnets 130-1 and 130-2 in the optical-axis direction. In a further embodiment, at least one of the first to third lower elastic units may include a second outer frame, which is coupled to at least one of the first corner portion 142-1 and the second corner portion 142-2 of the housing 140.

Referring to FIG. 9, an imaginary line 508a, which connects the third corner portion 142-3 to the fourth corner portion 142-4 of the housing 140, may not overlap the magnets 130-1 and 130-2 or the coils 120-1 and 120-2.

For example, an imaginary line 508a that connects a region of the third corner portion 142-3 of the housing 140, which is coupled to the first and second lower elastic units 160a and 160b, to a region of the fourth corner portion 142-4 of the housing 140, which is coupled to the third lower elastic unit 160c, may not overlap the magnets 130-1 and 130-2 or the coils 120-1 and 120-2.

Furthermore, the imaginary line 508a may not overlap the second inner frame (or the second inner portion) 161 of the lower elastic member 160. Furthermore, the imaginary line 508a may not overlap the second frame connector (or the connector) 163 of the lower elastic member 160.

The imaginary line 508a may overlap the second outer frame (or the second outer portion) 162 of the lower elastic member 160.

Furthermore, an imaginary line 508b, which connects the first corner portion 142-1 to the second corner portion 142-2 of the housing 140, may overlap the magnets 130-1 and 130-2 and the coils 120-1 and 120-2.

The imaginary line 508b may not overlap the second outer frame (or the second outer portion) 162 of the lower elastic member 160.

In another embodiment, the imaginary line may be a line which connects the corner of the lower portion, the lower surface or the lower end of the third corner portion 142-3 of the housing 140 to the corner of the lower portion, the lower surface or the lower end of the fourth corner portion 142-4 of the housing 140.

In order to absorb and dampen vibrations of the bobbin 110, the lens moving apparatus 100 may include a damper (not shown) disposed between the upper elastic member 150 and the housing 140.

For example, the damper (not shown) may be disposed in the space between the first frame connector 153 of the upper elastic member 150 and the housing 140.

For example, the lens moving apparatus 100 may further include a damper (not shown) disposed between the second frame connectors 163 of each of the first to third lower elastic units 160a to 160c and the housing 140.

For example, a damper (not shown) may also be disposed between the inner surface of the housing 140 and the outer surface of the bobbin 110.

Next, the base 210 will be described.

Referring to FIG. 10, the base 210 may have an opening corresponding to the bore in the bobbin 110 and/or the bore in the housing 140, and may have a shape corresponding to or coinciding with that of the cover member 300, for example, a square shape.

The base 210 may include a step 211 at the lower end of the side surface thereof, to which an adhesive is applied when the cover member 300 is secured to the base 210 via adhesion. Here, the step 211 may guide the cover member 300, which is coupled to the upper side of the base, and may face the lower end of the side plate of the cover member 300. An adhesive member or a sealing member may be disposed or applied between the lower end of the side plate of the base 210 and the step 211 of the base 210.

The base 210 may be disposed below the bobbin 110 and the housing 140. For example, the base 210 may be disposed below the lower elastic member.

The projection 216, which corresponds to the first and second corner portions 142-1 and 142-2 of the housing 140, may be provided at a corner of the upper surface of the base 210. Although the projection 216 may have the form of a polygonal column, which projects perpendicularly from the upper surface of the base 210, the disclosure is not limited thereto.

The projection 216 may be in contact with the lower end or the lower surface of each of the first and second corners 142-1 and 142-2 of the housing 140, and may be coupled to the lower end or the lower surface of each of the first and second corner portions 142-1 and 142-2 of the housing 140 using an adhesive member (not shown) such as epoxy or silicone.

The base 210 may have a seating groove 210a, which is formed in the outer surface thereof so as to correspond to the circuit board 190 and in which the lower end of the circuit board 190 is seated. For example, the seating groove 210a may be formed in the side surface of the base 210 that corresponds to the first side portion 141-1 of the housing 140.

For example, the extension part S2 of the circuit board 190 may be disposed in the seating groove 210a in the base 210.

The base 210 may have a first escape groove 22a and a second escape groove 22b, which are formed in the upper surface of the base 210 adjacent to the outer surface of the base 210 corresponding to the circuit board 190.

The first escape groove 22a is intended to avoid spatial interference with the pad portion Q1 of the first lower elastic unit 160a, and the second escape groove 22b is intended to avoid spatial interference with the pad portion Q2 of the second lower elastic unit 160b.

The base 210 may include projections 38, which project in a direction perpendicular to the optical axis from the outer surfaces of corners of the base 210 that correspond to the first and third corner portions 142-1 and 142-3 of the housing 140.

The corners of the base 210 that face the first and third corner portions 142-1 and 142-3 of the housing 140 may be provided with protrusions 51, which are coupled to the grooves 147 formed in the first and third corner portions 142-1 and 142-3 of the housing 140. For example, the protrusions 51 of the base 210 may be coupled to the grooves 147 in the housing 140 using an adhesive. For example, the protrusions 51 may be disposed on the projections 38 of the base 210.

The cover member 300 may accommodate the bobbin 110, the coils 120, the first and second magnets 130-1 and 130-2, the housing 140, the upper elastic member 150, the lower elastic member 160, the position sensor 170, the sensing magnet 180 and the circuit board 190 in the space defined between the cover member 300 and the base 210.

The cover member 300 may be configured to have a box shape, which is open at the lower face thereof and includes the upper plate and the side plates. The lower portion of the cover member 300 may be coupled to the upper portion of the base 210. The upper plate of the cover member 300 may have a polygonal shape, for example, a square shape, an octagonal shape, or the like.

The cover member 300 may have a bore, which exposes a lens (not shown) coupled to the bobbin 110 to external light. Although the cover member 300 may be made of made of a nonmagnetic material such as stainless steel so as to prevent a phenomenon in which the cover member 300 is attracted to the first and second magnets 130-1 and 130-2, the disclosure is not limited thereto. The cover member 300 may also be made of a magnetic material so as to serve as a yoke for increasing the electromagnetic force between the coil 120 and the first and second magnets 130-1 and 130-2.

Generally, an AF lens moving apparatus may have a square planar shape, and may be configured such that magnets are disposed at four surfaces of the housing at an interval of 90 degrees, or at two surfaces thereof. In an optical product, which requires a lens moving apparatus which includes a lens having an increased outside diameter and which has a reduced external size, when the lens moving apparatus has a square shape as mentioned above, there may be a limitations on disposition of the position sensor, a circuit board and/or a magnet.

Particularly, designs in which a driver IC-type position sensor having temperature compensation and the like is incorporated in a lens moving apparatus are increasing in recent days. The drive IC-type position sensor has a larger three-dimensional size than a single hall sensor. Accordingly, when a specification of an increased lens aperture and a small-sized lens moving apparatus is required, there may be a limitation on the space required for accommodation of a drive IC-type position sensor.

Referring to FIG. 9, in order to ensure a sufficient space for accommodation of a drive IC-type position sensor, according to the embodiment, the longitudinal length L11 of the housing 140 may be greater than the crosswise length L12 of the housing 140, for example, L12:L11=1:1.1~1:1.5. However, the disclosure is not limited thereto.

Here, the crosswise direction of the housing 140 may be a direction toward the second side portion 141-2 from the first side portion 141-1 of the housing 140. Furthermore, the crosswise direction of the housing 140 may be a direction toward the fourth side portion 141-4 from the third side portion 141-3 of the housing 140.

For example, the center 501 of the housing 140 may not coincide with the center 502 of the bobbin 110. For example, the center 502 of the bobbin 110 may be the center of the bore in the bobbin 110.

For example, the center 502 of the bobbin 110 may be positioned closer to the second side portion 141-2 of the housing 140 than the first side portion 141-1 of the housing 140.

For example, the center 501 of the housing 140 may be the point at which the first horizontal central line 201a of the housing 140 intersects the first vertical central line 201b of the housing 140.

For example, the first horizontal central line 201a may be a line that is parallel to a direction toward the fourth side portion 141-4 from the third side portion 141-3 of the housing 140 and extends through the center 501 of the housing 140. For example, the first vertical central line 201b may be a line that is parallel to a direction toward the second side portion 141-2 from the first side portion 141-1 of the housing 140 and extends through the center 501 of the housing 140.

For example, the center 502 of the bobbin 110 may be the point at which the second horizontal central line 202a of the bobbin 110 intersects the second vertical central line 202b of the bobbin 110.

For example, the second horizontal central line 202a may be a line that is parallel to a direction toward the fourth side portion 141-4 from the third side portion 141-3 of the housing 140 and extends through the center 502 of the bore in the bobbin 110. For example, the second vertical central line 202b may be a line that is parallel to the first vertical central line 201b and extends through the center 502 of the bore in the bobbin 110.

The distance between the center 502 of the bobbin 110 and the second side portion 141-2 of the housing 140 may be less than the distance between the center 502 of the bobbin 110 and the first side portion 141-1 of the housing 140.

For example, the distance D1 between the second side portion 141-2 and the center 502 of the bobbin 110 in a direction toward the first side portion 141-1 of the housing 140-1 from the second side portion 141-2 of the housing 140-1 may be less than the distance D2 between the outer surface of the first side portion 141-1 of the housing 140 and the center 502 of the bobbin 110 (D1<D2).

For example, the thickness T1 of the second side portion 141-2 of the housing 140 may be less than the thickness T2 of the third side portion 141-3 of the housing 140 (T1<T2). For example, the thickness T1 of the second side portion 141-2 of the housing 140 may be less than the thickness T3 of the fourth side portion 141-4 of the housing 140. For example, although the thickness T2 may be equal to the thickness T3, the disclosure is not limited thereto, and the two thicknesses may be different from each other.

It is possible to decrease the distance D1 by decreasing the thickness T1 to be less than the thickness T2. Since the thickness T2 is greater than the thickness T1, the third side portion 141-3 and the fourth side portion 14-4 of the housing 140 are capable of stably supporting the corners of the first and second magnets 130-1 and 130-2.

For example, the thickness T4 of the first side portion 141-1 of the housing 140 may be greater than any one of the thickness T1 of the second side portion 141-2, the thickness T2 of the third side portion and the thickness T3 of the fourth side portion 140-4 of the housing 140 (T4>T1, T4>T2, T4>T3).

Since the thickness T4 is greater than any one of the thicknesses T1, T2 and T3, it is possible to ensure a sufficient space to accommodate the circuit board 190 and the position sensor 170 without decreasing the size of the bore in the bobbin 110.

Figure 11:
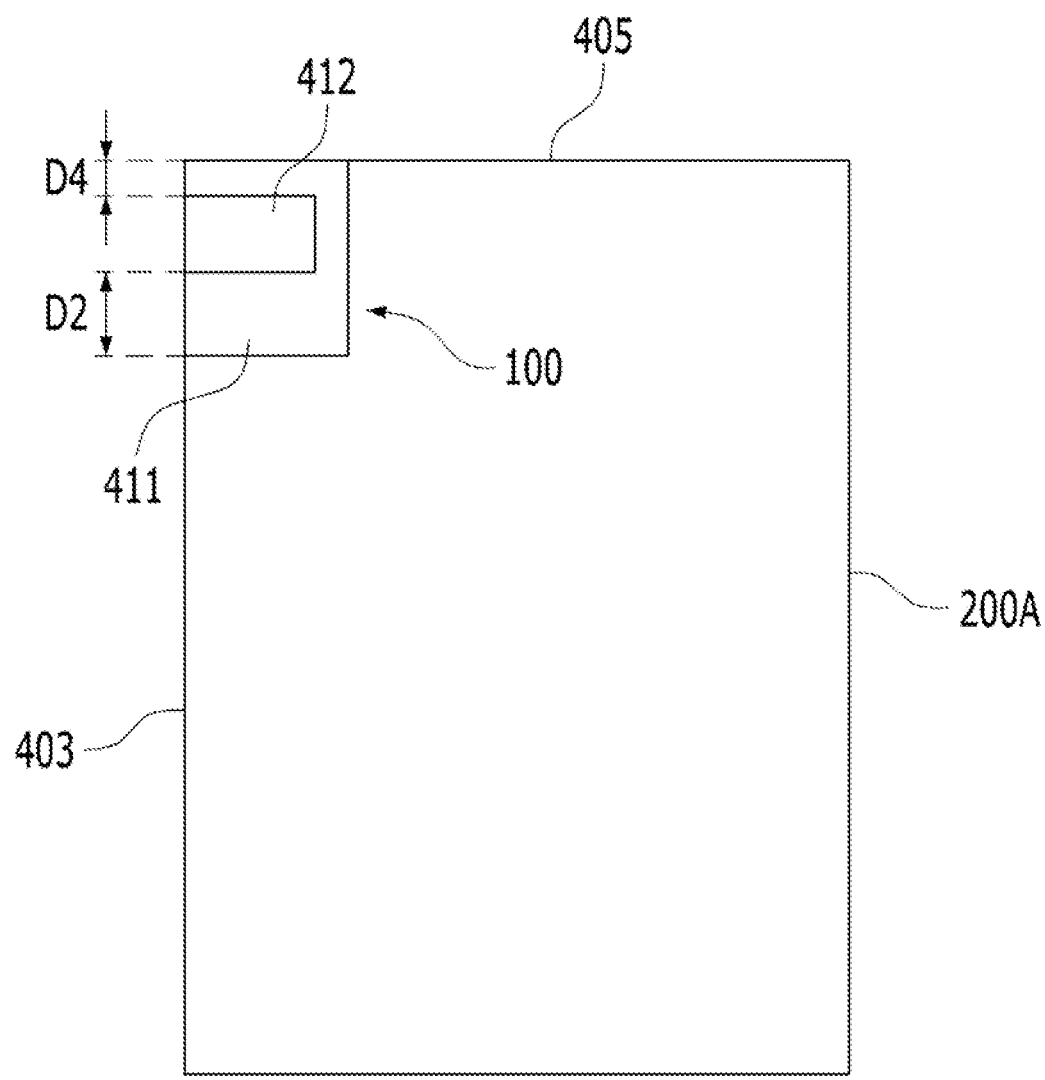
FIG. 11 is a conceptual view of an optical device including the lens moving apparatus according to an embodiment.

FIG. 11 is a conceptual view of an optical device including the lens moving apparatus according to the embodiment.

Referring to FIG. 11, the camera module including the lens moving apparatus 100 may be mounted on the front surface of the optical device 200A. Here, in order to improve freedom in the design of the front surface 403 of the optical device, the lens moving apparatus 100 may be positioned adjacent to the edge of the optical device 200A, for example, the upper end or the upper surface 405 of the optical device 200A.

For example, the lens moving apparatus 100 may be disposed at the optical device 200A such that the second side portion 141-2 of the housing 140 shown in FIG. 9 is adjacent to the upper end or the upper surface 405 of the optical device 200A.

Customers require a predetermined specification for D1 in FIG. 9 in order to improve design freedom of the front surface 403 of the optical device. For example, although the distance D1 may be 3 mm-4 mm, the disclosure is not limited thereto.

Because the lens 412 mounted on the lens moving apparatus 100 must receive light, the lens moving apparatus 100 must be exposed through the front surface 403 of the optical device. As illustrated in FIG. 9, the distance D2 is less than the distance D1. Accordingly, when the lens moving apparatus 100 according to the embodiment is applied to the optical device 200A, it is possible to dispose the lens 412 adjacent to the upper end or the upper surface 405 of the optical device 200A, and it is thus possible to improve design freedom of the front surface of the optical device 200A.

The magnets 130-1 and 130-2 are disposed at the first and second corner portions 142-1 and 142-2 of the housing 140, and the coil units 120-1 and 120-2 may be disposed at the second side portions 110c-1 and 110c-2 of the bobbin 110 corresponding to the first and second corner portions 142-1 and 142-2 of the housing 140. The position sensor 170 may be disposed at the first corner portions 142-1, the first side portion 141-1 and the third corner portion 142-3 of the housing 140, and the sensing magnet 180 may be disposed the first side portion 110b-1 of the bobbin 110 adjacent to the third corner portion 142-3 of the housing 140. Accordingly, the embodiment is able to mount a lens having a large aperture required by customers to a product while reducing the size of the product, and to improve freedom in the design of the front surface of an optical device in which the lens moving apparatus is incorporated.

Although FIGS. 1 to 11 illustrate an embodiment in which the first and second magnets 130-1 and 130-2 are disposed at the housing 140, the disclosure is not limited thereto. In another embodiment, the first and second magnets may be disposed at the first and second corner portions of the cover member.

For example, the cover member may include first to fourth side portions corresponding to the first to fourth side portions of the housing 140 and first to fourth corner portions corresponding to the first to fourth corner portions of the housing 140.

The bobbin 110 may be disposed in the cover member, and the coils 120 may be disposed at the bobbin. The circuit board may be disposed on one inner surface of the cover member, and the position sensor may be disposed at the circuit board. The sensing magnet may be disposed at the bobbin so as to face the position sensor.

Furthermore, the first magnet 130-1 may be disposed at the first corner portion of the cover member, and the second magnet 130-2 may be disposed at the second corner portion, which faces the first corner portion of the cover member.

The position sensor 170 may be disposed closer to the third corner portion than to the first corner portion, and no magnet may be disposed at the third corner portion of the cover member. For example, the circuit board 190 may be positioned between the first corner portion and the third corner portion of the cover member 300. In the embodiment shown in FIG. 1, the description of the positional relationships between the first and second magnets 130-1 and 130-2 of the housing and the positional relationships between the housing 140 and the circuit board 190 and the description of the housing 140, the position sensor 170 and the capacitor 195 may applied to the cover member, the first and second magnets 130-1 and 130-2, the circuit board 190, the position sensor 170 and the capacitor 195 according to the above-described another embodiment. In another embodiment, the upper and lower elastic members 150 and 160 may be coupled to the cover member, and the description of the housing 140 and the lower elastic member 160 shown in FIG. 9 may be applied to the cover member and the lower elastic member 160 according to another embodiment.

Figure 14:
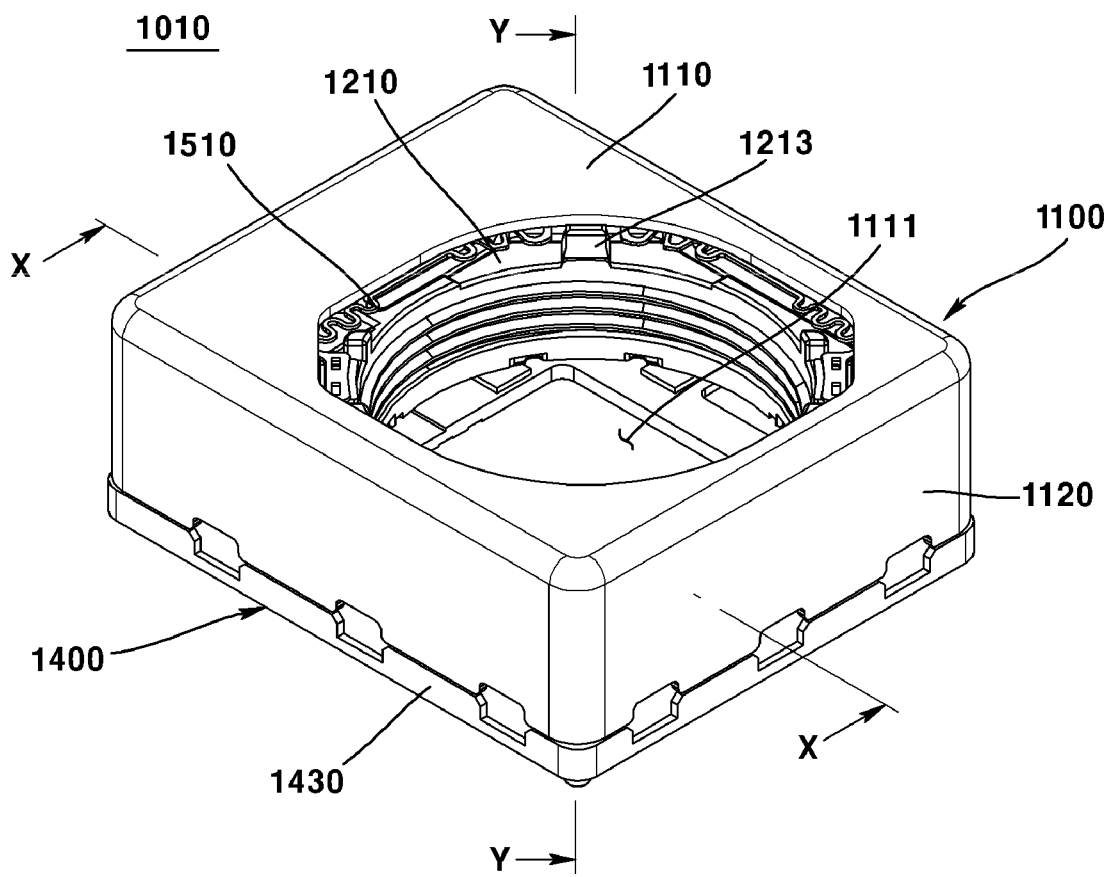
FIG. 14 is a perspective view of a lens moving apparatus according to another embodiment.
Figure 15:
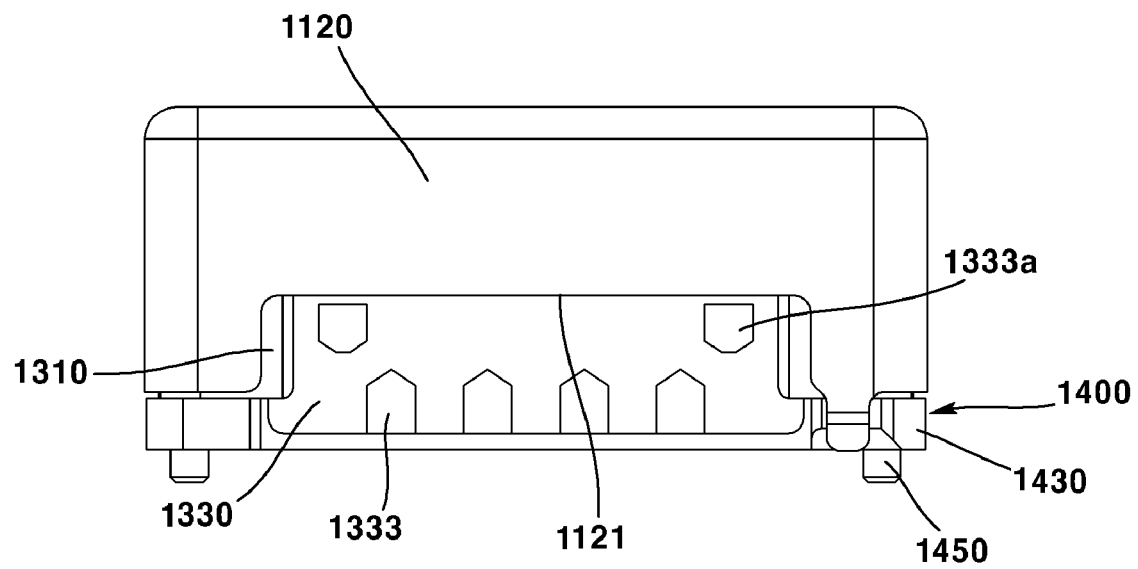
FIG. 15 is a side view of the lens moving apparatus shown in FIG. 14.
Figure 16:
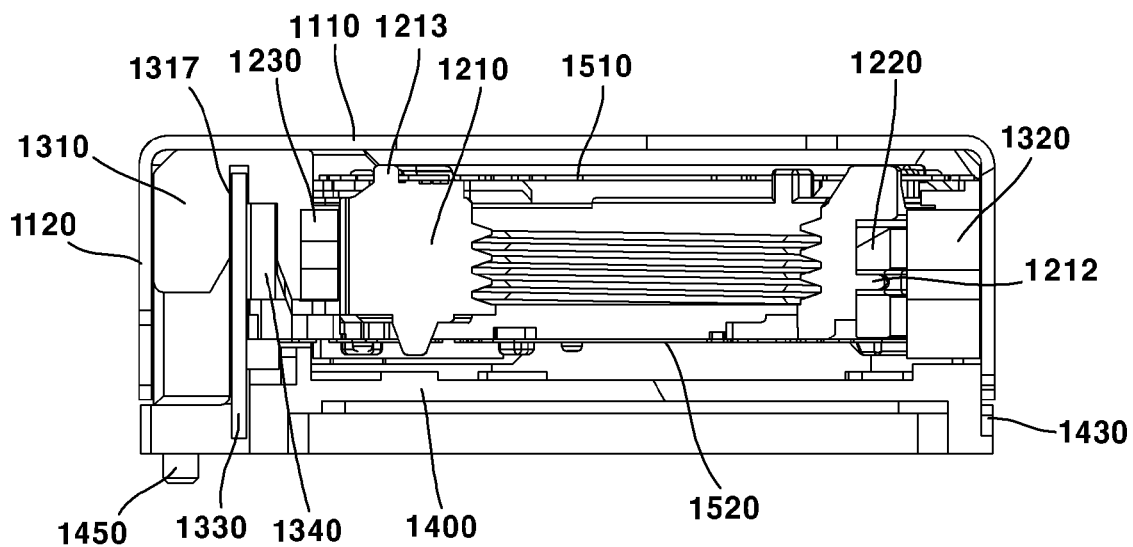
FIG. 16 is a cross-sectional view of the lens moving apparatus taken along line X-X in FIG. 14.
Figure 17:
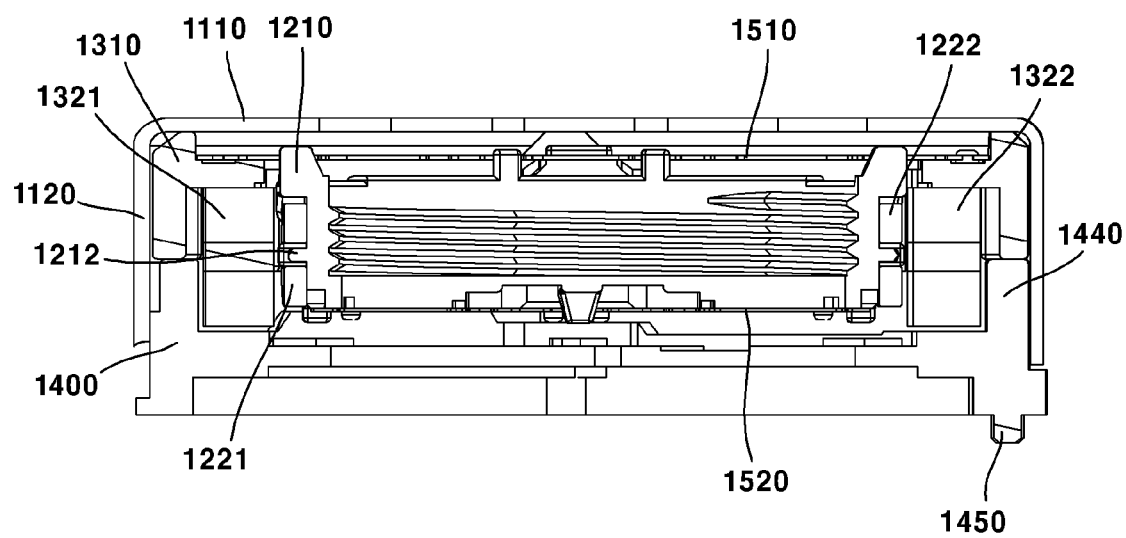
FIG. 17 is a cross-sectional view of the lens moving apparatus taken along line Y-Y in FIG. 14.
Figure 18:
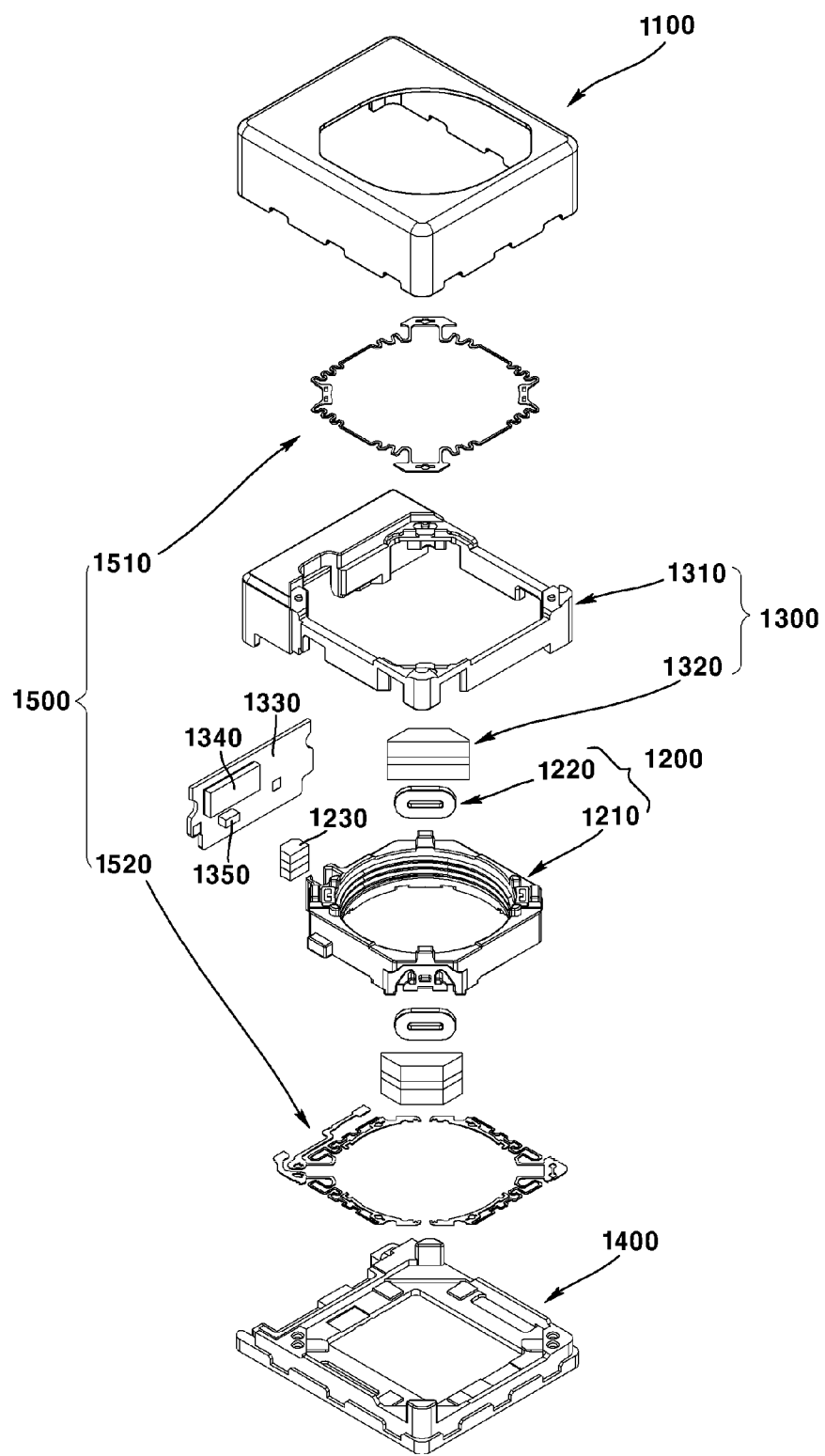
FIG. 18 is an exploded perspective view of the lens moving apparatus shown in FIG. 14.
Figure 19:
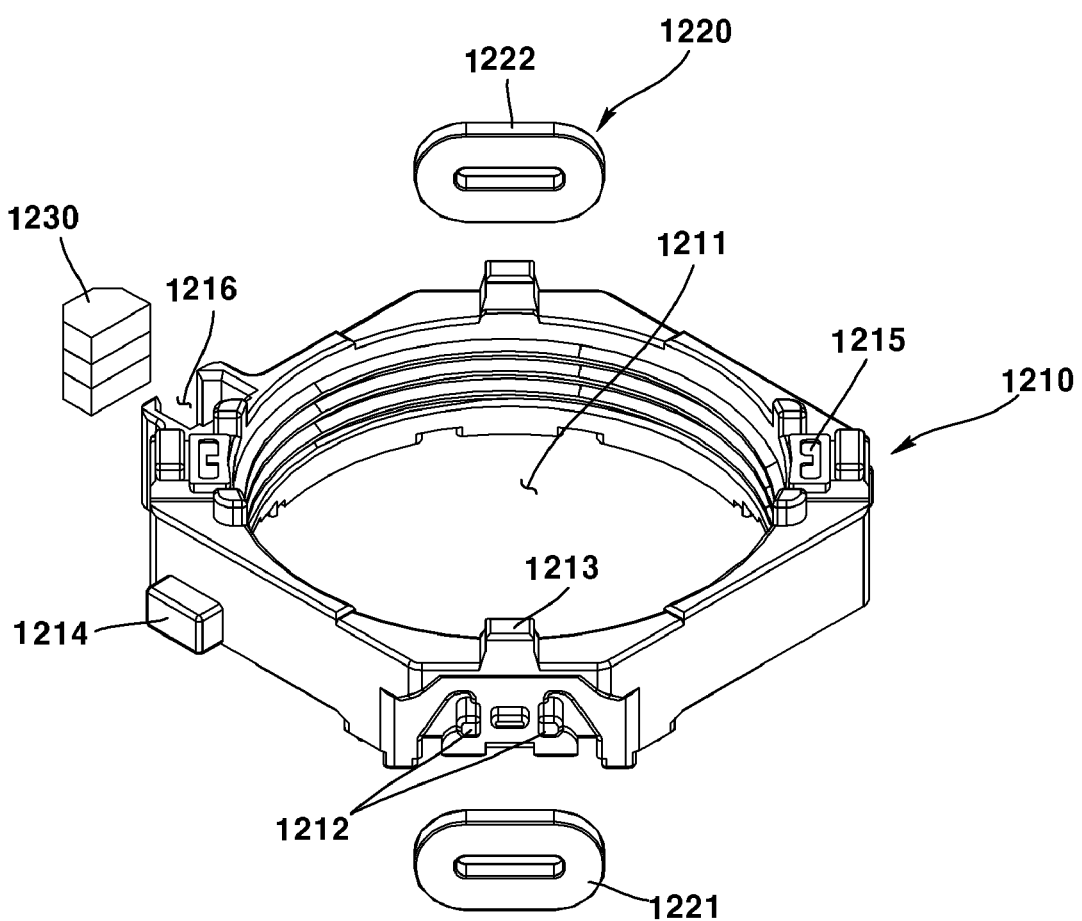
FIGS. 19 to 21 are exploded perspective views of some components of the lens moving apparatus shown in FIG. 14.
Figure 20:
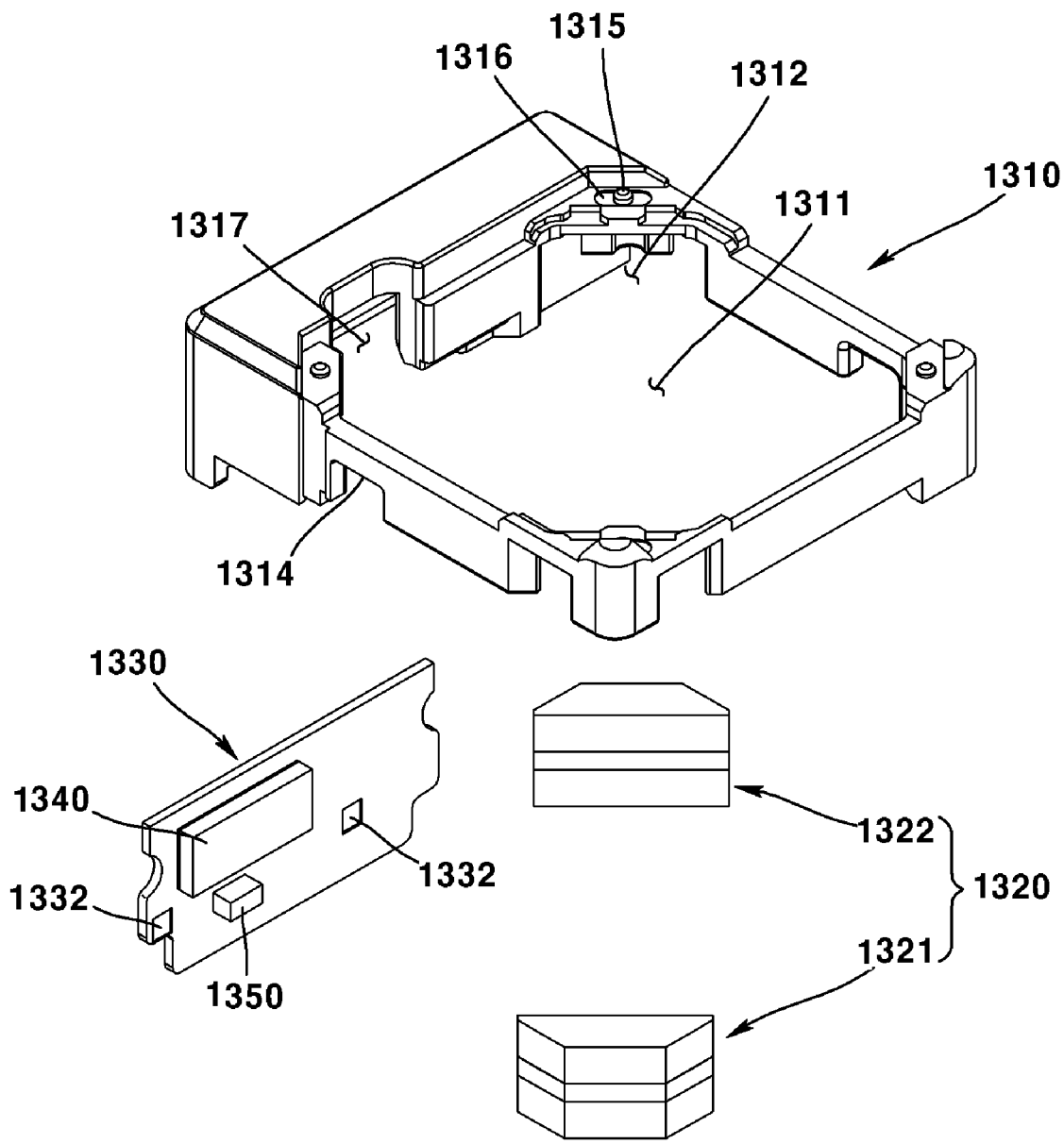
Figure 21:
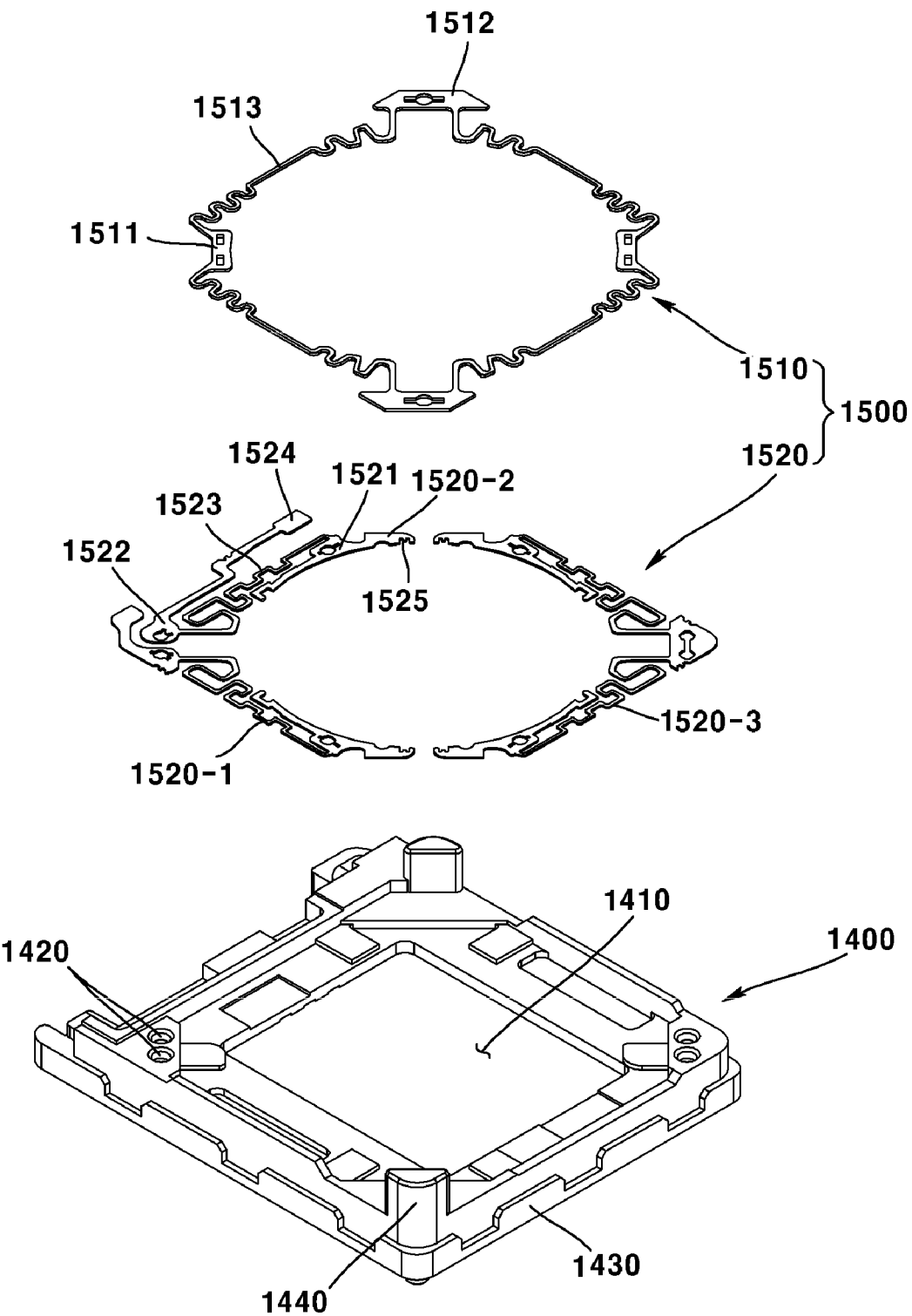
Figure 22:
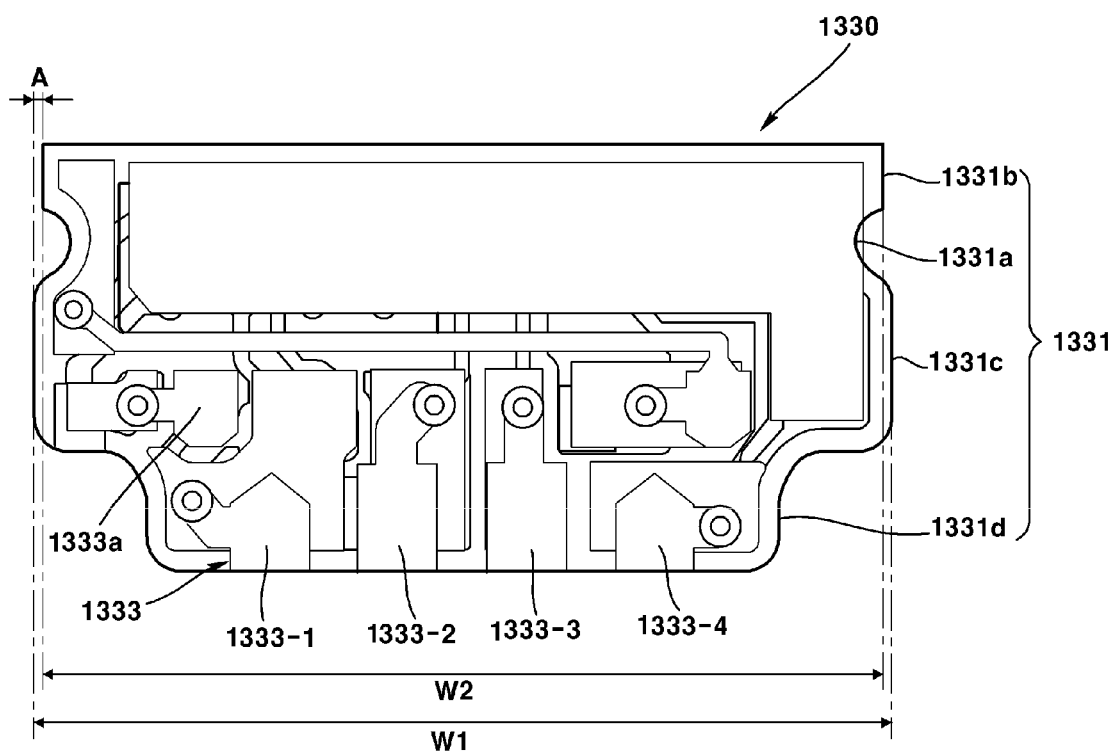
FIG. 22 is a schematic view illustrating the appearance of the board of the lens moving apparatus shown in FIG. 14.
Figure 23:
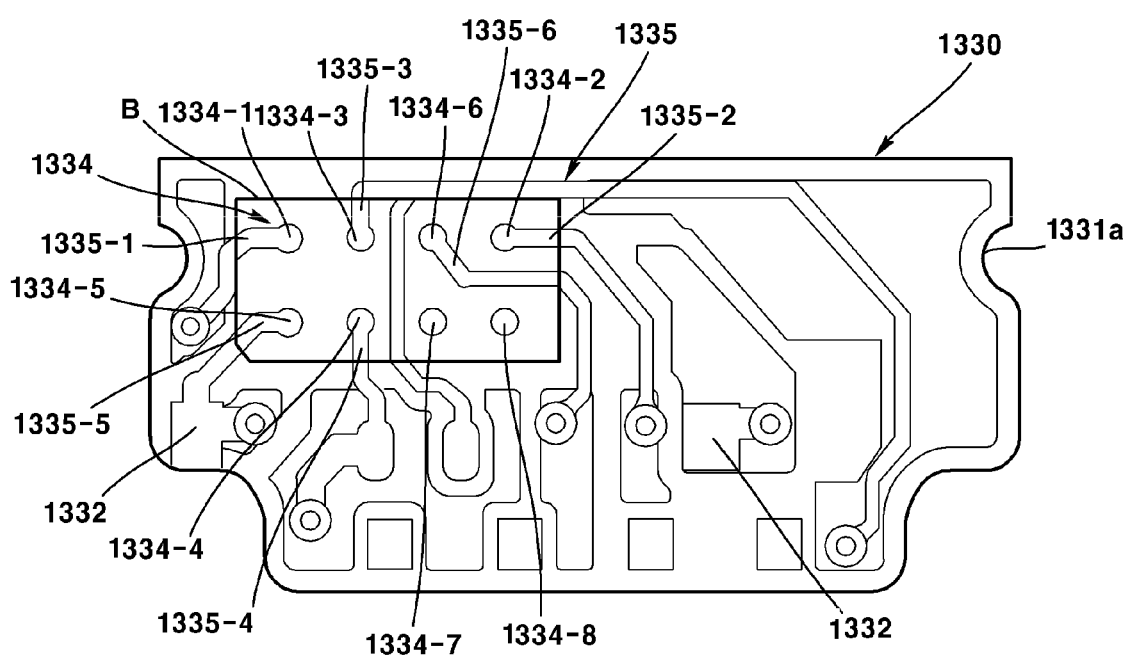
FIG. 23 is a schematic view illustrating the inner surface of the lens moving apparatus shown in FIG. 14.
Figure 24A:
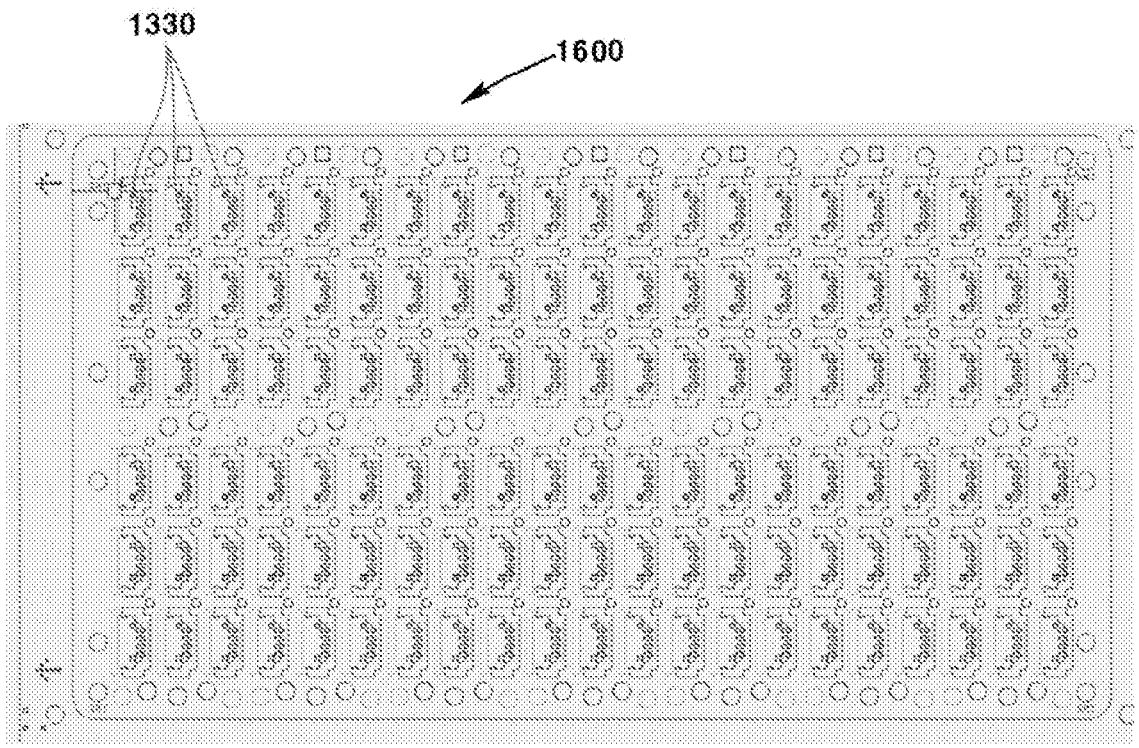
FIG. 24A is a schematic view of a bare FPCB in an arrayed state.
Figure 24B:
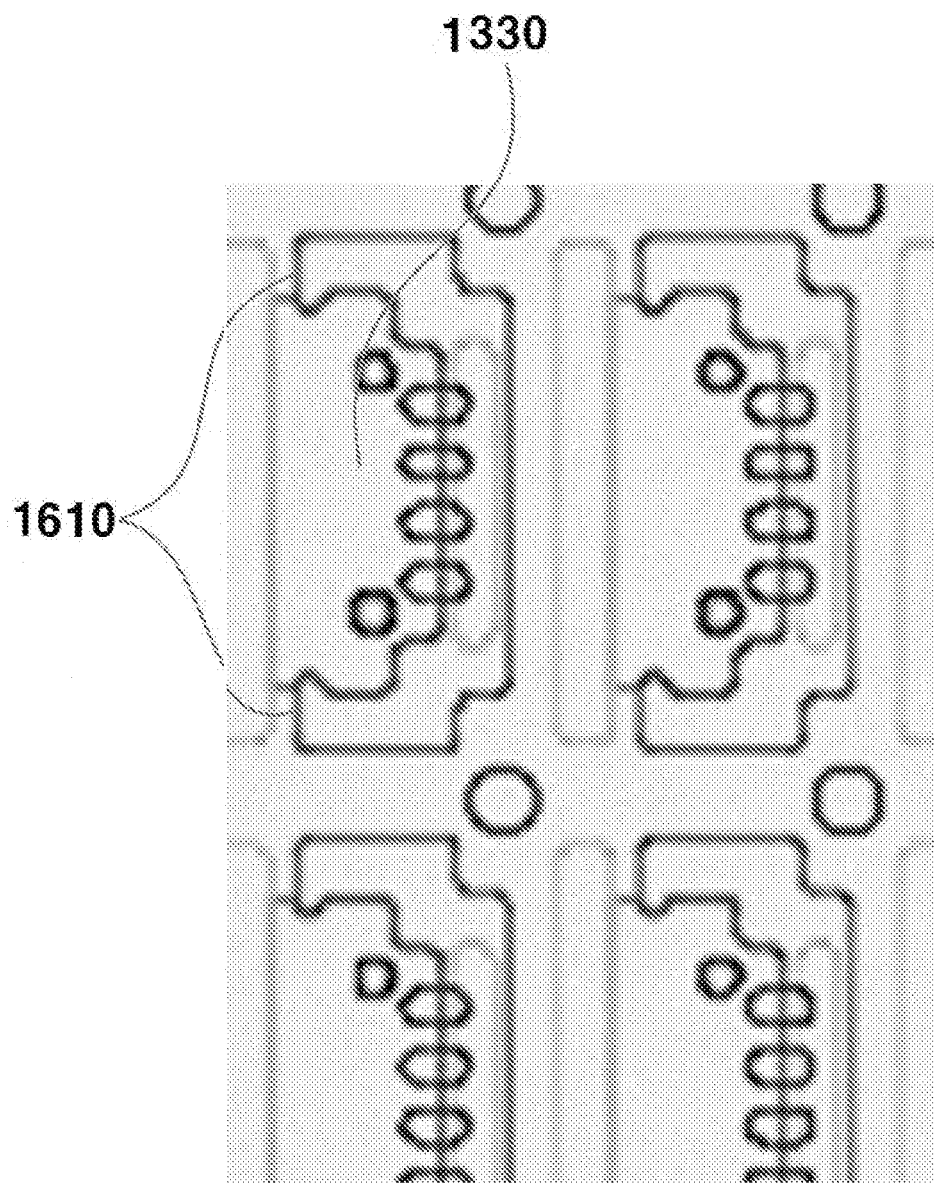
FIG. 24B is an enlarged view of a portion of the bare FPCB shown in FIG. 24A.

FIG. 14 is a perspective view of a lens moving apparatus 1010 according to another embodiment. FIG. 15 is a side view of the lens moving apparatus 1010 shown in FIG. 14. FIG. 16 is a cross-sectional view of the lens moving apparatus 1010 taken along line X-X in FIG. 14. FIG. 17 is a cross-sectional view of the lens moving apparatus 1010 taken along line Y-Y in FIG. 14. FIG. 18 is an exploded perspective view of the lens moving apparatus 1010 shown in FIG. 14. FIGS. 19 to 21 are exploded perspective views of some components of the lens moving apparatus 1010 shown in FIG. 14. FIG. 22 is a schematic view illustrating the appearance of the board of the lens moving apparatus 1010 shown in FIG. 14. FIG. 23 is a schematic view illustrating the inner surface of the lens moving apparatus 1010 shown in FIG. 14. FIG. 24A is a schematic view of a bare FPCB in an arrayed state. FIG. 24B is an enlarged view of a portion of the bare FPCB shown in FIG. 24A.

The lens moving apparatus 1010 may be a voice coil motor (VCM). The lens moving apparatus 1010 may be a lens-driving motor. The lens moving apparatus 1010 may be a lens-driving actuator. The lens moving apparatus 1010 may include an AF module. The lens moving apparatus 1010 may include a closed-loop autofocus (CLAF) module. The lens moving apparatus 1010 may include an OIS module.

The lens moving apparatus 1010 may include the cover 1100. The cover 1100 may include a 'cover can'. The cover 1100 may include a 'shield can'. The cover 1100 may be disposed so as to surround the housing 1310. The cover 1100 may be coupled to the base 1400. The cover 1100 may accommodate therein the housing 1310. The cover 1100 may define the appearance of the lens moving apparatus 1010. The cover 1100 may be configured to have a hexahedral shape, which is open at the lower surface thereof. The cover 1100 may be a non-magnetic body. The cover 1100 may be made of a metal. The cover 1100 may be embodied as a metal plate. The cover 1100 may be connected to the ground portion of the printed circuit board 1050. Accordingly, the cover 1100 may be grounded. The cover 1100 may block electromagnetic interference (EMI). Here, the cover 1100 may be referred to as an 'EMI shield can'.

The cover 1100 may include an upper plate 1110 and a side plate 1120. The cover 1100 may include the upper plate 1110, having therein a bore 1111, and the side plate 1120 extending downwards from the outer periphery or the edge of the upper plate 1110. The lower end of the side plate 1120 of the cover 1100 may be disposed at a stepped portion 1430 of the base 1400. The inner surface and/or the lower surface of the side plate 1120 of the cover 1100 may be fixed to the base 1400 using an adhesive. The upper plate 1110 of the cover 1100 may therein have a bore 1111 corresponding to the bore 1211 in the bobbin 1210.

The side plate 1120 of the cover 1100 may include a plurality of side plates. The plurality of side plates may include first to fourth side plates. The side plates 1120 of the cover 1100 may include first and second side plates, which are disposed opposite each other, and third and fourth side plates, which are disposed opposite each other between the first and second side plates.

The lens moving apparatus 1010 may include an operation unit 1200. The operation unit 1200 may be a unit in which a component or components, which are moved relative to a stationary unit 1300 during AF operation of a camera device 200, are coupled to each other. The operation unit 1200 may include a bobbin 1210 and a coil 1220. The operation unit 1200 may include a second magnet 1230. The operation unit 1200 may include a second magnet 1230.

The operation unit 1200 may include the bobbin 1210. The bobbin 1210 may be disposed in the cover 1100. The bobbin 1210 may be disposed in the housing 1310. The bobbin 1210 may be disposed in the bore 1311 in the housing 1310. The bobbin 1210 may be movably coupled to the housing 1310. The bobbin 1210 may be movable relative to the housing 1310 in the optical-axis direction. A lens may be coupled to the bobbin 1210. The bobbin 1210 and the lens may be coupled to each other using threaded coupling and/or an adhesive. The coil 1220 may be coupled to the bobbin 1210. An upper elastic member 1510 may be coupled to the upper portion of the bobbin 1210. A lower elastic member 1520 may be coupled to the lower portion of the bobbin 1210. The elastic member 1500 may be coupled to the bobbin 1210 using heat fusion and/or an adhesive. The adhesive that is used to couple the lens to the bobbin 1210 and to couple the elastic member 1500 to the bobbin 1210 may be epoxy, which is hardened by at least one of ultraviolet, heat, and laser.

The bobbin 1210 may include a plurality of side surfaces. When viewed from above, the bobbin 1210 may be configured to have an octagonal shape. The bobbin 1210 may include four side surfaces and four corner surfaces connecting the four side surfaces to each other.

The bobbin 1210 may have therein the bore 1211. The bore 1211 may be a through hole. The bore 1211 may be formed through the bobbin 1210 in the optical-axis direction. A lens module 400 may be received in the bore 1211. For example, the inner circumferential surface of the bobbin 1210, which defines the bore 1211, may be provided with a thread corresponding to the thread formed in the outer circumferential surface of the lens module 400.

The bobbin 1210 may include a protrusion 1212. The protrusion 1212 may be a coil coupler around which the coil 1220 is wound. The protrusion 1212 may project from the outer circumferential surface of the bobbin 1210. The coil 1220 may be disposed at the protrusion 1212. The coil 1220 may be wound around the protrusion 1212. The protrusion 1212 may include a plurality of protrusions. The protrusions 1212 may be formed on two corner surfaces that are disposed opposite each other, among the four corner surfaces of the bobbin 1210. The protrusions 1212 may be formed on the two corner surfaces such that two protrusions are formed on each of the two corner surfaces so as to be spaced apart from each other.

The bobbin 1210 may include a first stopper 1213. The first stopper 1213 may be an upper stopper configured to limit the upward moving distance of the bobbin 1210. The first stopper 1213 may be formed on the upper surface of the bobbin 1210. The first stopper 1213 may project from the upper surface of the bobbin 1210. The first stopper 1213 may overlap the upper plate 1110 of the cover 1100 in a direction parallel to the optical axis. Accordingly, when the bobbin 1210 is moved upwards, the first stopper 1213 of the bobbin 1210 may come into contact with the inner surface of the upper plate 1110 of the cover 1100. In other words, the first stopper 1213 may mechanically limit the upward stroke distance of the bobbin 1210.

The bobbin 1210 may include a second stopper 1214. The second stopper 1214 may be an anti-rotation stopper configured to limit rotation of the bobbin 1210. The second stopper 1214 may be formed on the outer surface of the bobbin 1210. The second stopper 1214 may project from the side surface of the bobbin 1210. The second stopper 1214 may overlap the housing 1310 in the rotational direction or the circumferential direction of the bobbin 1210. The second stopper 1214 may be disposed in a second groove 1314 in the housing 1310. When the bobbin 1210 rotates, the second stopper 1214 may be caught by the housing 1310, thereby limiting the rotation of the bobbin 1210.

The bobbin 1210 may have therein a first groove 1215. The first groove 1215 may be an adhesive-receiving groove in which an adhesive for securing the upper elastic member 1510 is disposed. The first groove 1215 may be formed in the upper surface of the bobbin 1210. An adhesive may be disposed in the first groove 1215. The bobbin 1210 and the upper elastic member 1510 may be coupled to each other in the first groove 1215. The first groove 1215 may include a plurality of grooves. The first groove 1215 may include two grooves, which are symmetrically positioned with respect to the optical axis.

The bobbin 1210 may have therein a second groove 1216. The second groove 1216 may be a magnet-receiving groove for receiving the second magnet 1230. The second groove 1216 may be formed in the upper surface of the bobbin 1210. The second groove 1216 may be formed in the outer surface of the bobbin 1210. The second groove 1216 may receive the second magnet 1230 therein. The second groove 1216 may be open at the upper surface of the bobbin 1210. The second magnet 1230 may be fitted into the second groove 1216 in the bobbin 1210 from above. The second groove 1216 may be configured to have size and shape corresponding to those of the second magnet 1230. The second groove 1216 may be open at the outer surface of the bobbin 1210. Here, because the width of the outer opening of the second groove 1216 is less than the width of the second magnet 1230 in the corresponding direction, it is possible to prevent a phenomenon in which the second magnet 1230 escapes outwards.

The description of the projection 115*b* of the bobbin 110 shown in FIGS. 3A and 3B may be applied to the bobbin 1210 shown in FIG. 19, with or without modification. The description of the seating groove 180*a* in the bobbin 110 shown in FIGS. 3A and 3B may be applied to the second groove 1216 shown in FIG. 19, with or without modification.

The description of the sensing magnet 180 shown in FIGS. 3A and 3B may be applied to the second magnet 1230 shown in FIG. 19, with or without modification.

An operation unit 1200 may include the coil 1220. The coil 1220 may be an 'AF moving coil', which is used to perform an AF operation. The coil 1220 may be disposed at the bobbin 1210. The coil 1220 may be disposed between the bobbin 1210 and the housing 1310. The coil 1220 may be disposed between the bobbin 1210 and the side plate 1120 of the cover 1100. The coil 1220 may be disposed on the outer surface or the outer peripheral surface of the bobbin 1210. The coil 1220 may be wound around the bobbin 1210. Alternatively, the coil 1220 may be wound alone, and may then be coupled to the bobbin 1210. The coil 1220 may face the first magnet 1320. The coil 1220 may be disposed so as to face the first magnet 1320. The coil 1220 may electromagnetically interact with the first magnet 1320. Here, when current flows in the coil 1220 and thus an electromagnetic field is generated around the coil 1220, the coil 1220 may be moved relative to the first magnet 1320 by virtue of the electromagnetic interaction between the coil 1220 and the first magnet 1320. The coil 1220 may be composed of a single coil. Alternatively, the coil 1220 may be composed of a plurality of coils, which are spaced apart from each other.

Both the coil 1220 and the bobbin 1210 may be moved upward in the optical-axis direction when forward current is applied to the coil 1220, and may be moved downwards in the optical-axis direction when reverse current is applied to the coil 1220. At the initial position at which current is not applied to the coil 1220, the bobbin 1210 may be spaced apart from the upper plate 1110 of the cover 1100 with a first gap therebetween, and may be spaced apart from the base 1400 with a second gap therebetween. The bobbin 1210 may be moved in a direction such that the first gap decreases when forward current is applied to the coil 1220, and may be moved in a direction such that the second gap decreases when reverse current is applied to the coil 1220. Alternatively, the operation unit 1200 may be moved downwards when reverse current is applied to the coil 1220, and may be moved upwards when forward current is applied to the coil 1220.

The coil 1220 may include a plurality of coils. The coil 1220 may include two coils. In this case, the two coils may be conductively connected to each other. In a modification, the plurality of coils may be conductively isolated from each other. The coil 1220 may include two loop coils. The coil 1220 may include a first coil 1221 and a second coil 1222. Each of the first coil 1221 and the second coil 1222 may be wound around the protrusion 1212 of the bobbin 1210 such that current flows in opposite directions in upper and lower parts of the coil. The coil 1220 may include the first coil 1221 that faces a first of first magnet 1321, and the second coil 1222, which faces a second of first magnet 1322. The first coil 1221 may be connected at one end thereof to a first elastic unit 1520-1 of the lower elastic member 1520, and may be connected at the other end thereof to a third elastic unit 1520-3. The second coil 1222 may be connected at one end thereof to a second elastic unit 1520-2, and may be connected at the other end thereof to the third elastic unit 1520-3.

The operation unit 1200 may include the second magnet 1230. The second magnet 1230 may be a sensing magnet. The second magnet 1230 may be disposed at the bobbin 1210. The second magnet 1230 may be moved together with the bobbin 1210 and the lens coupled to the bobbin 1210. The second magnet 1230 may be disposed close to a sensor 1340. The second magnet 1230 may be disposed so as to face the sensor 1340. The second magnet 1230 may face the sensor 1340. The second magnet 1230 may be detected by the sensor 1340. In a modification, the operation unit 1200 may include a compensation magnet for maintaining the equilibrium of magnetic force between the compensation magnet and the second magnet 1230. The compensation magnet and the second magnet 1230 may be symmetrically disposed with each other with respect to the optical axis.

In the embodiment, the bobbin 1210 may include four side surfaces and four corner surfaces between the four side surfaces. The bobbin 1210 may include first to fourth side surfaces and first to fourth corner surfaces. The first magnets 1320 may be disposed so as to face two corner surfaces among the four corner surfaces of the bobbin 1210. The first magnets 1320 may be disposed so as to face the first and third corner surfaces of the bobbin 1210. The second magnet 1230 may be disposed at one side surface among the four side surfaces of the bobbin 1210. The second magnet 1230 may be disposed close to a corner surface of the bobbin 1210 that does not face the first magnets 1320, among the four corner surfaces of the bobbin 1210. The second magnet 1230 may be disposed close to the first side surface of the bobbin 1210 at a position closer to the second corner surface of the bobbin 1210 than to the first corner surface of the bobbin 1210.

The lens moving apparatus 1010 may include the stationary unit 1300. The stationary unit 1300 may be a unit in which a component or components that perform almost no movement compared to the operation unit 1200 during AF operation are coupled to each other. The stationary unit 1300 may include the housing 1310 and the first magnets 1320. The stationary unit 1300 may include a board 1330 and the sensor 1340. Furthermore, the base 1400 and the cover 1100 may also be considered as the stationary unit 1300.

The stationary unit 1300 may include the housing 1310. The housing 1310 may be disposed between the bobbin 1210 and the cover 1100. The housing 1310 may be disposed outside the bobbin 1210. The housing 1310 may receive at least a portion of the bobbin 1210. The housing 1310 may be disposed inside the cover 1100. The housing 1310 may be made of a material different from that of the cover 1100. The housing 1310 may be made of an insulation material. The housing 1310 may be an injection-molded object. The first magnets 1320 may be disposed at the housing 1310. The housing 1310 and the first magnets 1320 may be coupled to each other using an adhesive. The upper elastic member 1520 may be coupled to the upper portion of the housing 1310. The lower elastic member 1520 may be coupled to the lower portion of the housing 1310. The housing 1310 may be coupled to the elastic member 1500 by means of heat fusion and/or an adhesive. The adhesive used to couple the housing 1310 to the first magnets 1320 and to couple the housing 1310 to the elastic member 1500 may be epoxy, which is hardened by at least one of ultraviolet radiation, heat, and laser.

The housing 1310 may include a plurality of side portions and a plurality of corner portions disposed between the plurality of side portions. The housing 1310 may include four side portions and four corner portions. The housing 1310 may include first to fourth side portions and first to fourth corner portions.

The housing 1310 may have therein a bore 1311. The bore 1311 may be a through hole. The bore 1311 may be formed through the housing 1310 in the optical-axis direction. The bobbin 1210 may be disposed in the bore 1311.

The housing 1310 may have first grooves 1312 formed therein. The first grooves 1312 may be magnet-receiving grooves for respectively receiving the first magnets 1320. The first grooves 1312 may be formed in the lower surface of the housing 1310. The first grooves 1312 may be formed in the inner circumferential surface of the housing 1310. The first grooves 1312 may respectively receive the first magnets 1320 therein. The first magnets 1320 may be respectively disposed in the first grooves 1312. Each of the first grooves 1312 may be configured to have a shape corresponding to the shape of each of the first magnets 1320. The first grooves 1312 may include a plurality of grooves. The first grooves 1312 may be formed in corner portions of the housing 1310. The first grooves 1312 may be formed in two corner portions that are positioned opposite each other, among the four corner portions of the housing 1310.

The housing 1310 may have a second groove 1314 formed therein. The second groove 1314 may be a stopper-receiving groove for receiving the second stopper 1214 of the bobbin 1210. The second groove 1314 may be formed in the lower surface of the housing 1310. The second groove 1314 may be formed in the inner circumferential surface of the housing 1310. The second groove 1314 may receive therein at least a portion of the second stopper 1214 of the bobbin 1210. The second groove 1314 may be configured so as to be larger than the second stopper 1214 of the bobbin 1210.

The housing 1310 may include a protrusion 1315. The protrusion 1315 may be a coupling protrusion, which is coupled to the upper elastic member 1510. The protrusion 1315 may be formed on the upper surface of the housing 1310. The protrusion 1315 may be inserted into a hole in the upper elastic member 1510. The protrusion 1315 may be coupled to the upper elastic member 1510. The protrusion 1315 may include a plurality of protrusions. The protrusions 1315 may be formed at corner portions of the housing 1310. The protrusions 1315 may be formed at two corner portions that are disposed opposite each other, among the four corner portions of the housing 1310.

The housing 1310 may have a third groove 1316 formed therein. The third groove 1316 may be an adhesive-receiving groove in which an adhesive for securing the upper elastic member 1510 to the housing 1310 is received. The third groove 1316 may be formed in the upper surface of the housing 1310. The third groove 1316 may be formed around the protrusion 1315. The third groove 1316 may be formed at the periphery of the protrusion 1315. The third groove 1316 may be formed adjacent to the protrusion 1315. An adhesive for securing the upper elastic member 1510 to the housing 1310 may be disposed in the third groove 1316.

The housing 1310 may include a fourth groove 1317. The fourth groove 1317 may be a reception groove for receiving therein the board 1330 and the sensor 1340. The fourth groove 1317 may be formed in the lower surface of the housing 1310. The fourth groove 1317 may be formed in the inner surface of the housing 1310. At least one of the board 1330 and the sensor 1340 may be disposed in the fourth groove 1317. At least a portion of the fourth groove 1317 may be configured to have a shape corresponding to the board 1330. The fourth groove 1317 may include a portion having a width corresponding to a first width W1 (see FIG. 22) of the board 1330.

The description of the housing 140 shown in FIGS. 5A and 5B may be applied to the housing 1310 shown in FIG. 20, with or without modification. For example, the description of the housing 140 may be applied to the fourth groove 1317 in the housing 1310, with or without modification.

The stationary unit 1300 may include the first magnets 1320. The lens moving apparatus 1010 may include the first magnets 1320. The first magnets 1320 may be disposed at the housing 1310. The first magnets 1320 may be disposed between the bobbin 1210 and the housing 1310. The first magnets 1320 may be disposed between the bobbin 1210 and the side plate 1120 of the cover 1100. The first magnets 1320 may respectively face the coils 1220. The first magnets 1320 may be disposed so as to respectively face the coils 1220. The first magnets 1320 may electromagnetically interact with the coils 1220. The first magnets 1320 may be disposed at corner portions of the housing 1310. Here, each of the first magnets 1320 may be a corner magnet having a hexahedral shape in which the inner surface area thereof is larger than the outer surface area thereof. In a modification, the first magnets 1320 may be disposed at the side portions between the corner portions of the housing 1310. Here, each of the first magnets 1320 may be a flat plate magnet having a flat-plate shape. The polarities of the upper and lower portions of each of the first magnets 1320 may be different from each other. The upper surface of each of the first magnets 1320 may serve as an N pole, and the lower surface thereof may serve as an S pole. Alternatively, the upper surface of each of the first magnets 1320 may serve as an S pole, and the lower surface thereof may serve as an N pole. A neutral portion may be defined at the center between the upper and lower portions of each of the first magnets 1320.

Because the term "first magnet 1320" is prefixed with "first" in order to distinguish the first magnet 1320 from the second magnet 1230, the first magnet may also be referred to as a "magnet". Furthermore, the term "first magnet 1320" may be interchangeably used with a "second magnet", and the term "second magnet 1230" may be interchangeably used with "first magnet".

The first magnets 1320 may include a plurality of magnets. The first magnets 1320 may include two magnets. The first magnets 1320 may include the first of first magnet 1321 and the second of first magnet 1322. The first magnets 1320 may include the first of first magnet 1321, which is disposed at the first corner of the housing 1310, and the second of first magnet 1322, which is disposed at the second corner, opposite the first corner of the housing 1310.

The stationary unit 1300 may include the board 1330. The board 1330 may be disposed at the housing 1310. The board 1330 may be disposed between the side plate 1120 of the cover 1100 and the bobbin 1210. The sensor 1340 may be disposed at the board 1330. The board 1330 may be coupled to the printed circuit board 1050. The board 1330 may include a printed circuit board (PCB). The board 1330 may include a flexible printed circuit board (FPCB).

For example, the description of the distance between the sensing magnet 180 and the position sensor 170 shown in FIG. 4B may be applied to the distance between the second magnet 1230 and the sensor 1340, with or without modification. Furthermore, the description of the sensor 170 shown in FIG. 6C may be applied to the sensor 1340, with or without modification.

The board 1330 may include two lateral side surfaces 1331. The lateral side surfaces 1331 of the board 1330 may be the reference surfaces for an operation of assembling the board 1330 with the housing 1310. The board 1330 may include an inner surface, on which the sensor 1340 is disposed, an outer surface opposite the inner surface, and the lateral side surfaces 1331 connecting the inner surface to the outer surface. The board 1330 may include upper and lower surfaces connecting the inner surface to the outer surface. The lateral side surfaces 1331 of the board 1330 may connect the upper surface to the lower surface. The lateral side surfaces 1331 may be oriented vertically, and the upper and lower surfaces may be oriented horizontally.

The lateral side surfaces 1331 of the board 1330 may have grooves 1331*a* therein. Each of the lateral side surfaces 1331 of the board 1330 may have a groove 1331*a* therein. Each of the grooves 1331*a* may be formed in the center of a corresponding one of the lateral side surfaces 1331 of the board 1330. Each of the grooves 1331*a* may be formed between the center of a corresponding one of the lateral side surfaces 1331 of the board 1330 and the upper end of the board 1330. Each of the grooves 1331*a* may be formed in a corresponding one of the lateral side surfaces 1331 of the board 1330 so as to have a concave shape. Each of the grooves 1331*a* may have a semicircular shape. The grooves 1331*a* may serve to facilitate holding by a blanking jig. Each of the grooves 1331 may be configured to have a shape corresponding to at least a portion of the blanking jig.

Each of the lateral side surfaces 1331 of the board 1330 may include a first portion 1331*b* and a second portion 1331*c*. The first portion 1331*b* may be positioned above the groove 1331*a*. The second portion 1331*c* may be positioned under the groove 1331*a*. The second portions 1331*c* of the lateral side surfaces 1331 of the board 1330 may be the reference surface for an operation of assembling the board 1330 with the housing 1310.

The width between the two lateral side surfaces 1331 of the board 1330 may be configured such that a first width W2 between the first portions 1331*b* is less than a second width W1 between the second portions 1331*c* (W2<W1). The distance between the two lateral side surfaces 1331 of the board 1330 may be configured such that the distance between the first portions 1331*b* positioned above the grooves 1331*a* is less than the distance between the second portions 1331*c* positioned under the grooves 1331*a*. The distance between the first portions 1331*b* of the two lateral side surfaces 1331 of the board 1330 may correspond to the second width W2 of the board 1330 (see FIG. 22). Meanwhile, the distance between the second portions 1331*c* of the two lateral side surfaces of the board 1330 may correspond to the first width W1 of the board 1330 (see FIG. 22). A gap A (see FIG. 22) may be defined between each of the first portions 1331 and a corresponding one of the second portions 1331*c* of the board 1330.

The lateral side surfaces 1331 of the board 1330 may be configured such that the first portion 1331*b* positioned above the groove 1331*a* is positioned further inwards than the second portion 1331*c* positioned under the grooves 1331*a*. The second portion 1331*c* of the lateral side surface 1331 of the board 1330 may project further outwards than the first portion 1331*b* of the lateral surface 1331 of the board 1330. Burrs may be formed at the first portions 1331*b* of the lateral side surfaces 1331 of the board 1330. In the embodiment, because burrs are formed at the first portions 1331*b* of the board 1330, the burrs may be disposed within the second portions 1331*c*, without projecting further outwards than the second portions 1331*c*. The second portions 1331*c* of the lateral side surfaces 1331 of the board 1330 may be in contact with the housing 1310. More specifically, the second portions 1331*c* of the lateral side surfaces 1331 of the board 1330 may be in contact with an assembly surface of the housing 1310. In a comparative embodiment, when burrs project to the outermost sides of the board 1330, the assembly surface of the housing 1310 may come into contact with the burrs rather than the second portions 1331*c* of the board 1330, thereby preventing the board 1330 from being positioned at the normal position. In the embodiment of the present invention, since the second portions 1331*c* of the board 1330 come into contact with the assembly surface of the housing 1310 even when burrs are formed, it is possible to position the board 1330 at the normal position on the housing 1310 regardless of generation of burrs.

In the embodiment, the board 1330 may be available as a bare FPCB 1600 in an arrayed state, as illustrated in FIG. 14A. After the sensors 1340 and capacitors 1350 are mounted on the FPCB 600 in an arrayed state through SMT (surface-mounting technology), the boards 1330 may be individually blanked using a blanking jig. At this time, bridges 1610 connected to the boards 1330 may be cut, which generates burrs. In the embodiment, the bridges 1610 may be formed at the first portions 1331*b* of the lateral side surfaces 1331 such that the board 1330 is coupled to the housing 1310 in place even when burrs are present. In the embodiment, it is possible to design the board 1330 such that the portions of the board 1330 that are to be blanked are positioned within the outermost sides of the board 1330. Accordingly, it is possible to prevent a phenomenon in which driver ICs are damaged by a blanking jig while the boards in an arrayed state are blanked. Furthermore, it is possible to prevent a phenomenon in which the board 1330 is not assembled with the housing 1310 because burrs are generated during an operation of blanking the boards of array state.

With the change in design from OLAF (open loop autofocus) to CLAF (closed-loop autofocus), Hall-integrated driver ICs and capacitors must be additionally provided to the FPCBs. The driver ICs and the capacitors 1350 are additionally mounted on the small-sized FPCBs through a SMT, and the FPCBs in an arrayed state are individually blanked using a blanking jig. At this time, the driver ICs are depressed and broken by the blanking jig, thereby generating defects, which is an issue. The embodiment is able to eliminate defects by additionally providing the bridges 1610 having the shape shown in FIG. 24B.

The distance between the two lateral side surfaces 1331 of the board 1330 may be set such that the distance between the first portions 1331b of the board 1330 may be greater than the distance between third portions 1331d of the board 1330 positioned between the second portions 1331c and the lower end of the board 1330. The second width W2 between the first portions 1331b of the lateral side surfaces of the board 1330 may be greater than the width of the lower end of the board 1330. The third portions 1331d may correspond to the lateral side surfaces of the lower end of the board 1330, at which a second terminal 1333 is disposed.

The board 1330 may include a terminal. The board 1330 may include a plurality of terminals. The board 1330 may include a first terminal 1332. The board 1330 may include a second terminal 1333. Here, the first terminal 1332 may be used as an inner terminal formed on the inner surface of the board 1330, and the second terminal 1333 may be used as an outer terminal formed on the outer surface of the board 1330. The board 1330 may include a test terminal 1333a, which is disposed on the outer surface of the board 1330 and is spaced apart from the second terminal 1333. The test terminal 1333a may be used to test products during the process of manufacturing the products.

The board 1330 may include two first terminals 1332, which are disposed on the inner surface of the board 1330 and are coupled to the lower elastic member 1520, and four second terminals 1333 disposed on the outer surface of the lower end of the board 1330. The four second terminals 1333 may include power terminals (a GND terminal and a VDD terminal), a clock terminal (an SCL terminal), and a data terminal (a SDA terminal). The SCL terminal may be a serial clock terminal. The SDA terminal may be a serial data terminal. The second terminals 1333 may include first of second to fourth of second terminals 1333-1, 1333-2, 1333-3 and 1333-4. The first of second terminal 1333-1 may be the GND terminal. The second of second terminal 1333-2 may be the SCL terminal. The third of second terminal 1333-3 may be the SDA terminal. The fourth or second terminal 1333-4 may be the VDD terminal. Between the driver IC and the controller 780 of the lens moving apparatus 1010 according to the embodiment, power signals (a GND signal and a VDD signal) may be transmitted via the GND terminal and the VDD terminal, a clock signal (an SCL signal) may be transmitted via the SCL terminal, and a data signal (an SDA signal) may be transmitted via the SDA terminal. The driver IC of the lens moving apparatus 1010 according to the embodiment may receive the clock signal SCL, the data signal SDA and the power signals VCC and GND through data communication using a protocol such as, for example, I2C communication.

The board 1330 may include a ball grid array (BGA) 1334. The BGA 1334 may be coupled to the sensor 1340 via solder. The BGA 1334 may be formed on the inner surface of the board 1330.

The BGA 1334 may include a plurality of BGAs. The BGAs may include eight BGAs. The board 1330 may include first to fourth BGAs 1334-1 to 1334-4. The board 1330 may include a fifth BGA 1334-5. The board 1330 may include first to eight BGAs 1334-1 to 1334-8.

The board 1330 may include a conductive pattern 1335. The board 1330 may include a first conductive pattern 1335-1 extending from the first BGA 1334-1 in a first direction, a second conductive pattern 1335-2 extending from the second BGA 1334-2 in a second direction, a third conductive pattern 1335-3 extending from the third BGA 1334-3 in a third direction, and a fourth conductive pattern 1335-4 extending from the fourth BGA 1334-4 in a fourth direction. Here, the first direction may be opposite the second direction. The first direction may be parallel to the second direction. The third direction may be opposite the fourth direction. The third direction may be parallel to the fourth direction. The third direction may not be parallel to the first direction. In a modification, the first direction may not be parallel to the second direction, and the third direction may not be parallel to the fourth direction. Furthermore, the board 1330 may include a fifth conductive pattern 1335-5 extending from the fifth BGA 1334-5 in a fifth direction parallel to the first direction. The board 1330 may include a sixth conductive pattern 1335-6 extending from the sixth BGA 1334-6 in a sixth direction. Here, the sixth direction may be different from the first to fifth directions. A conductive pattern may be disposed between the third BGA 1334-3 and the sixth BGA 1334-6 and between the fourth BGA 1334-4 and the seventh BGA 1334-7.

The board 1330 may include an insulation layer disposed on the inner surface of the board 1330. The insulation layer may be considered to define the inner surface of the board 1330. The insulation layer may include a solder-resist-opening region, which is formed by opening a portion of the insulation layer. The insulation layer may include the first to fourth BGAs 1334-1 to 1334-4, and holes, which are portions of the first to fourth conductive patterns 1335-1 to 1335-4 and expose portions extending from the first to fourth BGA 1334-1 to 1334-4 therethrough. Here, the portions that are exposed through the holes in the insulation layer may be the solder-resist-opening regions. Solder, which connects the sensor 1340 to the board 1330, may be disposed at the first to fourth BGAs 1334-1 to 1334-4 and at portions of the first to fourth conductive patterns of the regions through which the insulation layer is exposed. The solder, which connects the board 1330 to the driver IC, may be embedded not only in the BGA 1334 but also in portions of the conductive pattern 1335 of the regions through which the insulation layer is exposed. In the embodiment, since the conductive pattern 1335 of the region through which the insulation layer is exposed is designed so as to be parallel and symmetrical, it is possible to minimize a phenomenon in which the driver IC is tilted during SMT.

According to the embodiment, since the conductive pattern 1335 is designed in a parallel fashion in horizontal and vertical directions in the design of an FPCB pattern of the BGA 1334 to be coupled to the driver IC, it is possible to prevent the driver IC from being tilted during SMT of the driver IC. This characteristic may be more critical because an error in sensing by the Hall sensor occurs when the driver IC is tilted in the case in which the driver IC is integrally formed with the Hall sensor as in the embodiment.

In a CLAF-type model, the pattern of the driver IC is designed into a BGA type in an FPCB. In this case, if the BGA-type conductive pattern 1335 is not designed so as to be regularly arranged in horizontal and vertical directions, as shown in FIG. 23, the driver IC is tilted due to the amount of solder after the driver IC is mounted on the FPCB through SMT. For this reason, the Hall sensor incorporated in the driver IC may be displaced, thus making the output performance of the Hall abnormal. Furthermore, because the reference point (the upper end of the driver IC) is not positioned in place due to a defect in the driver IC caused by SMT when the FPCB is assembled with the housing 1310, manufacturing failure may occur. The embodiment may be the optimal design for overcoming this problem.

Figure 31:
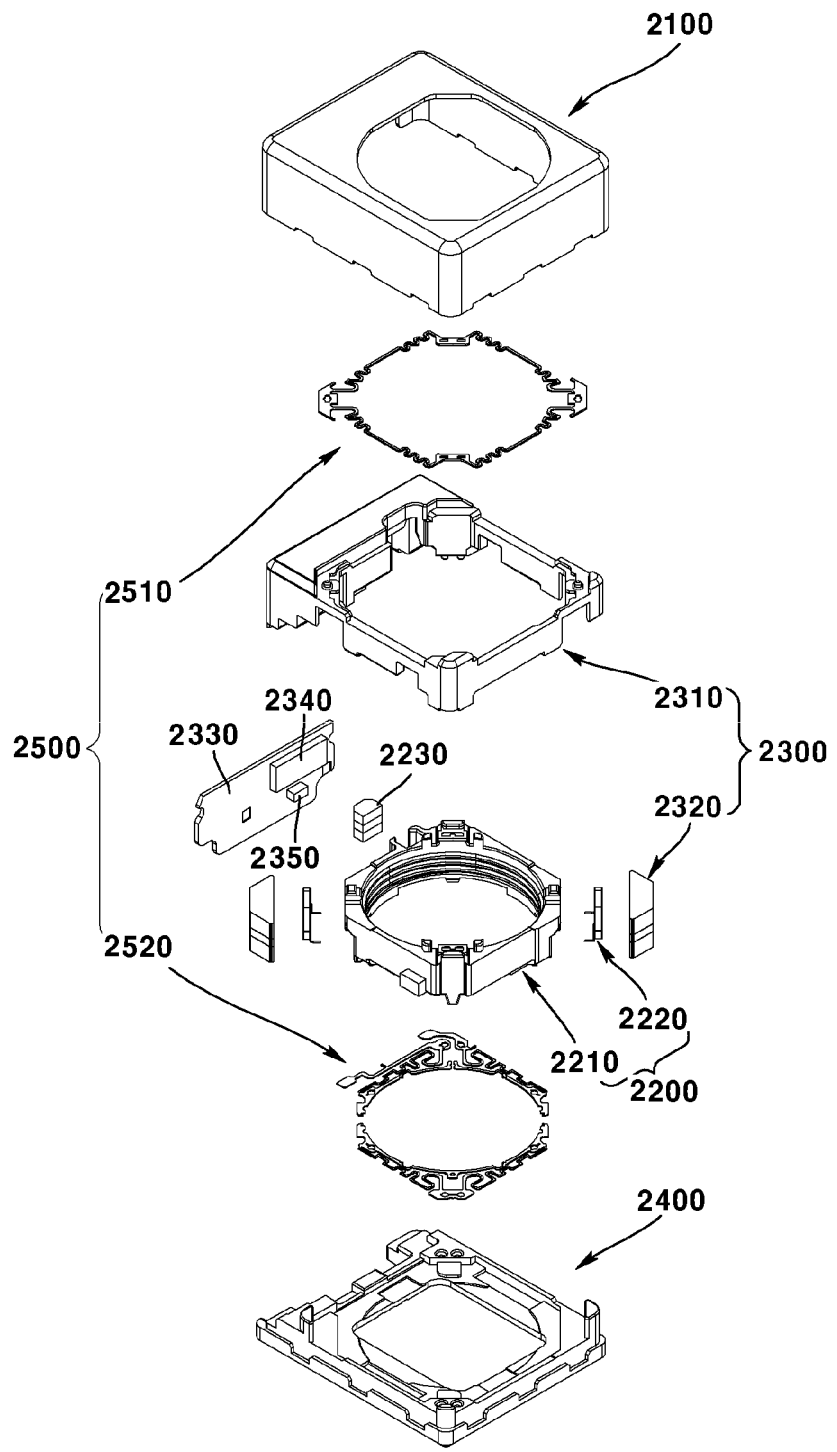
FIG. 31 is an exploded perspective view of the lens moving apparatus of FIG. 25.

The description of FIGS. 22 to 24 may also be applied to the lens moving apparatus 100 shown in FIG. 1 and to the lens moving apparatus 2010 shown in FIG. 31, with or without modification.

For example, the description of the board 1330, the first and second terminals 1332 and 1333, the widths W1 and W2, the BGAs (ball grid arrays) 1334, the conductive pattern 1335, and the bare FPCB 1660 in an arrayed state may also be applied to the lens moving apparatus 100 shown in FIG. 1 and the lens moving apparatus 2010 shown in FIG. 31, with or without modification.

The stationary unit 1300 may include the sensor 1340. The sensor 1340 may be disposed at the board 1330. The sensor 1340 may be coupled to the region B (see FIG. 23) of the board 1330 in which the BGA 1334 is formed. The sensor 1340 may face the second magnet 1230. The sensor 1340 may be conductively connected to the coils 1220 via the lower elastic member 1520. The sensor 1340 may include the driver IC, which is conductively connected to the coils 1220. In other words, the sensor 1340 may include the driver IC. Here, the driver IC may be described as including the sensor 1340. The driver IC may include the Hall sensor, which is disposed at the board 1330 so as to detect the second magnet 1230. The driver IC and the sensor 1340 may be integrally formed with each other. The lens moving apparatus 1010 may include the sensor 1340 with the driver IC incorporated thereinto. The lens moving apparatus 1010 may include the driver IC with the sensor 1340 incorporated thereinto. The lens moving apparatus 1010 may include a Hall-integrated driver IC. The lens moving apparatus 1010 may include the capacitor 1350. The capacitor 1350 may be coupled to the inner surface of the board 1330. The capacitor 1350 may be disposed so as to be spaced apart from the sensor 1340.

The sensor 1340 may be disposed close to one of the two lateral side surfaces of the board 1330. At least a portion of the sensor 1340 may overlap the second magnet 1230 in a direction perpendicular to the optical axis. The sensor 1340 may be eccentrically disposed on the inner surface of the board 1330 close to one side of the board 1330.

The lens moving apparatus 1010 may include the base 1400. The base 1400 may be included in the stationary unit 1300. The base 1400 may be disposed under the housing 1310. The base 1400 may be disposed under the bobbin 1210. At least a portion of the base 1400 may be spaced apart from the bobbin 1210. The base 1400 may be coupled to the side plate 1120 of the cover 1100.

The base 1400 may have therein a bore 1410. The bore 1410 may be formed in the base 1400. The bore 1410 may be formed through the base 1400 in the optical-axis direction. The light having passed through the lens module 400 and the bore 1410 may be incident on the image sensor 60. The bore 1410 in the base 1400 may be formed at a position corresponding to the bore 1211 in the bobbin 1210 so as to have a size corresponding to the bore 1211 in the bobbin 1210.

The base 1400 may have a groove 1420 formed therein. The groove 1420 may be an adhesive-receiving groove in which an adhesive for securing the lower elastic member 1520 to the base 1400 is received. The groove 1420 may be formed in the upper surface of the base 1400. The groove 1420 may include a plurality of grooves. Each of the grooves 1420 may be configured to have a size corresponding to the hole in the outer portion 1522 of the lower elastic member 1520. An adhesive for bonding the lower elastic member 1520 may be disposed in the grooves 1420.

The base 1400 may include the stepped portion 1430. The stepped portion 1430 may be formed on the side surface of the base 1400. The stepped portion 1430 may be formed on the base 1400 so as to surround the outer circumferential surface of the base 1400. The stepped portion 1430 may be formed by projection or depression of a portion of the side surface of the base 1400. The lower end of the side plate 1120 of the cover 1100 may be disposed on the stepped portion 1430.

The base 1400 may include posts 1440. The posts 1440 may be formed on the upper surface of the base 1400. The posts 1440 may project from the upper surface of the base 1400. The posts 1440 may be formed at corners of the base 1400. The posts 1440 may be formed at two corners disposed opposite each other, among the four corners of the base 1400. The posts 1440 may be fitted into the housing 1310. Among the four corners of the base 1400, two corners may be provided with the posts 1440, and the two remaining corners may be provided with the grooves 1420.

The lens moving apparatus 1010 may include the elastic member 1500. The elastic member 1500 may connect the housing 1310 to the bobbin 1210. The elastic member 1500 may be coupled both to the housing 1310 and to the bobbin 1210. The elastic member 1500 may movably support the bobbin 1210. The elastic member 1500 may elastically support the bobbin 1210. At least a portion of the elastic member 1500 may be elastic. The elastic member 1500 may support movement of the bobbin 1210 during AF operation. Here, the elastic member 1500 may be an "AF support member".

The elastic member 1500 may include the upper elastic member 1510. The upper elastic member 1510 may be coupled both to the upper portion of the bobbin 1210 and to the upper portion of the housing 1310. The upper elastic member 1510 may be coupled to the upper surface of the bobbin 1210. The upper elastic member 1510 may be coupled to the upper surface of the housing 1310. The upper elastic member 1510 may be embodied as a leaf spring.

The upper elastic member 1510 may include an inner portion 1511. The inner portion 1511 may be coupled to the bobbin 1210. The inner portion 1511 may be coupled to the upper surface of the bobbin 1210. The inner portion 1511 may be fixed to the bobbin 1210 using an adhesive disposed in the first groove 1215 in the bobbin 1210. The inner portion 1511 may have a hole corresponding to the first groove 1215 in the bobbin 1210.

The upper elastic member 1510 may include an outer portion 1512. The outer portion 1512 may be coupled to the housing 1310. The outer portion 1512 may be coupled to the upper surface of the housing 1310. The outer portion 1512 may have therein a hole or a groove, which is coupled to the protrusion 1315 of the housing 1310. The outer portion 1512 may be fixed to the housing 1310 using an adhesive disposed in the third groove 1316 in the housing 1310.

The upper elastic member 1510 may include a connector 1513. The connector 1513 may connect the outer portion 1512 to the inner portion 1511. The connector 1513 may be elastic. Here, the connector 1513 may be referred to as an "elastic portion". The connector 1513 may be bent twice or more.

The elastic member 1500 may include the lower elastic member 1520. The lower elastic member 1520 may connect the bobbin 1210 to the housing 1310. The lower elastic member 1520 may be coupled both to the lower portion of the bobbin 1210 and to the lower portion of the housing 1310. The lower elastic member 1520 may be coupled to the lower surface of the bobbin 1210. The lower elastic member 1520 may be coupled to the lower surface of the housing 1310. The lower elastic member 1520 may be coupled both to the bobbin 1210 and to the base 1400. The lower elastic member 1520 may be embodied as a leaf spring.

The lower elastic member 1520 may include a plurality of elastic units, which are spaced apart from each other. The plurality of elastic units may be conductively connected to each other. The lower elastic member 1520 may include three elastic units. The lower elastic member 1520 may include a first elastic unit 1520-1 connected to one end of the first coil 1221, a second elastic unit 1520-2 connected to one end of the second coil 1222, and a third elastic unit 1520-3 connecting the other end of the first coil 1221 to the other end of the second coil 1222. The lower elastic member 1520 may be used as a conductive line for connecting the coil 1220 to the board 1330.

The lower elastic member 1520 may include an inner portion 1521. The inner portion 1521 may be coupled to the bobbin 1210. The inner portion 1521 may be coupled to the lower surface of the bobbin 1210. The inner portion 1521 may have therein a hole or a groove, which is coupled to the protrusion of the bobbin 1210. The inner portion 1521 may be fixed to the bobbin 1210 using an adhesive.

The lower elastic member 1520 may include the outer portion 1522. The outer portion 1522 may be coupled to the housing 1310. The outer portion 1522 may be coupled to the lower surface of the housing 1310. The outer portion 1522 may have therein a hole or a groove, which is coupled to the protrusion of the housing 1310. The outer portion 1522 may be coupled to the base 1400. The outer portion 1522 may be fixed to the base 1400 using the adhesive disposed in the groove 1420 in the base 1400.

The lower elastic member 1520 may include a connector 1523. The connector 1523 may connect the outer portion 1522 to the inner portion 1521. The connector 1523 may be elastic. Here, the connector 1523 may be referred to as an "elastic portion". The connector 1523 may be bent twice or more.

The lower elastic member 1520 may include a terminal portion 1524. The terminal portion 1524 may extend from the outer portion 1522. The terminal portion 1524 may include two terminals. The terminal portion 1524 may be coupled to the first terminal 1332 of the board 1330 through soldering.

The lower elastic member 1520 may include a coupler 1525. The coupler 1525 may extend from the inner portion 1521. The coupler 1525 may be coupled to the coils 1220 through soldering.

In the embodiment, the upper elastic member 1510 may be coupled to the first corner of the housing 1310 and to the third corner of the housing 1310, disposed opposite the first corner. The lower elastic member 1520 may be coupled to the second corner of the housing 1310 and to the fourth corner of the housing 1310, disposed opposite the second corner. In other words, the upper elastic member 1510 and the lower elastic member 1520 may be coupled to different corners among the plurality of corners of the housing 1310.

The description of FIGS. 9 and 10 may be applied to the lens moving apparatus 1010 according to the embodiment shown in FIG. 18, with or without modification. Furthermore, the description of FIGS. 11 to 13 may also be applied to the lens moving apparatus 1010 according to the embodiment shown in FIG. 18.

Figure 25:
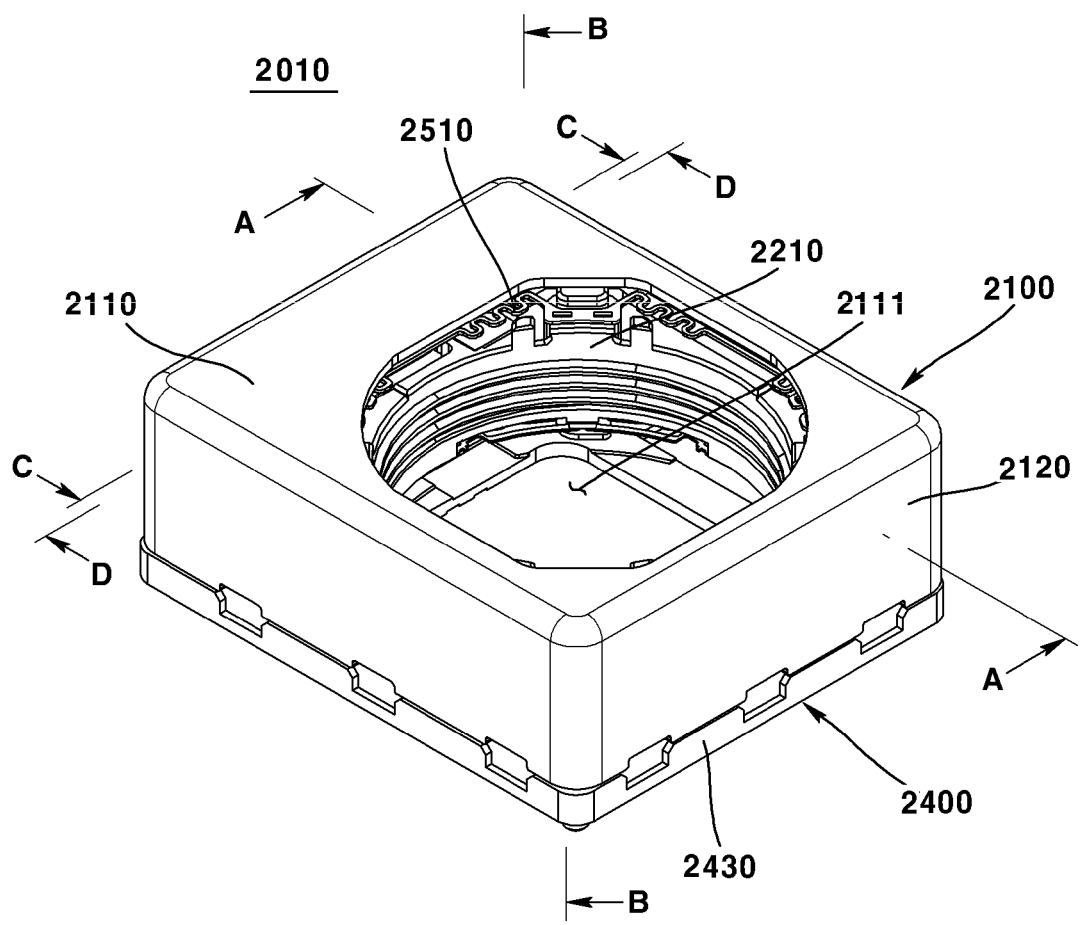
FIG. 25 is a perspective view of a lens moving apparatus according to an embodiment.
Figure 26:
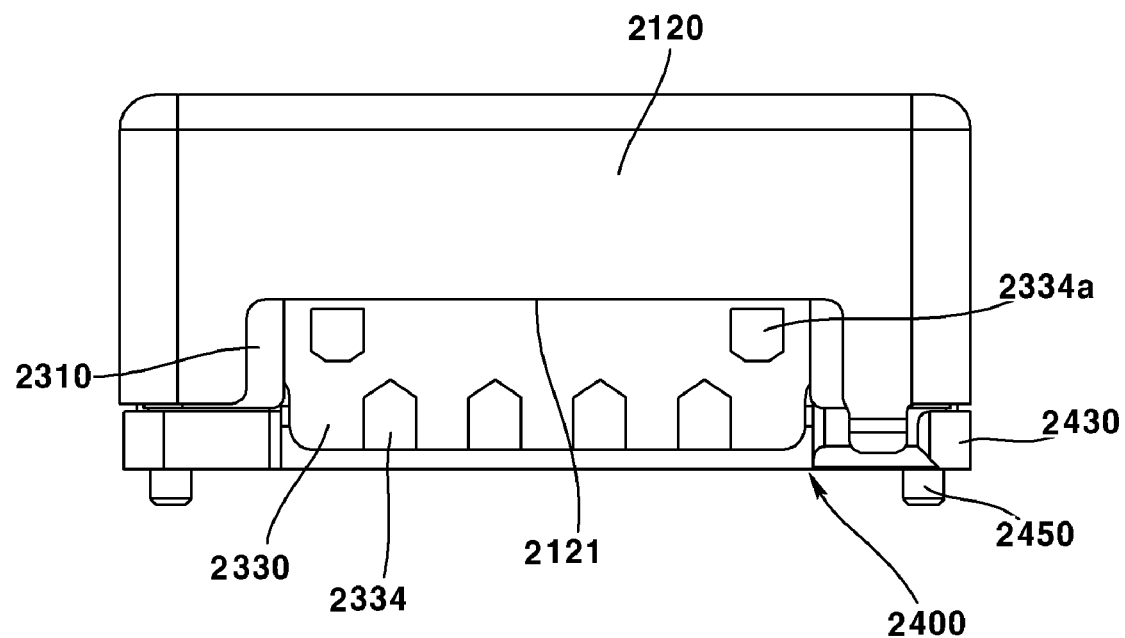
FIG. 26 is a side view of the lens moving apparatus of FIG. 25.
Figure 27:
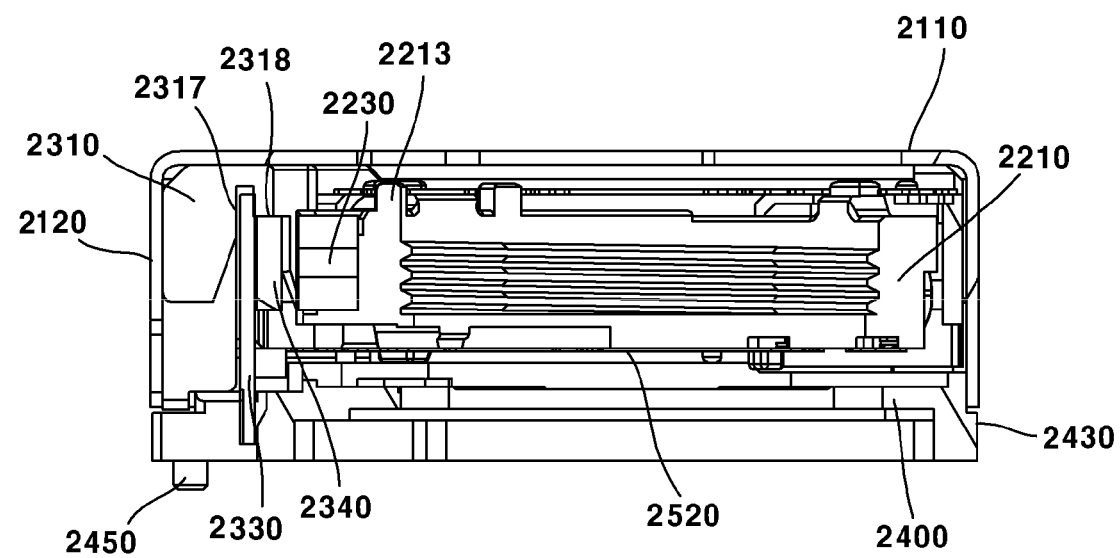
FIG. 27 is a cross-sectional view of the lens moving apparatus taken along line A-A in FIG. 25.
Figure 28:
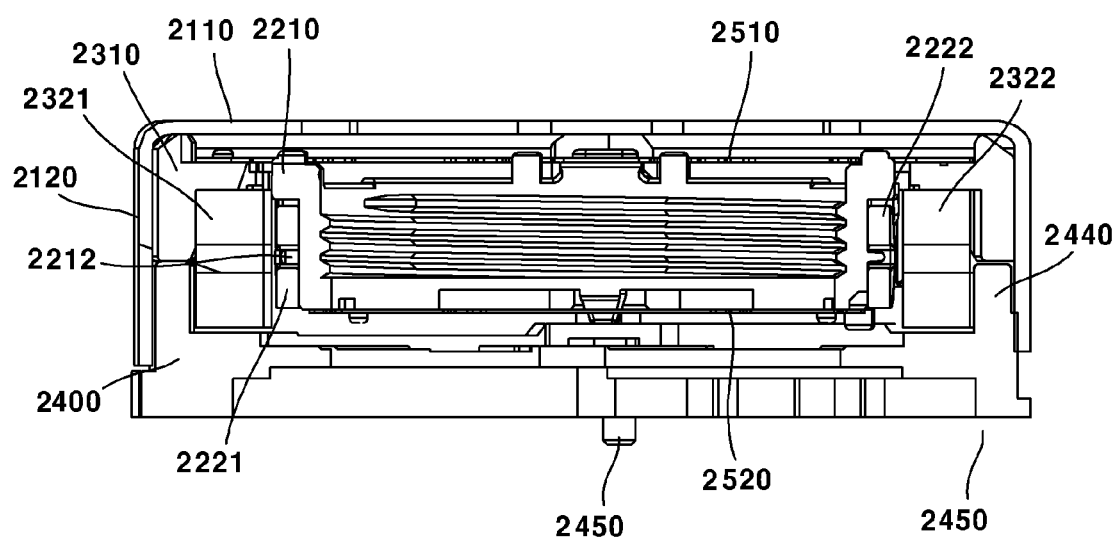
FIG. 28 is a cross-sectional view of the lens moving apparatus taken along line B-B in FIG. 25.
Figure 29:
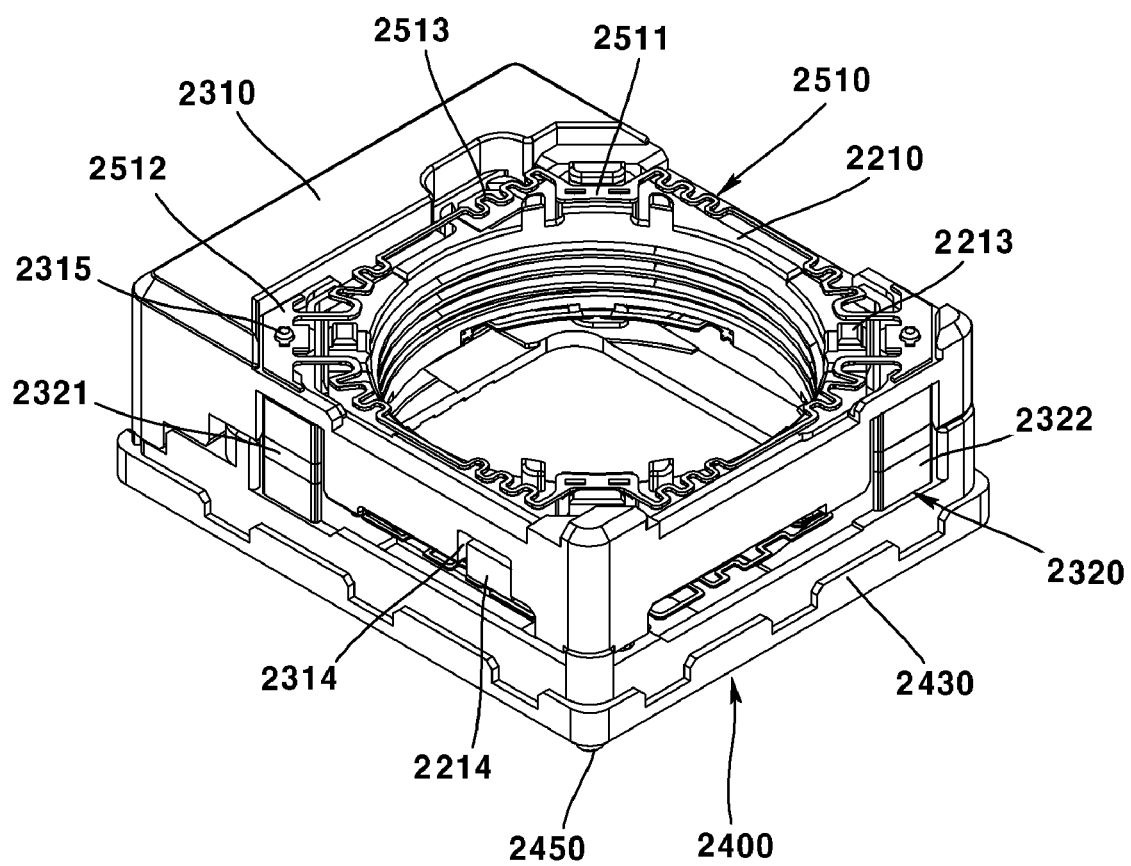
FIG. 29 is a perspective view illustrating the lens moving apparatus from which a cover is removed.

FIG. 25 is a perspective view of a lens moving apparatus 2010 according to an embodiment. FIG. 26 is a side view of the lens moving apparatus 2010 of FIG. 25. FIG. 27 is a cross-sectional view of the lens moving apparatus taken along line A-A in FIG. 25. FIG. 28 is a cross-sectional view of the lens moving apparatus 2010 taken along line B-B in FIG. 25. FIG. 29 is a perspective view illustrating the lens moving apparatus 2010 from which a cover is removed.

Figure 30:
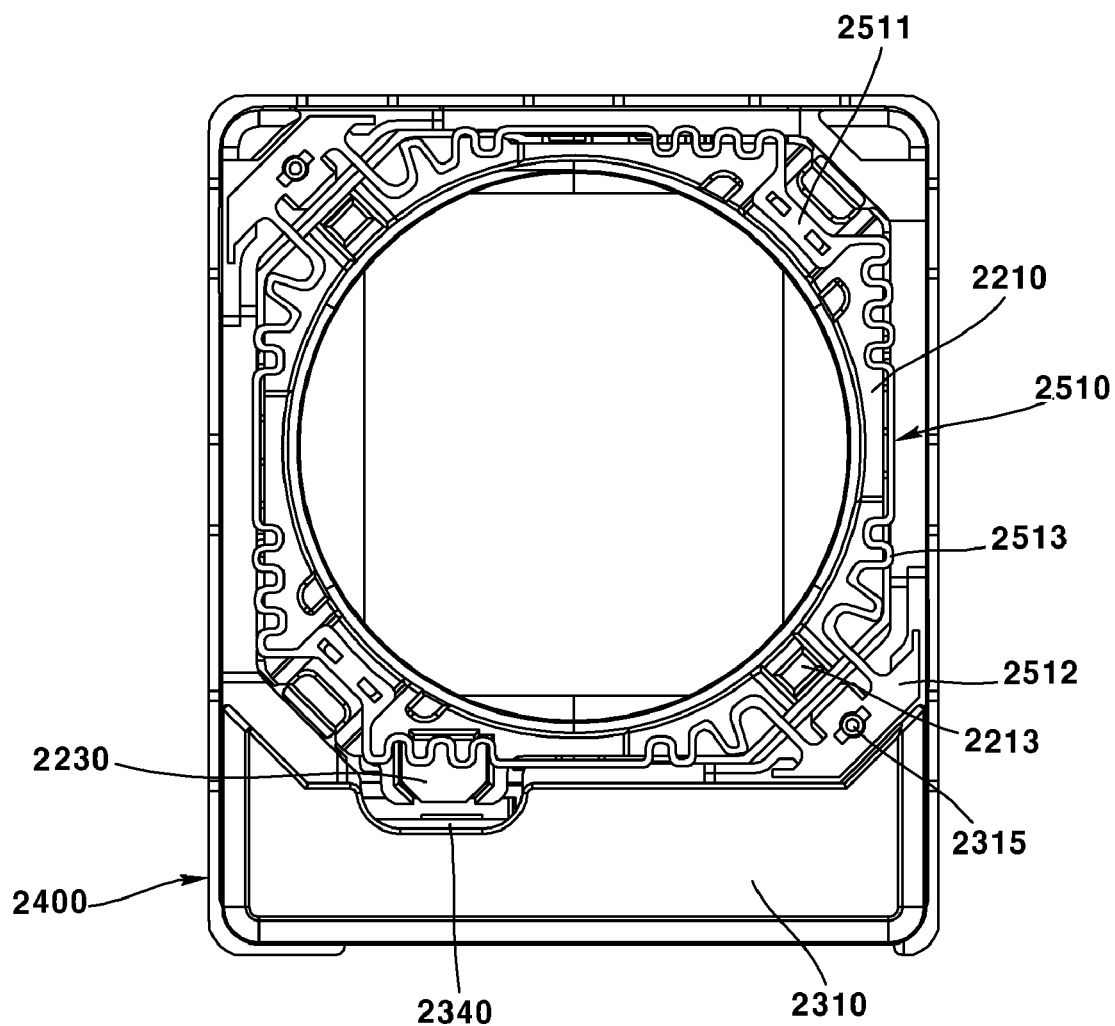
FIG. 30 is a plan view of the lens moving apparatus of FIG. 29.
Figure 32:
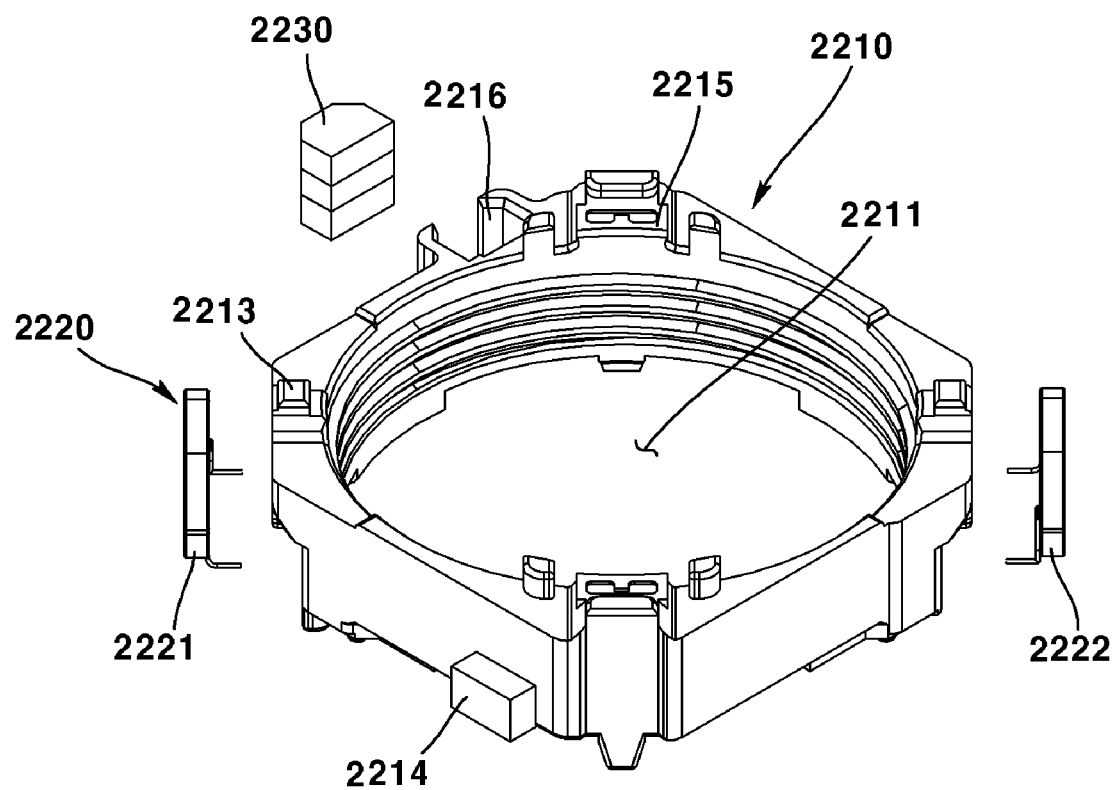
FIGS. 32 to 34 are exploded perspective views of some components of the lens moving apparatus.
Figure 33:
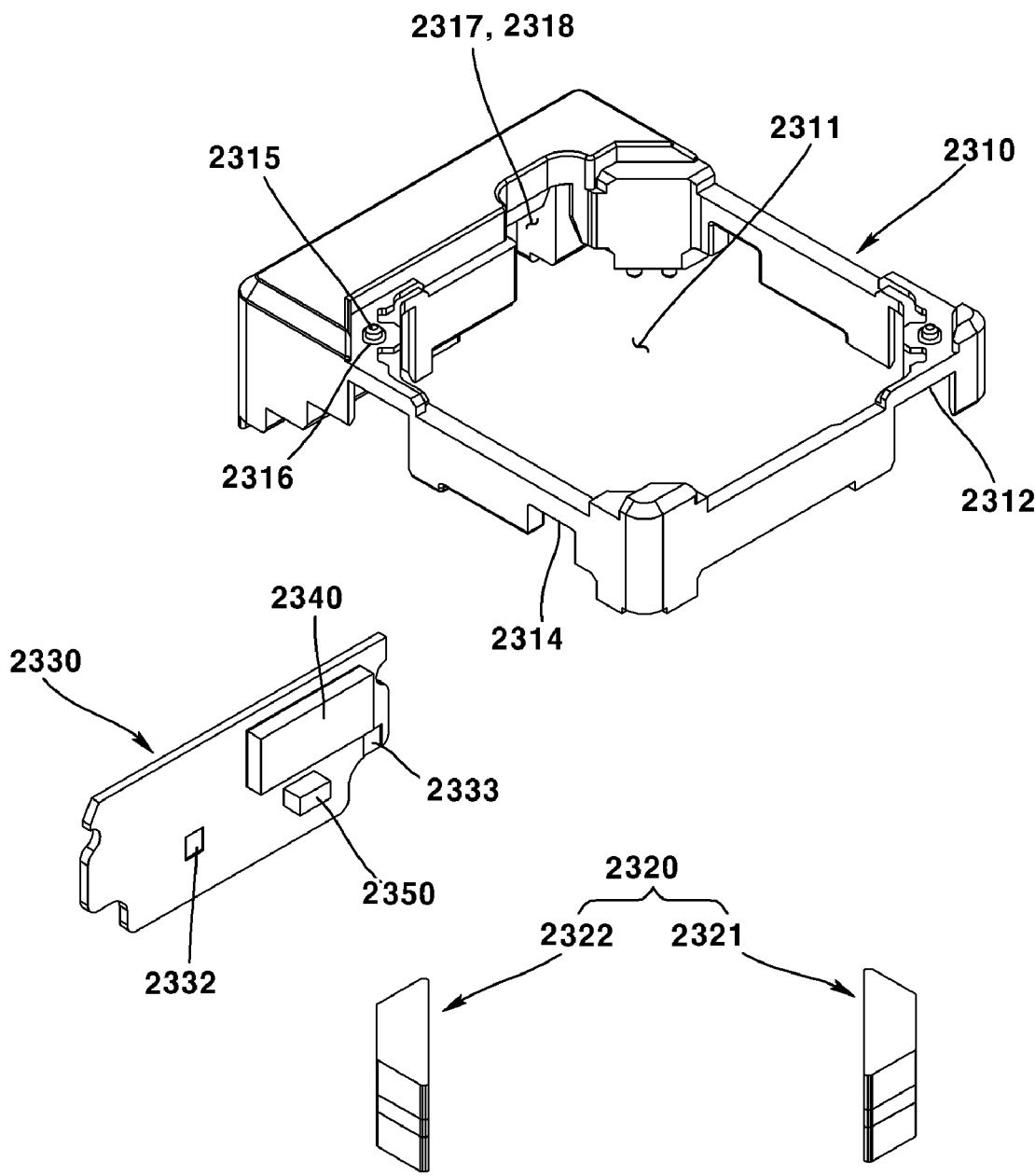
Figure 34:
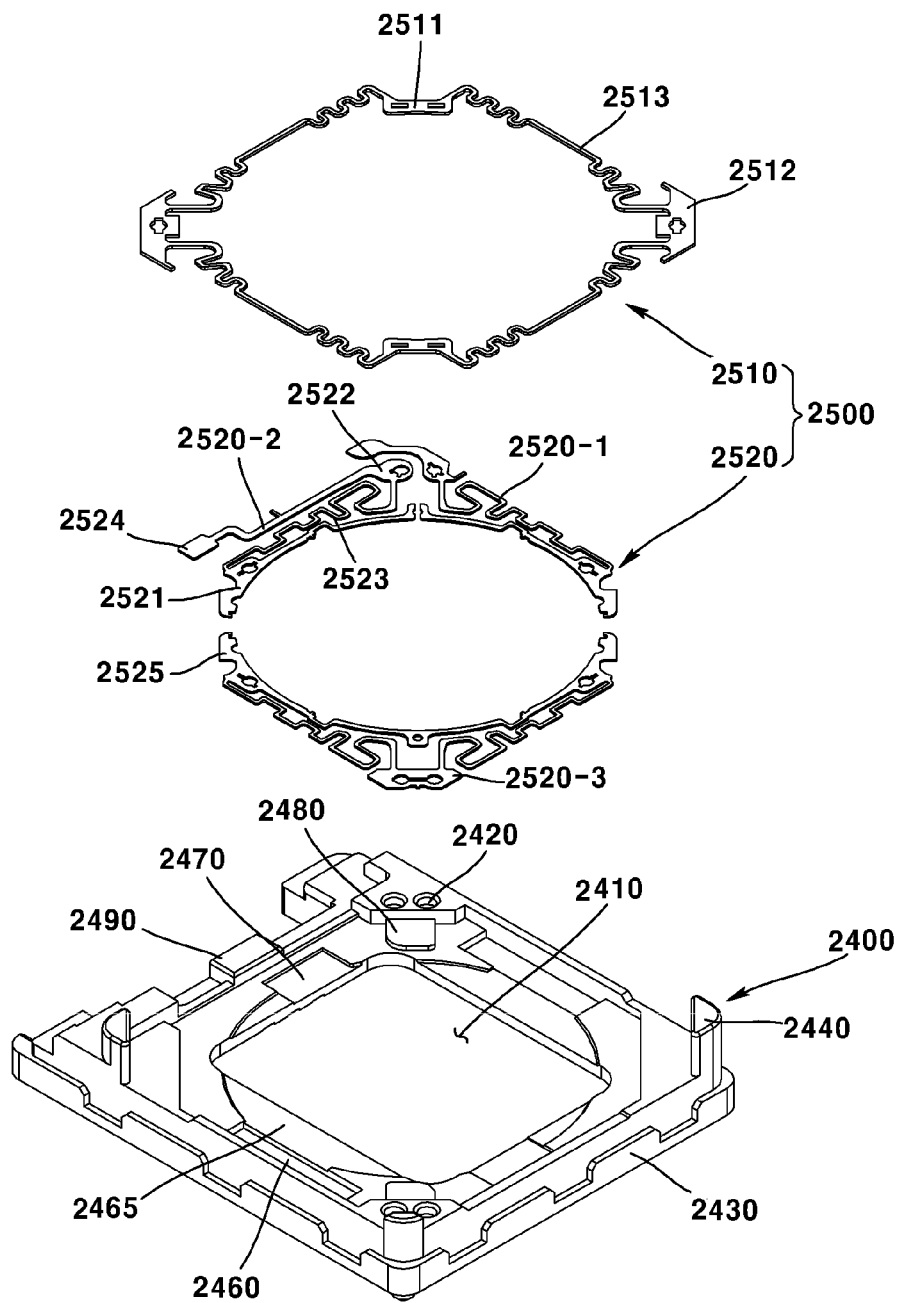
Figure 35:
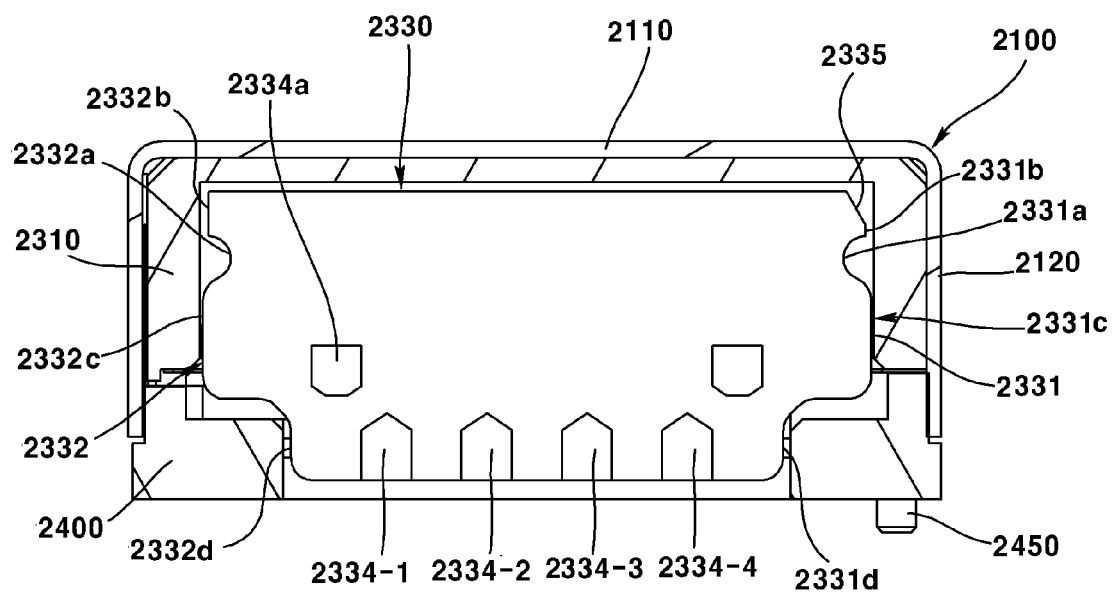
FIG. 35 is a cross-sectional view of the lens moving apparatus taken along line C-C in FIG. 25.
Figure 36:
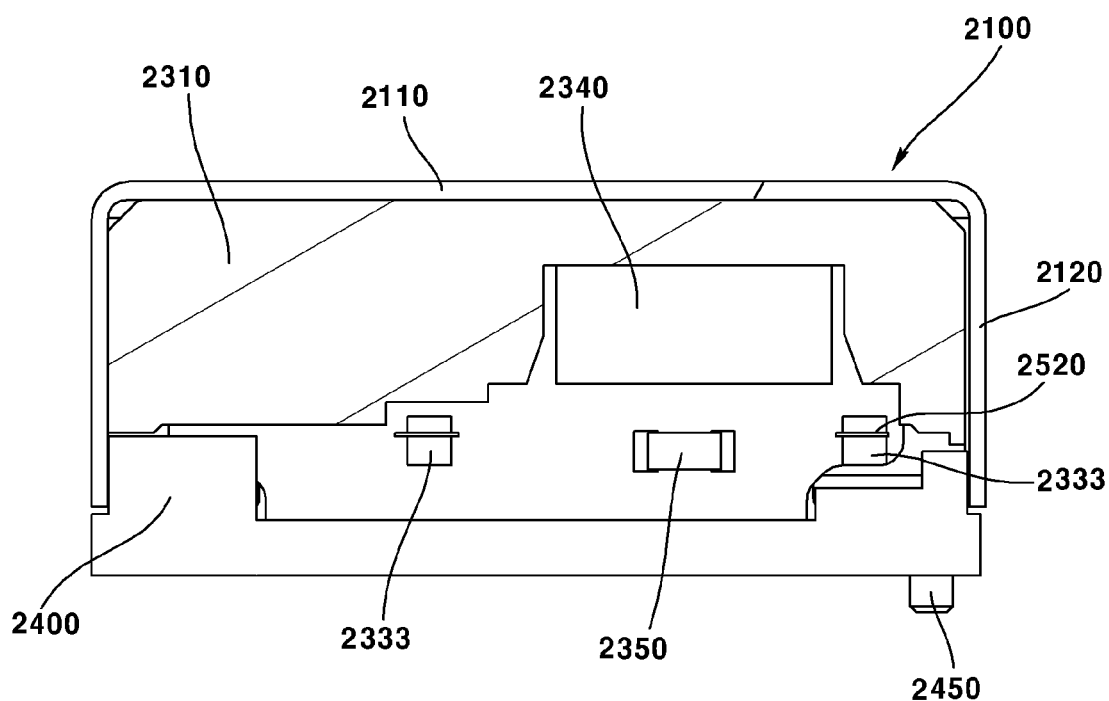
FIG. 36 is a cross-sectional view of the lens moving apparatus taken along line D-D in FIG. 25.
Figure 37:
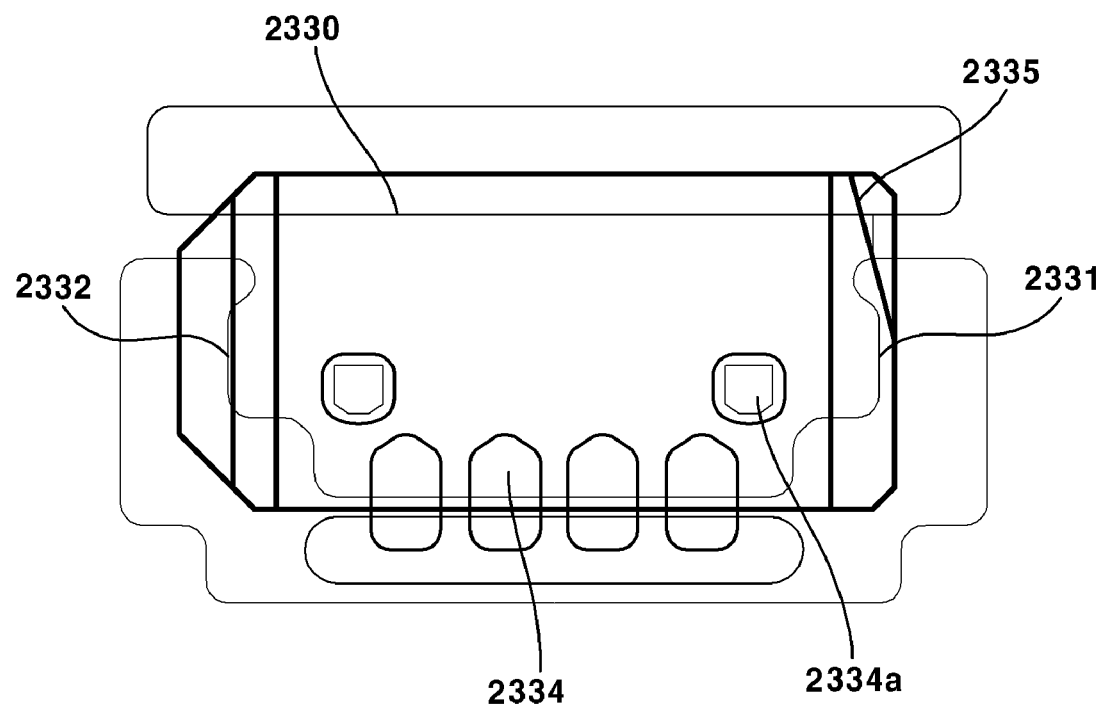
FIG. 37 is a view illustrating one cell of boards in an arrayed state.

FIG. 30 is a plan view of the lens moving apparatus 2010 of FIG. 29. FIG. 31 is an exploded perspective view of the lens moving apparatus 2010 of FIG. 25. FIGS. 32 to 34 are exploded perspective views of some components of the lens moving apparatus 2010. FIG. 35 is a cross-sectional view of the lens moving apparatus 2010 taken along line C-C in FIG. 25. FIG. 36 is a cross-sectional view of the lens moving apparatus taken along line D-D in FIG. 25. FIG. 37 is a view illustrating one cell of boards in an arrayed state.

The lens moving apparatus 2010 may be a voice coil motor (VCM). The lens moving apparatus 2010 may be a lens drive motor. The lens moving apparatus 2010 may be a lens drive actuator. The lens moving apparatus 2010 may include an AF module. The lens moving apparatus 2010 may include a closed-loop autofocus (CLAF) module. The lens moving apparatus 2010 may include an OIS module.

The lens moving apparatus 2010 may include the cover 2100. The cover 2100 may include a 'cover can'. The cover 2100 may include a 'shield can'. The cover 2100 may be disposed so as to surround the housing 2310. The cover 2100 may be coupled to the base 2400. The cover 2100 may accommodate the housing 2310 therein. The cover 2100 may define the appearance of the lens moving apparatus 2010. The cover 2100 may be configured to have a hexahedral shape, which is open at the lower surface thereof. The cover 2100 may be a non-magnetic body. The cover 2100 may be made of a metal. The cover 2100 may be embodied as a metal plate. The cover 2100 may be connected to the ground portion of the printed circuit board 50. Accordingly, the cover 2100 may be grounded. The cover 2100 may block electromagnetic interference (EMI). Here, the cover 2100 may be referred to as an 'EMI shield can'.

The cover 2100 may include an upper plate 2110 and a side plate 2120. The cover 2100 may include the upper plate 2110, having therein a bore 111, and the side plate 2120, extending downwards from the outer periphery or the edge of the upper plate 2110. The lower end of the side plate 2120 of the cover 2100 may be disposed at a stepped portion 2430 of the base 2400. The inner surface and/or the lower surface of the side plate 2120 of the cover 2100 may be fixed to the base 2400 using an adhesive. The upper plate 2110 of the cover 2100 may have therein a bore 111 corresponding to the bore 2211 in the bobbin 2210.

The side plate 2120 of the cover 2100 may include a plurality of side plates. The plurality of side plates may include first to fourth side plates. The side plates 2120 of the cover 2100 may include first and second side plates, which are disposed opposite each other, and third and fourth side plates, which are disposed opposite each other between the first and second side plates.

The lens moving apparatus 2010 may include an operation unit 2200. The operation unit 2200 may be a unit in which a component or components, which are moved relative to a stationary unit 1300 during AF operation of a camera device 200, are coupled to each other. The operation unit 2200 may include a bobbin 2210 and a coil 2220. The operation unit 2200 may include a second magnet 2230.

The operation unit 2200 may include the bobbin 2210. The bobbin 2210 may be disposed in the cover 2100. The bobbin 2210 may be disposed in the housing 2310. The bobbin 2210 may be disposed in the bore 2311 in the housing 2310. The bobbin 2210 may be movably coupled to the housing 2310. The bobbin 2210 may be movable relative to the housing 2310 in the optical-axis direction. A lens may be coupled to the bobbin 2210. The bobbin 2210 and the lens may be coupled to each other using threaded coupling and/or an adhesive. The coil 2220 may be coupled to the bobbin 2210. An upper elastic member 2510 may be coupled to the upper portion of the bobbin 2210. A lower elastic member 2520 may be coupled to the lower portion of the bobbin 2210. The elastic member 2500 may be coupled to the bobbin 2210 using heat fusion and/or an adhesive. The adhesive, which is used to couple the lens to the bobbin 2210 and to couple the elastic member 2500 to the bobbin 2210, may be epoxy, which is hardened by at least one of ultraviolet, heat, and laser.

The bobbin 2210 may include a plurality of side surfaces. When viewed from above, the bobbin 2210 may be configured to have an octagonal shape. The bobbin 2210 may include four side surfaces and four corner surfaces connecting the four side surfaces to each other.

The bobbin 2210 may have therein the bore 2211. The bore 2211 may be a through hole. The bore 2211 may be formed through the bobbin 2210 in the optical-axis direction. A lens module 400 may be received in the bore 2211. For example, the inner circumferential surface of the bobbin 2210, which defines the bore 2211, may be provided with a thread corresponding to the thread formed in the outer circumferential surface of the lens module 400.

The bobbin 2210 may include a protrusion. The protrusion may be a coil coupler around which the coil 2220 is wound. The protrusion may project from the outer circumferential surface of the bobbin 2210. The coil 2220 may be disposed at the protrusion. The coil 2220 may be wound around the protrusion. The protrusion may include a plurality of protrusions. The protrusions may be formed on two corner surfaces that are disposed opposite each other, among the four corner surfaces of the bobbin 2210. The protrusions may be formed on the two corner surfaces such that two protrusions are formed on each of the two corner surfaces so as to be spaced apart from each other.

The bobbin 2210 may include a first stopper 2213. The first stopper 2213 may be an upper stopper, configured to limit the upward moving distance of the bobbin 2210. The first stopper 2213 may be formed on the upper surface of the bobbin 2210. The first stopper 2213 may project from the upper surface of the bobbin 2210. The first stopper 2213 may overlap the upper plate 2110 of the cover 2100 in a direction parallel to the optical axis. Accordingly, when the bobbin 2210 is moved upwards, the first stopper 2213 of the bobbin 2210 may come into contact with the inner surface of the upper plate 2110 of the cover 2100. In other words, the first stopper 2213 may mechanically limit the upward stroke distance of the bobbin 2210.

The bobbin 2210 may include a second stopper 2214. The second stopper 2214 may be an anti-rotation stopper configured to limit rotation of the bobbin 2210. The second stopper 2214 may be formed on the outer surface of the bobbin 2210. The second stopper 2214 may project from the side surface of the bobbin 2210. The second stopper 2214 may overlap the housing 2310 in the rotational direction or the circumferential direction of the bobbin 2210. The second stopper 2214 may be disposed in a second groove 2314 in the housing 2310. When the bobbin 2210 rotates, the second stopper 2214 may be caught by the housing 2310, thereby limiting the rotation of the bobbin 2210.

The bobbin 2210 may have therein a first groove 2215. The first groove 2215 may be an adhesive-receiving groove in which an adhesive for securing the upper elastic member 2510 is disposed. The first groove 2215 may be formed in the upper surface of the bobbin 2210. An adhesive may be disposed in the first groove 2215. The bobbin 2210 and the upper elastic member 2510 may be coupled to each other in the first groove 2215. The first groove 2215 may include a plurality of grooves. The first groove 2215 may include two grooves, which are symmetrically positioned with respect to the optical axis.

The bobbin 1210 may have therein a second groove 2216. The second groove 2216 may be a magnet-receiving groove for receiving the second magnet 2230. The second groove 2216 may be formed in the upper surface of the bobbin 2210. The second groove 2216 may be formed in the outer surface of the bobbin 2210. The second groove 2216 may receive the second magnet 2230 therein. The second groove 2216 may be open at the upper surface of the bobbin 2210. The second magnet 2230 may be fitted into the second groove 2216 in the bobbin 2210 from above. The second groove 2216 may be configured to have a size and shape corresponding to those of the second magnet 2230. The second groove 2216 may be open at the outer surface of the bobbin 2210. Here, because the width of the outer opening in the second groove 2216 is less than the width of the second magnet 2230 in a corresponding direction, it is possible to prevent a phenomenon in which the second magnet 2230 escapes outwards.

The description of the projection 115b of the bobbin 110 shown in FIGS. 3A and 3B may be applied to the bobbin 2210 shown in FIG. 32, with or without modification. The description of the seating groove 180a in the bobbin 110 shown in FIGS. 3A and 3B may be applied to the second groove 2216 shown in FIG. 32, with or without modification.

The description of the sensing magnet 180 shown in FIGS. 3A and 3B may be applied to the second magnet 2230 shown in FIG. 32, with or without modification.

An operation unit 2200 may include the coil 2220. The coil 2220 may be an 'AF moving coil', which is used to perform an AF operation. The coil 2220 may be disposed at the bobbin 2210. The coil 2220 may be disposed between the bobbin 2210 and the housing 2310. The coil 2220 may be disposed between the bobbin 2210 and the side plate 2120 of the cover 2100. The coil 2220 may be disposed on the outer surface or the outer peripheral surface of the bobbin 2210. The coil 2220 may be wound around the bobbin 2210. Alternatively, the coil 2220 may be wound alone, and may then be coupled to the bobbin 2210. The coil 2220 may face the first magnet 2320. The coil 2220 may be disposed so as to face the first magnet 2320. The coil 2220 may electromagnetically interact with the first magnet 2320. Here, when current flows in the coil 2220 and thus an electromagnetic field is generated around the coil 2220, the coil 2220 may be moved relative to the first magnet 2320 by virtue of the electromagnetic interaction between the coil 2220 and the first magnet 2320. The coil 2220 may be composed of a single coil. Alternatively, the coil 2220 may be composed of a plurality of coils, which are spaced apart from each other.

Both the coil 2220 and the bobbin 2210 may be moved upward in the optical-axis direction when forward current is applied to the coil 2220, and may be moved downwards in the optical-axis direction when reverse current is applied to the coil 2220. At the initial position at which current is not applied to the coil 2220, the bobbin 2210 may be spaced apart from the upper plate 2110 of the cover 2100 with a first gap therebetween, and may be spaced apart from the base 2400 with a second gap therebetween. The bobbin 2210 may be moved in a direction such that the first gap decreases when forward current is applied to the coil 2220, and may be moved in a direction such that the second gap decreases when reverse current is applied to the coil 2220. Meanwhile, the operation unit 2200 may be moved downwards when reverse current is applied to the coil 2220, and may be moved upwards when forward current is applied to the coil 2220.

The coil 2220 may include a plurality of coils. The coil 2220 may include two coils. In this case, the two coils may be conductively connected to each other. In modification, the plurality of coils may be conductively isolated from each other. The coil 2220 may include two loop coils. The coil 2220 may include a first coil 2221 and a second coil 2222. Each of the first coil 2221 and the second coil 2222 may be wound around the protrusion of the bobbin 2210 such that current flows in opposite directions in upper and lower parts of the coil. The coil 2220 may include the first coil 2221, which faces a first of first magnet 2321, and the second coil 2222, which faces a second of first magnet 2322. The first coil 2221 may be connected at one end thereof to a first elastic unit 2520-1 of the lower elastic member 2520, and may be connected at the other end thereof to a third elastic unit 2520-3. The second coil 2222 may be connected at one end thereof to a second elastic unit 2520-2, and may be connected at the other end thereof to the third elastic unit 2520-3.

The operation unit 2200 may include the second magnet 2230. The second magnet 2230 may be a sensing magnet. The second magnet 2230 may be disposed at the bobbin 2210. The second magnet 2230 may be moved together with the bobbin 2210 and the lens coupled to the bobbin 2210. The second magnet 2230 may be disposed close to a sensor 2340. The second magnet 2230 may be disposed so as to face the sensor 2340. The second magnet 2230 may face the sensor 2340. The second magnet 2230 may be detected by the sensor 2340. In a modification, the operation unit 2200 may include a compensation magnet for maintaining the equilibrium in magnetic force between the compensation magnet and the second magnet 2230. The compensation magnet and the second magnet 2230 may be symmetrically disposed with each other with respect to the optical axis.

In the embodiment, the bobbin 2210 may include a first surface, which faces the inner surface of the board 2330. Here, the second magnet 2230 may be disposed on the first surface of the bobbin 2210 closer to the third corner of the housing 2310, on which the first magnet 2320 is not disposed, than to the first corner of the housing 2310, on which the first magnet 2320 is disposed. Accordingly, it is possible to minimize magnetic field interference between the first magnet 2320 and the second magnet 2230.

In the embodiment, the bobbin 2210 may include four side surfaces and four corner surfaces between the four side surfaces. The bobbin 2210 may include first to fourth side surfaces and first to fourth corner surfaces. The first magnets 2320 may be disposed so as to face two corner surfaces, among the four corner surfaces of the bobbin 2210. The first magnets 2320 may be disposed so as to face the first and second corner surfaces of the bobbin 2210. The second magnet 2230 may be disposed at one side surface among the four side surfaces of the bobbin 2210. The second magnet 2230 may be disposed close to a corner surface of the bobbin 2210 that does not face the first magnets 2320, among the four corner surfaces of the bobbin 2210. The second magnet 2230 may be disposed at a position closer to the third corner surface of the bobbin 2210 than to the first corner surface of the bobbin 2210.

The lens moving apparatus 2010 may include the stationary unit 2300. The stationary unit 2300 may be a unit in which a component or components that undergo almost no movement compared to the operation unit 2200 during AF operation are coupled to each other. The stationary unit 2300 may include the housing 2310 and the first magnets 2320. The stationary unit 2300 may include a board 2330 and the sensor 2340. Furthermore, the base 2400 and the cover 2100 may also be considered to be part of the stationary unit 2300.

The stationary unit 2300 may include the housing 2310. The housing 2310 may be disposed between the bobbin 2210 and the cover 2100. The housing 2310 may be disposed outside the bobbin 2210. The housing 2310 may receive at least a portion of the bobbin 2210. The housing 2310 may be disposed inside the cover 2100. The housing 2310 may be made of a material different from that of the cover 2100. The housing 2310 may be made of an insulation material. The housing 2310 may be an injection-molded object. The first magnets 2320 may be disposed at the housing 2310. The housing 2310 and the first magnets 2320 may be coupled to each other using an adhesive. The upper elastic member 2510 may be coupled to the upper portion of the housing 2310. The lower elastic member 2520 may be coupled to the lower portion of the housing 2310. The housing 2310 may be coupled to the elastic member 2500 by means of heat fusion and/or an adhesive. The adhesive used to couple the housing 2310 to the first magnets 2320 and to couple the housing 2310 to the elastic member 2500, may be epoxy, which is hardened by at least one of ultraviolet, heat, and laser.

The housing 2310 may include a plurality of side portions and a plurality of corner portions disposed between the plurality of side portions. The housing 2310 may include four side portions and four corner portions. The housing 2310 may include first to fourth side portions and first to fourth corner portions. The housing 2310 may include first and second corners, which are disposed opposite each other, and third and fourth corners, which are disposed opposite each other between the first and second corners. Here, the first and third corners of the housing 2310 may be disposed closer to the board 2330 than are the second and fourth corners.

The housing 2310 may have therein a bore 2311. The bore 2311 may be a through hole. The bore 2311 may be formed through the housing 2310 in the optical-axis direction. The bobbin 2210 may be disposed in the bore 2311.

The housing 2310 may have therein first grooves 2312. The first grooves 2312 may be magnet-receiving grooves for respectively receiving the first magnets 2320. The first grooves 2312 may be formed in the lower surface of the housing 2310. The first grooves 2312 may be formed in the inner circumferential surface of the housing 2310. The first grooves 2312 may respectively receive the first magnets 2320 therein. The first magnets 2320 may be respectively disposed in the first grooves 2312. Each of the first grooves 2312 may be configured to have a shape corresponding to the shape of a corresponding one of the first magnets 2320. The first grooves 2312 may include a plurality of grooves. The first grooves 2312 may be formed in corner portions of the housing 2310. The first grooves 2312 may be formed in two corner portions, which are positioned opposite each other, among the four corner portions of the housing 2310.

The housing 2310 may have a second groove 2314. The second groove 2314 may be a stopper-receiving groove for receiving the second stopper 2214 of the bobbin 2210. The second groove 2314 may be formed in the lower surface of the housing 2310. The second groove 2314 may be formed in the inner circumferential surface of the housing 2310. The second groove 2314 may receive therein at least a portion of the second stopper 2214 of the bobbin 2210. The second groove 2314 may be configured so as to be larger than the second stopper 2214 of the bobbin 2210.

The housing 2310 may include a protrusion 2315. The protrusion 2315 may be a coupling protrusion, which is coupled to the upper elastic member 2510. The protrusion 2315 may be formed on the upper surface of the housing 2310. The protrusion 2315 may be inserted into a hole in the upper elastic member 2510. The protrusion 2315 may be coupled to the upper elastic member 2510. The protrusion 2315 may include a plurality of protrusions. The protrusions 2315 may be formed at corner portions of the housing 2310. The protrusions 2315 may be formed at two corner portions disposed opposite each other, among the four corner portions of the housing 2310.

The housing 2310 may have a third groove 2316 formed therein. The third groove 2316 may be an adhesive-receiving groove in which an adhesive for securing the upper elastic member 2510 to the housing 2310 is received. The third groove 2316 may be formed in the upper surface of the housing 2310. The third groove 2316 may be formed around the protrusion 2315. The third groove 2316 may be formed at the periphery of the protrusion 2315. The third groove 2316 may be formed adjacent to the protrusion 2315. An adhesive for securing the upper elastic member 2510 to the housing 2310 may be disposed in the third groove 2316.

The housing 2310 may have a groove 2317 formed therein. The groove 2317 may include a pocket. The groove 2317 may be a reception groove for receiving the board 2330 therein. The groove 2317 may be formed in the lower surface of the housing 2310. The board 2330 may be disposed in the groove 2317. At least a portion of the groove 2317 may be configured to have a shape corresponding to the shape of the board 2330. The groove 2317 may include a portion having a width corresponding to the first width of the board 2330.

The housing 2310 may have therein an opening 2318. The opening 2318 may be formed in the inner surface of the groove 2317. The sensor 2340 may be disposed in the opening 2318. The opening 2318 may be configured to have a shape corresponding to the shape of the sensor 2340. The opening 2318 may be connected to the groove 2317.

The description of the housing 140 shown in FIGS. 5A and 5B may be applied to the housing 2310 shown in FIG. 33, with or without modification. For example, the description of the housing 140 may be applied to the groove 2317 in the housing 2310, with or without modification.

The stationary unit 2300 may include the first magnets 2320. The lens moving apparatus 2010 may include the first magnets 2320. The first magnets 2320 may be disposed at the housing 2310. The first magnets 2320 may be disposed between the bobbin 2210 and the housing 2310. The first magnets 2320 may be disposed between the bobbin 2210 and the side plate 2120 of the cover 2100. The first magnets 2320 may respectively face the coils 2220. The first magnets 2320 may be disposed so as to respectively face the coils 2220. The first magnets 2320 may electromagnetically interact with the coils 2220. The first magnets 2320 may be disposed at corner portions of the housing 2310. Here, each of the first magnets 2320 may be a corner magnet having a hexahedral shape in which the inner surface area thereof is larger than the outer surface area thereof. In a modification, the first magnets 2320 may be disposed at the side portions between the corner portions of the housing 2310. Here, each of the first magnets 2320 may be a flat plate magnet having a flat-plate shape. The polarities of the upper and lower portions of each of the first magnets 2320 may be different from each other. The upper surface of each of the first magnets 2320 may serve as an N pole, and the lower surface thereof may serve as an S pole. Alternatively, the upper surface of each of the first magnets 2320 may serve as an S pole, and the lower surface thereof may serve as an N pole. A neutral portion may be defined at the center between the upper and lower portions of each of the first magnets 2320.

Because the term "first magnet 2320" is prefixed with "first" in order to distinguish the first magnet 2320 from the second magnet 2230, the first magnet may also be referred to as a "magnet". Furthermore, the term "first magnet 2320" may be interchangeably used with "second magnet", and the term "second magnet 2230" may be interchangeably used with "first magnet".

The first magnets 2320 may include a plurality of magnets. The first magnets 2320 may include two magnets. The first magnets 2320 may include the first of first magnet 2321 and the second of first magnet 2322. The first magnets 2320 may include the first of first magnet 2321, which is disposed at the first corner of the housing 2310, and the second of first magnet 2322, which is disposed at the second corner of the housing 2310, opposite the first corner thereof.

The stationary unit 2300 may include the board 2330. The board 2330 may be disposed at the housing 2310. The board 2330 may be disposed between the side plate 2120 of the cover 2100 and the bobbin 2210. At least a portion of the board 2330 may be disposed in the groove 2317 in the housing 2310. At least a portion of the board 2330 may be disposed in the pocket in the housing 2310. The board 2330 may be fitted into the groove 2317 in the housing 2310 from below. The sensor 2340 may be disposed at the board 2330. The board 2330 may be coupled to the printed circuit board 50. The board 2330 may include a printed circuit board (PCB). The board 2330 may include a flexible printed circuit board (FPCB).

For example, the configuration in which the board 2330 is fitted into the groove 2317 in the housing 2310 from below may be applied to the lens moving apparatuses 100 and 1010 according to the embodiments shown in FIGS. 1 and 18, with or without modification.

For example, the description of the distance between the sensing magnet 180 and the position sensor 170 shown in FIG. 4B may be applied to the distance between the second magnet 2230 and the sensor 2340, with or without modification. Furthermore, the description of the sensor 170 shown in FIG. 6C may be applied to the sensor 2340, with or without modification.

The board 2330 may include two lateral side surfaces. The lateral side surfaces of the board 2330 may be reference surfaces for an operation of assembling the board 2330 with the housing 2310. The lateral side surfaces of the board 2330 may include a first lateral side surface 2331 and a second lateral side surface 2332. The board 2330 may include an inner surface, on which the sensor 2340 is disposed, an outer surface opposite the inner surface, and the first and second lateral side surfaces 2331 and 2332 connecting the inner surface to the outer surface. The board 2330 may include upper and lower surfaces connecting the inner surface to the outer surface. The lateral side surfaces of the board 2330 may connect the upper surface to the lower surface. The lateral side surfaces may be oriented vertically, and the upper and lower surfaces may be oriented horizontally.

The first and second lateral side surfaces 2331 and 2332 of the board 2330 may respectively have grooves 2331a and 2332a therein. The first and second lateral side surfaces 2331 and 2332 may be respectively provided with the grooves 2331a and 2332a. Each of the grooves 2331a and 2332a may be formed in the center of a corresponding one of the lateral side surfaces of the board 2330. Each of the grooves 2331a and 2332a may be formed between the center of a corresponding one of the lateral side surfaces 2331 and 2332 of the board 2330 and the upper end of the board 2330. Each of the grooves 2331a and 2332a may be formed in a corresponding one of the lateral side surfaces of the board 2330 so as to have a concave shape. Each of the grooves 2331a and 2332a may have a semicircular shape. The grooves 2331a and 2332a may serve to facilitate holding by a blanking jig. Each of the grooves 2331a and 2332a may be configured to have a shape corresponding to at least a portion of the blanking jig.

The first and second lateral side surfaces 1331 and 2332 of the board 2330 may respectively include first portions 2331b and 2332 and second portions 2331c and 2332c. The first portions 2331b and 2332b may be respectively positioned above the grooves 2331a and 2332a. The second portions 2331c and 2332c may be respectively positioned under the grooves 2331a and 2332a. The second portions 2331c and 2332c of the lateral side surfaces of the board 2330 may be reference surfaces for an operation of assembling the board 2330 with the housing 2310. The distance between the first lateral side surface 2331 and the second lateral side surface 2332 of the board 2330 may correspond to the width of the groove 2317 in the housing 2310 in a corresponding direction at at least a portion of the board 2330.

The width between the first and second lateral side surfaces of the board 2330 may be set such that the first width between the first portions 2331b and 2332b is less than the second width between the second portions 2331c and 2332c. The distance between the lateral side surfaces of the board 2330 may be set such that the distance between the first portions 2331b and 2332b positioned above the grooves 2331a and 2332a is less than the distance between the second portions 2331c and 2332c positioned under the grooves 2331a and 2332a. A gap may be defined between each of the first portions 2331b and 2332b of the board 2330 and a corresponding one of the second portions 2331c and 2332c.

The lateral side surfaces of the board 2330 may be configured such that the first portions 2331b and 2332b positioned above the grooves 2331a and 2332a are positioned further inwards than the second portions 2331c and 2332c positioned under the grooves 2331a and 2332a. The second portions 2331c and 2332c of the lateral side surfaces of the board 2330 may project further outwards than the first portions 2331b and 2332b of the lateral side surfaces of the board 2330. Burrs may be formed at the first portions 2331b and 2332b of the lateral side surfaces of the board 2330. In the embodiment, because burrs are formed at the first portions 2331b and 2332b of the board 1330, the burrs may be disposed within the second portions 2331c and 2332c without projecting further outwards than the second portions 2331c and 2332c. The second portions 2331c and 2332c of the lateral side surfaces of the board 2330 may be in contact with the housing 2310. More specifically, the second portions 2331c and 2332c of the lateral side surfaces of the board 2330 may be in contact with an assembly surface of the housing 2310. In a comparative embodiment, when burrs project to the outermost sides of the board 2330, the assembly surface of the housing 2310 may come into contact with the burrs rather than the second portions 2331c and 2332c of the board 2330, thereby preventing the board 2330 from being positioned at the normal position. In the embodiment, since the second portions 2331c and 2332c of the board 2330 come into contact with the assembly surface of the housing 2310 even when burrs are formed, it is possible to position the board 2330 in place on the housing 2310 despite generation of burrs.

The distance between the lateral side surfaces of the board 2330 may be set such that the distance between the first portions 2331b and 2332b is greater than the distance between the second portions 2331c and 2332c and the distance between the third portions 2331d, which are positioned between the second portions 2331c and 2332c and the lower end of the board 2330. The width between the first portions 2331b and 2332b of the lateral side surfaces of the board 2330 may be greater than the width of the lower end of the board 2330. The third portions 2331d may correspond to the lateral side surfaces of the lower end of the board 2330 on which a second terminal 2334 is disposed.

The board 2330 may include a terminal. The board 2330 may include a plurality of terminals. The board 2330 may include a first terminal 2333. The board 2330 may include a second terminal 2334. Here, the first terminal 2333 may be used as an inner terminal formed on the inner surface of the board 2330, and the second terminal 2334 may be used as an outer terminal formed on the outer surface of the board 2330. The board 2330 may include a test terminal 2334a, which is disposed on the outer surface of the board 2330 and is spaced apart from the second terminal 2334. The test terminal 2334a may be used to test products during the process of manufacturing the products.

The board 2330 may include two first terminals 2333, which are disposed on the inner surface of the board 2330 and are coupled to the lower elastic member 2520, and four second terminals 2334, which are disposed on the outer surface of the lower end of the board 2330. The four second terminals 2334 may include power terminals (a GND terminal and a VDD terminal), a clock terminal (an SCL terminal) and a data terminal (a SDA terminal). The SCL terminal may be a serial clock terminal. The SDA terminal may be a serial data terminal. The second terminals 2334 may include first of second to fourth of second terminals 2334-1 to 2334-4. The first of second terminal 2334-1 may be the GND terminal. The second of second terminal 2334-2 may be the SCL terminal. The third of second terminal 2334-3 may be the SDA terminal. The fourth or second terminal 2334-4 may be the VDD terminal. Between the driver IC and the controller 780 of the lens moving apparatus 2010 according to the embodiment, power signals (a GND signal and a VDD signal) may be transmitted via the GND terminal and the VDD terminal, a clock signal (an SCL signal) may be transmitted via the SCL terminal, and a data signal (an SDA signal) may be transmitted via the SDA terminal. The driver IC of the lens moving apparatus 2010 according to the embodiment may receive the clock signal SCL, the data signal SDA and the power signals VCC and GND through data communication using a protocol such as, for example, I2C communication.

The board 2330 may include a chamfer 2335. The chamfer 2335 may be formed at the corner at which the second lateral side surface 2332 of the board 2330 meets the upper surface of the board 2330. The board 2330 may include a slope surface, which obliquely connects the upper surface of the board 2330 to the first lateral side surface 2331 of the board 2330. The chamfer 2335 may be formed through chamfering. The chamfer 2335 may be formed by providing a cutting die with a c-cut and cutting the board 2330 using the cutting die. The corner of the board 2330 at which the first lateral side surface 2331 meets the upper surface may be obliquely formed. The board 2330 may have the c-cut shape formed at the corner of the board 1330 at which the first lateral side surface 2331 meets the upper surface of the board 2330. The board 2330 may include a depressed portion or a cut portion, which is formed at the corner of the board 2330 at which the first lateral side surface 2331 meets the upper surface.

In the embodiment, the board 2330 may be assembled with the housing 2310 in such a manner that the board 2330 is fitted into the groove 2317 in the housing 2310. Here, the groove 2317 in the housing 2310 may be a pocket. The gap between the surface of the pocket in the housing 2310 and the surface of the board 2330 may have a very small size of about 0.025 mm due to a mechanical assembly tolerance. If the size of the gap is increased, productivity may be lowered. Because the integrated driver IC and the capacitor 2350 are mounted on the inner surface of the board 2330, the center of gravity thereof may be eccentrically positioned to one side, thereby making it impossible to assemble the board with the housing in a vertical direction. In the embodiment, the board 2330 may be assembled with the groove 2317 in the housing 2310 by first inserting the second lateral side surface 2332, at which the driver IC is disposed, and then inserting the first lateral side surface 2331 in consideration of the unbalanced weight. If the second lateral side surface 2332 is not provided with the chamfer 2335 and thus the corner has a right angle, the board 2330 may be caught by the housing 2310, thereby making it difficult to assemble the board 2330 with the housing 2310. In other words, the chamfer 2335 formed at the board 2330 according to the embodiment may serve to prevent the board 2330 from catching on the housing 2310 in the operation of first inserting the second lateral side surface 2332 of the board 2330 into the groove 2317 in the housing 2310 and then inserting the first lateral side surface 2331 of the board 2330 into the groove 2317.

In the embodiment, the corner of the board 2330 at which the first lateral side surface 2331 meets the upper surface of the board 2330 may have a shape different from the shape of the corner of the board 2330 at which the second lateral side surface 2332 meets the upper surface. The corner at which the second lateral side surface 2332 meets the upper surface of the board 2330 may not be provided with a chamfer. In a modification, the corner of the board 2330, at which the second lateral side surface 2332 meets the upper surface of the board 2330 may be provided with a chamfer. At least one of the corner of the board 2330 at which the first lateral side surface 2331 meets the upper surface of the board 2330, and the corner of the board 2330 at which the second lateral side surface 2332 meets the upper surface of the board 2330 may be provided with a chamfer 2335.

The description of the board 2330 and the chamfer 2335 of the board 2330 may be applied to the circuit board 190 according to the embodiment shown in FIG. 1 and the board 1330 according to the embodiment shown in FIG. 18, with or without modification.

The stationary unit 2300 may include the sensor 2340. The sensor 2340 may be disposed at the board 2330. The sensor 2340 may be coupled to the inner surface of the board 2330 through SMT. The sensor 2340 may face the second magnet 2230. The sensor 2340 may be conductively connected to the coils 2220 via the lower elastic member 2520. The sensor 2340 may include the driver IC conductively connected to the coils 2220. In other words, the sensor 2340 may include the driver IC. Here, the driver IC may be described as including the sensor 2340. The driver IC may include the Hall sensor, which is disposed at the board 2330 so as to detect the second magnet 2230. The driver IC and the sensor 2340 may be integrally formed with each other.

The lens moving apparatus 2010 may include the sensor 2340 with the driver IC incorporated thereinto. The lens moving apparatus 2010 may include the driver IC with the sensor 2340 incorporated thereinto. The lens moving apparatus 2010 may include a Hall-integrated driver IC. The lens moving apparatus 2010 may include the capacitor 2350. The capacitor 2350 may be coupled to the inner surface of the board 2330. The capacitor 2350 may be disposed so as to be spaced apart from the sensor 2340.

In the embodiment, the sensor 2340 may be disposed closer to the first lateral side surface 2331 of the board 2330 than to the second lateral side surface 2332 of the board 2330. The sensor 2340 may be eccentrically disposed at a position close to the first lateral side surface 2331 with respect to the center of the inner surface of the board 2330. The sensor 2340 may be disposed close to one of the two lateral side surfaces of the board 2330. At least a portion of the sensor 2340 may overlap the second magnet 2230 in a direction perpendicular to the optical axis. The sensor 2340 may be eccentrically disposed on the inner surface of the board 2330 close to one side of the board 2330.

The description of the disposition of the sensor 2340 on the board 2330 may be applied to the disposition of the position sensor 170 on the circuit board 190 shown in FIG. 1 and the disposition of the sensor 1340 on the board 1330 shown in FIG. 18, with or without modification.

The lens moving apparatus 2010 may include the base 2400. The base 2400 may be included in the stationary unit 2300. The base 2400 may be disposed under the housing 2310. The base 2400 may be disposed under the bobbin 2210. At least a portion of the base 2400 may be spaced apart from the bobbin 2210. The base 2400 may be coupled to the side plate 2120 of the cover 2100.

The base 2400 may have therein a bore 2410. The bore 2410 may be formed in the base 2400. The bore 2410 may be formed through the base 2400 in the optical-axis direction. The light having passed through the lens module 400 and the bore 2410 may be incident on the image sensor 810. The bore 2410 in the base 2400 may be formed at a position corresponding to the bore 2211 in the bobbin 2210 so as to have a size corresponding to the bore 2211 in the bobbin 2210.

The base 2400 may have a groove 2420 formed therein. The groove 2420 may be an adhesive-receiving groove in which an adhesive for securing the lower elastic member 2520 to the base 2400 is received. The groove 2420 may be formed in the upper surface of the base 2400. The groove 2420 may include a plurality of grooves. Each of the grooves 2420 may be configured to have a size corresponding to the hole in the outer portion 2522 of the lower elastic member 2520. An adhesive for bonding the lower elastic member 2520 may be disposed in the grooves 2420.

The base 2400 may include the stepped portion 2430. The stepped portion 2430 may be formed on the side surface of the base 2400. The stepped portion 2430 may be formed on the base 2400 so as to surround the outer circumferential surface of the base 2400. The stepped portion 2430 may be formed by projection or depression of a portion of the side surface of the base 2400. The lower end of the side plate 2120 of the cover 2100 may be disposed on the stepped portion 2430.

The base 2400 may include posts 2440. The posts 2440 may be formed on the upper surface of the base 2400. The posts 2440 may project from the upper surface of the base 2400. The posts 2440 may be formed at corners of the base 2400. The posts 2440 may be formed at two corners disposed opposite each other, among the four corners of the base 2400. The posts 2440 may be fitted into the housing 2310. Among the four corners of the base 2400, two corners may be provided with the posts 2440, and the two remaining corners may be provided with the grooves 2420.

The base 2400 may include a protrusion 2450. The protrusion 2450 may project from the lower surface of the base 2400. The protrusion 2450 may be fitted into a groove in the printed circuit board 800.

The base 2400 may have a groove 2460. The groove 2460 may be a dust-trap groove in which a dust trap is disposed. The groove 2460 may be depressed from the upper surface of the base 2400. The groove 2460 may be provided therein with the dust trap, which is viscous and thus collects contamination. The groove 2460 may include a plurality of grooves. The groove 2460 may include two grooves. The groove 2460 may be depressed from the upper surface of the base 2400 deeper than a lens escape groove 2465.

The base 2400 may have the groove 2465 therein. The groove 2465 may be the lens escape groove 2465 configured to prevent contact with the lens module 400. The groove 2465 may be formed in the upper surface of the base 2400. The groove 2465 may be formed around the bore 2410. The groove 2465 may overlap the lens module 400 in a direction parallel to the optical axis.

The base 2400 may have therein a groove 2470. The groove 2470 may be a groove configured to prevent contact with a spring damper. The spring damper may be disposed at the lower elastic member 2520 according to the embodiment in order to connect connectors 2523 to each other. The groove 2470 may be formed in the upper surface of the base 2400 at a position corresponding to the position at which the spring damper is disposed. The groove 2470 may be depressed from the upper surface of the base 2400. The groove 2470 may be depressed further than the lens escape groove 2465. By virtue of the groove 2470, the base 2400 may not be in contact with the spring damper. The groove 2470 includes a plurality of grooves. The groove 2470 may include two grooves. The groove 2470 may be formed adjacent to the bore 2410.

The base 2400 may include a protrusion 2480. The protrusion 2408 may be a reinforcing protrusion for reinforcing the portion of the base 2400 that collides with the bobbin 2210 during reliability impact testing. The protrusion 2480 may project from the upper surface of the base 2400. The protrusion 2480 may overlap the bobbin 2210 in a direction parallel to the optical axis. When the bobbin 2210 moves downwards, the protrusion 2480 may collide with the bobbin 2210. The base 2400 may have an increased thickness in the optical-axis direction at the portion thereof at which the protrusion 2480 is provided. In other words, it is possible to prevent the generation of cracks in the base 2400 by virtue of the protrusion 2480 even when the bobbin 2210 collides with the base 2400.

The base 2400 may include a protrusion 2490. The protrusion 2490 may be a protrusion for reinforcing the strength of the base 2400. The protrusion 2490 may project from the upper surface of the base 2400. The protrusion 2490 may be formed at the periphery of the upper surface of the base 2400. The protrusion 2490 may project further than the protrusion 2480 formed at the corner of the upper surface of the base 2400.

The lens moving apparatus 2010 may include the elastic member 2500. The elastic member 2500 may connect the housing 2310 to the bobbin 2210. The elastic member 2500 may be coupled both to the housing 2310 and to the bobbin 2210. The elastic member 2500 may movably support the bobbin 2210. The elastic member 2500 may elastically support the bobbin 2210. At least a portion of the elastic member 2500 may be elastic. The elastic member 2500 may support movement of the bobbin 2210 during AF operation. Here, the elastic member 2500 may be an "AF support member".

The elastic member 2500 may include the upper elastic member 2510. The upper elastic member 2510 may be coupled both to the upper portion of the bobbin 2210 and to the upper portion of the housing 2310. The upper elastic member 2510 may be coupled to the upper surface of the bobbin 2210. The upper elastic member 2510 may be coupled to the upper surface of the housing 2310. The upper elastic member 2510 may be embodied as a leaf spring.

The upper elastic member 2510 may include an inner portion 2511. The inner portion 2511 may be coupled to the bobbin 2210. The inner portion 2511 may be coupled to the upper surface of the bobbin 2210. The inner portion 2511 may be fixed to the bobbin 2210 using an adhesive disposed in the first groove 2215 in the bobbin 2210. The inner portion 2511 may have therein a hole corresponding to the first groove 2215 in the bobbin 2210.

The upper elastic member 2510 may include an outer portion 2512. The outer portion 2512 may be coupled to the housing 2310. The outer portion 2512 may be coupled to the upper surface of the housing 2310. The outer portion 2512 may have therein a hole or a groove, which is coupled to the protrusion 2315 of the housing 2310. The outer portion 2512 may be fixed to the housing 2310 using an adhesive disposed in the third groove 2316 in the housing 2310.

The upper elastic member 2510 may include a connector 2513. The connector 2513 may connect the outer portion 2512 to the inner portion 2511. The connector 2513 may be elastic. Here, the connector 2513 may be referred to as an "elastic portion". The connector 2513 may be bent twice or more.

The elastic member 2500 may include the lower elastic member 2520. The lower elastic member 2520 may connect the bobbin 2210 to the housing 2310. The lower elastic member 2520 may be coupled both to the lower portion of the bobbin 2210 and to the lower portion of the housing 2310. The lower elastic member 2520 may be coupled to the lower surface of the bobbin 2210. The lower elastic member 2520 may be coupled to the lower surface of the housing 2310. The lower elastic member 2520 may be coupled both to the bobbin 2210 and to the base 2400. The lower elastic member 2520 may be embodied as a leaf spring.

The lower elastic member 2520 may include a plurality of elastic units, which are spaced apart from each other. The plurality of elastic units may be conductively connected to each other. The lower elastic member 2520 may include three elastic units. The lower elastic member 2520 may include a first elastic unit 2520-1 connected to one end of the first coil 2221, a second elastic unit 2520-2 connected to one end of the second coil 2222, and a third elastic unit 2520-3 connecting the other end of the first coil 2221 to the other end of the second coil 2222. The lower elastic member 2520 may be used as a conductive line for connecting the coil 2220 to the board 2330.

The lower elastic member 2520 may include an inner portion 2521. The inner portion 2521 may be coupled to the bobbin 2210. The inner portion 2521 may be coupled to the lower surface of the bobbin 2210. The inner portion 2521 may have therein a hole or a groove, which is coupled to the protrusion of the bobbin 2210. The inner portion 2521 may be fixed to the bobbin 2210 using an adhesive.

The lower elastic member 2520 may include the outer portion 2522. The outer portion 2522 may be coupled to the housing 2310. The outer portion 2522 may be coupled to the lower surface of the housing 2310. The outer portion 2522 may have therein a hole or a groove, which is coupled to the protrusion of the housing 2310. The outer portion 2522 may be coupled to the base 2400. The outer portion 2522 may be fixed to the base 2400 using the adhesive disposed in the groove 2420 in the base 2400.

The lower elastic member 2520 may include a connector 2523. The connector 2523 may connect the outer portion 2522 to the inner portion 2521. The connector 2523 may be elastic. Here, the connector 2523 may be referred to as an "elastic portion". The connector 2523 may be bent twice or more.

The lower elastic member 2520 may include a terminal portion 2524. The terminal portion 2524 may extend from the outer portion 2522. The terminal portion 2524 may include two terminals. The terminal portion 2524 may be coupled to the first terminal 2333 of the board 2330 via soldering.

The lower elastic member 2520 may include a coupler 2525. The coupler 2525 may extend from the inner portion 2521. The coupler 2525 may be coupled to the coils 2220 via soldering.

In the embodiment, the upper elastic member 2510 may be coupled to the first corner of the housing 2310 and to the second corner of the housing 2310, disposed opposite the first corner. The lower elastic member 2520 may be coupled to the third corner of the housing 2310 and to the fourth corner of the housing 2310, disposed opposite the second corner. In other words, the upper elastic member 2510 and the lower elastic member 2520 may be coupled to different corners, among the plurality of corners of the housing 2310.

The description of FIGS. 9 and 10 may be applied to the lens moving apparatus 2010 according to the embodiment shown in FIG. 31, with or without modification. Furthermore, the description of FIGS. 11 to 13 may also be applied to the lens moving apparatus 2010 according to the embodiment shown in FIG. 31.

Figure 38A:
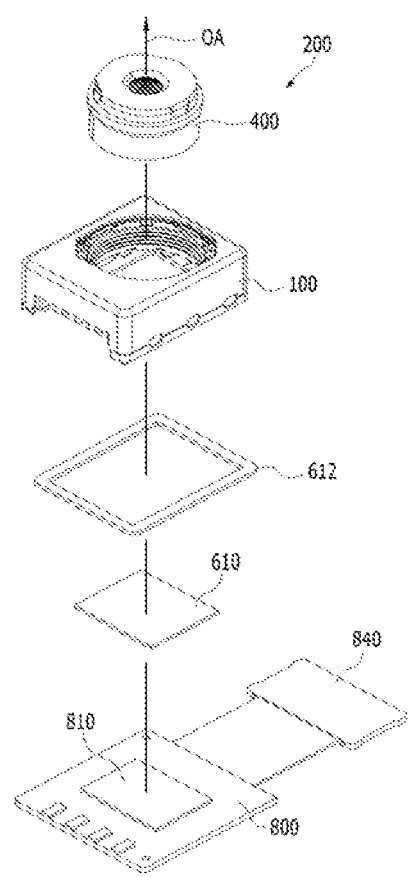
FIG. 38A is an exploded perspective view illustrating a camera module according to an embodiment.

FIG. 38A is an exploded perspective view illustrating a camera module 200 according to an embodiment.

Referring to FIG. 38A, the camera module 200 may include a lens or a lens module 400, the lens moving apparatus 100, an adhesive member 612, a filter 610, a circuit board 800, an image sensor 810, and a connector 840.

The lens module 400 may include a lens and/or a lens barrel, and may be mounted in the bobbin 110, 1100 of the lens moving apparatus 100 or 1000. The camera module 200 may also include a lens moving apparatus 1010 or 2010 according to another embodiment in place of the lens moving apparatus 100.

For example, the lens module 400 may include one or more lenses and a lens barrel configured to accommodate the lenses. However, one component of the lens module is not limited to the lens barrel, and any component may be used, as long as it has a holder structure capable of supporting one or more lenses. The lens module may be coupled to the lens moving apparatus 100 and may be moved therewith.

For example, the lens module 400 may be coupled to the lens moving apparatus 100 through threaded engagement. For example, the lens module 400 may be coupled to the lens moving apparatus 100 by means of an adhesive (not shown). The light that has passed through the lens module 400 may be radiated to the image sensor 810 through the filter 610.

The adhesive member 612 may couple or attach the base 210 of the lens moving apparatus 100 to the circuit board 800. The adhesive member 612 may be, for example, epoxy, thermohardening adhesive, or ultraviolet hardening adhesive.

The filter 610 may serve to prevent light within a specific frequency band that passes through the lens barrel 400 from being introduced into the image sensor 810. The filter 610 may be, for example, an infrared-light-blocking filter, without being limited thereto. Here, the filter 610 may be oriented parallel to the X-Y plane.

Here, the infrared-light-blocking filter may be made of a film material or a glass material. For example, the infrared-light-blocking filter may be manufactured by applying an infrared-light-blocking coating material to a plate-shaped optical filter such as a cover glass for protecting an imaging area.

The filter 610 may be disposed below the base 210 of the lens moving apparatus 100.

For example, the base 210 may be provided on the lower surface thereof with a mounting portion on which the filter 610 is mounted. In another embodiment, an additional sensor base, on which the filter 610 is mounted, may be provided.

The circuit board 800 may be disposed below the lens moving apparatus 100, and the image sensor 810 may be mounted on the circuit board 800. The image sensor 810 may receive an image included in the light introduced through the lens moving apparatus 100, and may convert the received image into an electrical signal.

In another embodiment, a holder or a sensor base may be disposed between the circuit board 800 and the base 210 of the lens moving apparatus 100.

The image sensor 810 may be positioned such that the optical axis thereof is aligned with the optical axis of the lens module 400. Accordingly, the image sensor may obtain the light that has passed through the lens module 400. The image sensor 810 may output the radiated light as an image. The image sensor 810 may be, for example, a CCD (charge coupled device), MOS (metal oxide semi-conductor), CPD or CID. However, the kind of the image sensor is not limited thereto.

The filter 610 and the image sensor 810 may be disposed so as to be spaced apart from each other in the state of facing each other in the first direction.

The connector 840 may be conductively connected to the circuit board 800, and may have a port that is intended to be conductively connected to an external device.

Figure 38B:
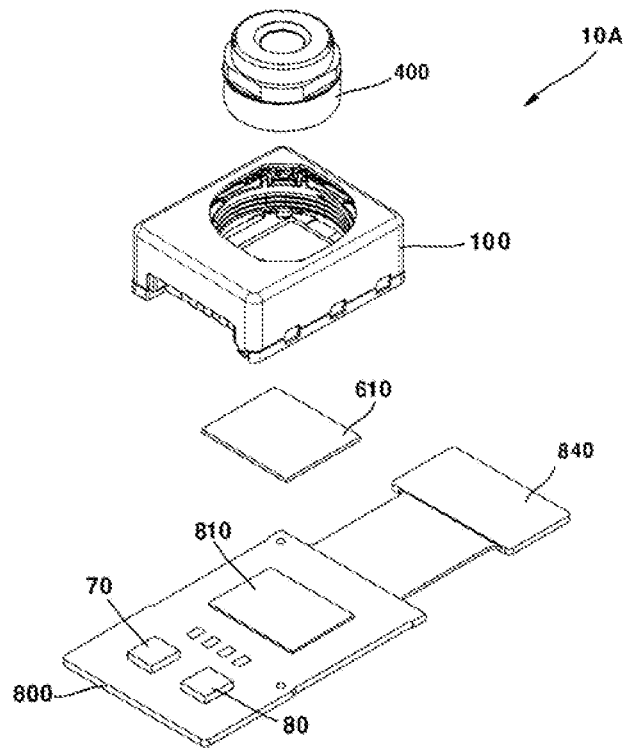
FIG. 38B is an exploded perspective view illustrating a camera module according to another embodiment.

FIG. 38B is an exploded perspective view of a camera module 10A according to another embodiment.

Referring to FIG. 38B, the camera module 10A may include the lens module 400, the lens moving apparatus 100, the filter 610, the circuit board 800, the image sensor 810, the connector 840, a motion sensor 70 and a controller 80. In FIG. 38B, the same reference numerals as those in FIG. 38A denote the same components, and a description of the same components is given briefly or omitted. In FIG. 38B, the adhesive member 612 in FIG. 38A is omitted.

The motion sensor 70 may be mounted on the circuit board 800. The motion sensor 70 may be conductively connected to the controller 80 through the circuit pattern formed on the circuit board 800. The motion sensor 70 may output information about a rotational angular speed of motion of the camera device 10A. The motion sensor 70 may include a dual-axis or triple-axis gyro sensor or an angular speed sensor.

The controller 80 may be disposed on the circuit board 800. The controller 80 may be conductively connected to the coil 120 of the lens moving apparatus 100. The controller 80 may individually control the direction, the intensity, the amplitude and the like of the current supplied to the coil 120. The controller 80 may control the lens moving apparatus 100 to perform an autofocus function and/or a handshake correction function. Furthermore, the controller 80 may perform autofocus feedback control and/or handshake correction feedback control for the lens moving apparatus 100.

The lens moving apparatus 100 according to the embodiment may be included in an optical instrument, which is designed to form the image of an object in a space using reflection, refraction, absorption, interference, diffraction or the like, which are characteristics of light, to extend eyesight, to record an image obtained through a lens or to reproduce the image, to perform optical measurement, or to propagate or transmit an image. For example, although the optical instrument according to the embodiment may be a mobile phone, cellular phone, smart phone, portable smart instrument, digital camera, laptop computer, digital broadcasting terminal, PDA (Personal Digital Assistant), PMP (Portable Multimedia Player), navigation device, or the like, the disclosure is not limited thereto. Furthermore, any device capable of taking images or photographs is possible.

Figure 39:
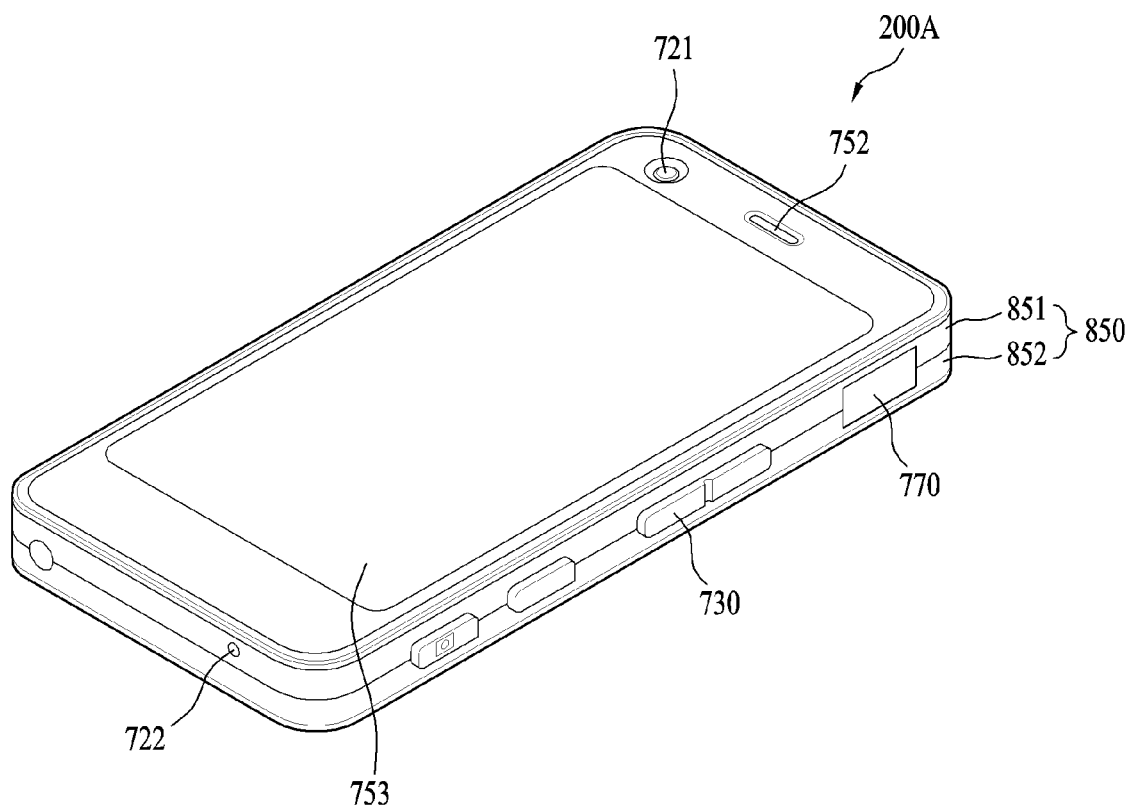
FIG. 39 is a perspective view of a portable terminal according to an embodiment.
Figure 40:
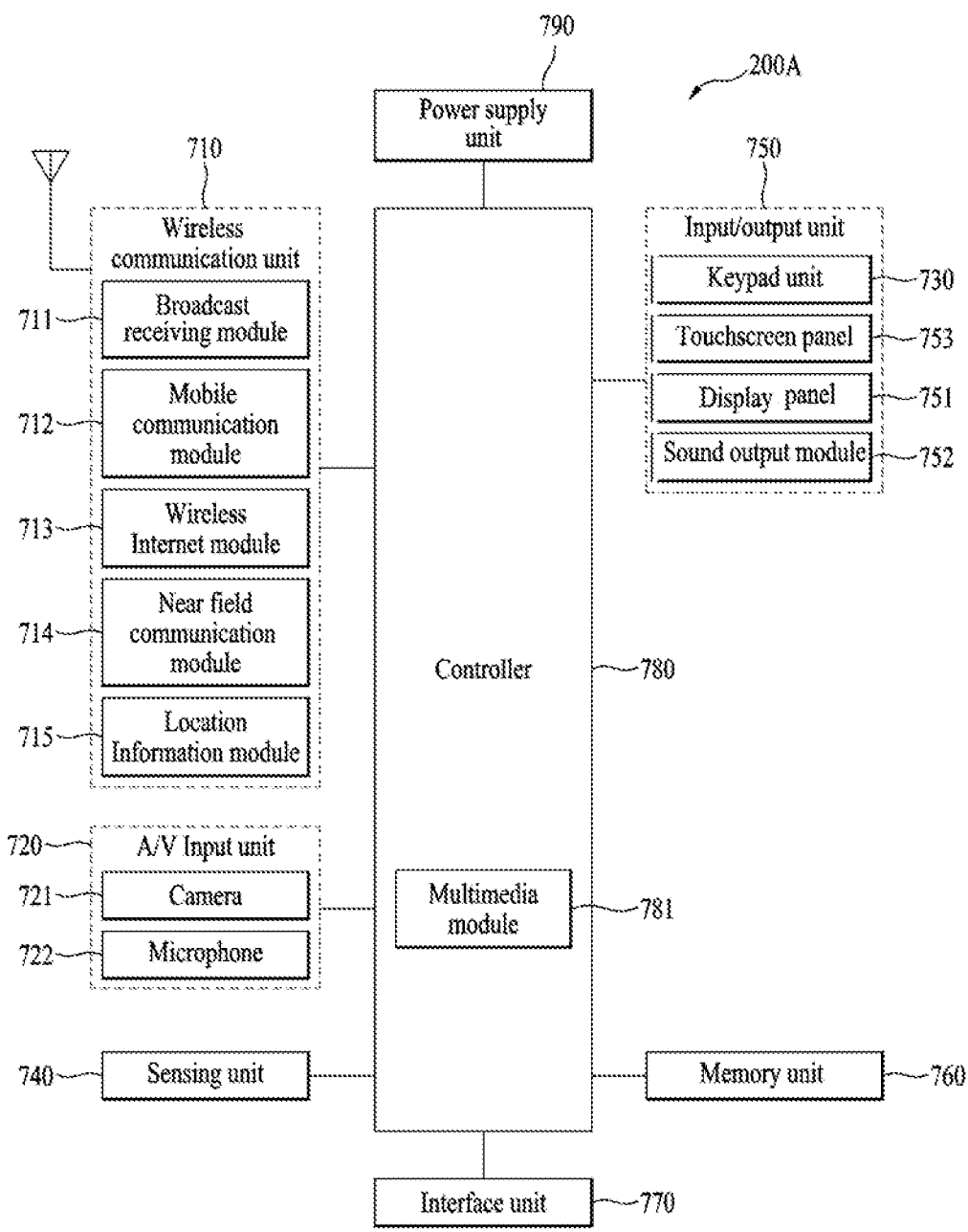
FIG. 40 is a view illustrating the configuration of the portable terminal illustrated in FIG. 39.

FIG. 39 is a perspective view illustrating a portable terminal 200A according to an embodiment. FIG. 40 is a view illustrating the configuration of the portable terminal illustrated in FIG. 39.

Referring to FIGS. 39 and 40, the portable terminal 200A (hereinafter referred to as a "terminal") may include a body 850, a wireless communication unit 710, an audio/video (A/V) input unit 720, a sensing unit 740, an input/output unit 750, a memory unit 760, an interface unit 770, a controller 780, and a power supply unit 790.

The body 850 illustrated in FIG. 39 has a bar shape, without being limited thereto, and may be any of various types, such as, for example, a slide type, a folder type, a swing type, or a swivel type, in which two or more sub-bodies are coupled so as to be movable relative to each other.

The body 850 may include a case (a casing, housing, cover or the like) defining the external appearance of the terminal. For example, the body 850 may be divided into a front case 851 and a rear case 852. Various electronic components of the terminal may be accommodated in the space defined between the front case 851 and the rear case 852.

A display module 751 may be disposed on one surface of the body 850. At least one of the one surface of the body 850 and the other surface of the body 850 disposed opposite the one surface may be provided with a camera 721.

The wireless communication unit 710 may include one or more modules, which enable wireless communication between the terminal 200A and a wireless communication system or between the terminal 200A and a network in which the terminal 200A is located. For example, the wireless communication unit 710 may include a broadcast-receiving module 711, a mobile communication module 712, a wireless Internet module 713, a nearfield communication module 714, and a location information module 715.

The A/V input unit 720 serves to input audio signals or video signals, and may include, for example, a camera 721 and a microphone 722.

The camera 721 may be the camera including the camera module 200 or 10A according to the embodiment.

The sensing unit 740 may sense the current state of the terminal 200A, such as, for example, the opening or closing of the terminal 200A, the location of the terminal 200A, the presence of a user's touch, the orientation of the terminal 200A, or the acceleration/deceleration of the terminal 200A, and may generate a sensing signal to control the operation of the terminal 200A. When the terminal 200A is, for example, a slide-type cellular phone, the sensing unit 740 may sense whether the slide-type cellular phone is opened or closed. Furthermore, the sensing unit 740 may sense the supply of power from the power supply unit 790, coupling of the interface unit 770 to an external device, and the like.

The input/output unit 750 serves to generate, for example, visual, audible, or tactile input or output. The input/output unit 750 may generate input data to control the operation of the terminal 200A, and may display information processed in the terminal 200A.

The input/output unit 750 may include a keypad unit 730, a display module 751, a sound output module 752, and a touchscreen panel 753. The keypad unit 730 may generate input data in response to input on a keypad.

The display module 751 may include a plurality of pixels, the color of which varies depending on the electrical signals applied thereto. For example, the display module 751 may include at least one among a liquid crystal display, a thin-film transistor liquid crystal display, an organic light-emitting diode, a flexible display and a 3D display.

The sound output module 752 may output audio data received from the wireless communication unit 710 in, for example, a call-signal reception mode, a call mode, a recording mode, a voice recognition mode, or a broadcast reception mode, or may output audio data stored in the memory unit 760.

The touchscreen panel 753 may convert variation in capacitance, caused by a user's touch on a specific region of a touchscreen, into electrical input signals.

The memory unit 760 may temporarily store programs for the processing and control of the controller 780, and input/output data (for example, telephone numbers, messages, audio data, stationary images, moving images and the like). For example, the memory unit 760 may store images captured by the camera 721, for example, pictures or moving images.

The interface unit 770 serves as a path through which the lens moving apparatus is connected to an external device connected to the terminal 200A. The interface unit 770 may receive power or data from the external component, and may transmit the same to respective constituent elements inside the terminal 200A, or may transmit data inside the terminal 200A to the external component. For example, the interface unit 770 may include a wired/wireless headset port, an external charger port, a wired/wireless data port, a memory card port, a port for connection to a device equipped with an identification module, an audio input/output (I/O) port, a video input/output (I/O) port, an earphone port and the like.

The controller 780 may control the general operation of the terminal 200A. For example, the controller 780 may perform control and processing related to, for example, voice calls, data communication, and video calls.

The controller 780 may include a multimedia module 781 for multimedia playback. The multimedia module 781 may be embodied in the controller 180, or may be embodied separately from the controller 780.

The controller 780 may perform a pattern recognition process capable of recognizing writing input or drawing input carried out on a touch screen as a character and an image, respectively.

In place of the controller 830 of the camera module 200, the controller 780 of the optical device 200A may send a clock signal SCL, a data signal SDA and power signals VDD and GND for I2C communication with the position sensor 120 and may receive the clock signal SCL and the data signal SDA from the position sensor 170.

The power supply unit 790 may supply power required to operate the respective constituent elements upon receiving external power or internal power under the control of the controller 780.

The features, configurations, effects and the like described above in the embodiments are included in at least one embodiment, but the invention is not limited only to the embodiments. In addition, the features, configurations, effects and the like exemplified in the respective embodiments may be combined with other embodiments or modified by those skilled in the art. Accordingly, content related to these combinations and modifications should be construed as falling within the scope of the disclosure.

INDUSTRIAL APPLICABILITY

The embodiments are applicable to a lens moving apparatus and a camera module and an optical device each including the same, which are capable of increasing the coupling force between a bobbin and a sensing magnet and of reducing the magnetic field interference between the sensing magnet and a drive magnet.

The invention claimed is:

1. A lens moving apparatus comprising:
a housing comprising a first corner portion, a second corner portion facing the first corner portion, a third corner portion, and a fourth corner portion facing the third corner portion;
a bobbin disposed in the housing;
a magnet comprising a first magnet disposed on the first corner portion of the housing and a second magnet disposed on the second corner portion of the housing;
a coil disposed on the bobbin so as to face the magnet;
a circuit board disposed on one surface of the housing;
a position sensor disposed on the circuit board and electrically connected to the circuit board; and
a sensing magnet disposed on the bobbin so as to face the position sensor,
wherein the bobbin comprises:
   a projection formed at one surface of the bobbin facing the one surface of the housing and projecting toward the one surface of the housing; and
   a seating groove depressed from an upper surface of the projection of the bobbin,
wherein at least a portion of the sensing magnet is disposed in the seating groove of the projection of the bobbin,
wherein the sensing magnet comprises:
   a projecting portion positioned outside a reference line that coincides with the one surface of the bobbin; and
   a non-projecting portion positioned inside of the reference line, and
wherein a length of the projecting portion of the sensing magnet is greater than a length of the non-projecting portion of the sensing magnet.

2. The lens moving apparatus according to claim 1, wherein the housing comprises a groove formed in the one surface of the housing and the projection of the bobbin is disposed in the groove of the housing.

3. The lens moving apparatus according to claim 1, wherein the sensing magnet projects from the one surface of the bobbin toward the one surface of the housing.

4. The lens moving apparatus according to claim 1, wherein at least a portion of the sensing magnet has a width that decreases toward the one surface of the housing from the one surface of the bobbin.

5. The lens moving apparatus according to claim 1, wherein the seating groove in the projection has a first opening formed in the upper surface of the projection and a second opening formed in an outer surface of the projection.

6. The lens moving apparatus according to claim 5, wherein the second opening in the bobbin exposes one surface of the sensing magnet, which faces the position sensor.

7. The lens moving apparatus according to claim 1, wherein the coil includes a first coil unit that faces the first magnet and a second coil unit that faces the second magnet, and the circuit board is disposed between the first corner portion and the third corner portion of the housing.

8. The lens moving apparatus according to claim 3, wherein a length of a portion of the sensing magnet that projects from the one surface of the bobbin is greater than a shortest distance between the position sensor and the sensing magnet.

9. The lens moving apparatus according to claim 1, wherein the sensing magnet includes a first magnet part, a second magnet part and a partition wall disposed between the first magnet part and the second magnet part.

10. The lens moving apparatus according to claim 1, wherein a length of the sensing magnet in an optical-axis direction is greater than a length of the sensing magnet in a direction perpendicular to the optical axis.

11. The lens moving apparatus according to claim 1, wherein the position sensor is disposed closer to the third corner portion than to the first corner portion of the housing.

12. The lens moving apparatus according to claim 7, wherein the first coil unit is connected to the second coil unit in series.

13. The lens moving apparatus according to claim 1, comprising a base disposed below the housing, and
   wherein the base comprises a seating groove formed in an outer surface thereof so as to correspond to the circuit board, and a lower end of the circuit board is disposed in the seating groove.

14. The lens moving apparatus according to claim 7, comprising a lower elastic member coupled to a lower portion of the bobbin and a lower portion of the housing,
   wherein the lower elastic member comprises a first lower elastic unit, a second lower elastic unit, and a third lower elastic unit,
   wherein one end of the first coil is coupled to the first lower elastic unit and another end of the first coil is coupled to the third lower elastic unit, and
   wherein one end of the second coil is coupled to the second lower elastic unit and another end of the second coil is coupled to the third lower elastic unit.

15. The lens moving apparatus according to claim 1, wherein the position sensor comprises a hall sensor and a driver.

16. The lens moving apparatus according to claim 14, wherein the first and second lower elastic units are electrically connected to the circuit board.

17. The lens moving apparatus according to claim 1, wherein the coil receives a drive signal from the position sensor.

18. A lens moving apparatus comprising:
a housing;
a bobbin disposed in the housing;
a magnet disposed on the housing;
a coil disposed on the bobbin and comprising a first coil and a second coil;

a circuit board disposed on one surface of the housing;
a position sensor disposed on the circuit board and electrically connected to the circuit board;
a sensing magnet disposed on the bobbin; and
a lower elastic member coupled to a lower portion of the bobbin and a lower portion of the housing,
wherein the bobbin comprises:
- a projection formed at one surface of the bobbin facing the one surface of the housing and projecting toward the one surface of the housing; and
- a seating groove depressed from an upper surface of the projection of the bobbin, wherein at least a portion of the sensing magnet is disposed in the seating groove of the projection of the bobbin, wherein the sensing magnet comprises:
- a projecting portion positioned outside a reference line that coincides with the one surface of the bobbin; and
- a non-projecting portion positioned inside of the reference line, wherein a length of the projecting portion of the sensing magnet is greater than a length of the non-projecting portion of the sensing magnet, wherein the lower elastic member comprises first to third lower elastic units spaced apart from each other, wherein the first coil electrically connects the first lower elastic unit the third lower elastic unit, and the second coil electrically connects the second lower elastic unit and the third lower elastic unit, and wherein the first and second lower elastic units are electrically connected to the circuit board.

19. A camera module comprising:
a lens;
the lens moving apparatus according to claim 1; and
an image sensor.

20. The lens moving apparatus according to claim 1, comprising an adhesive disposed on a bottom surface of the seating groove and configured to bond the sensing magnet to the seating groove.

\* \* \* \* \*